US011783248B2

(12) United States Patent
Shike et al.

(10) Patent No.: US 11,783,248 B2
(45) Date of Patent: Oct. 10, 2023

(54) UNITED STATES CONSTRUCTION MANAGEMENT SYSTEM AND METHOD

(71) Applicant: Komatsu Ltd., Tokyo (JP)

(72) Inventors: Chikashi Shike, Tokyo (JP); Yuichi Nemoto, Tokyo (JP); Masahiro Kurihara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 167 days.

(21) Appl. No.: 15/575,004

(22) PCT Filed: Apr. 28, 2016

(86) PCT No.: PCT/JP2016/063451
§ 371 (c)(1),
(2) Date: Nov. 17, 2017

(87) PCT Pub. No.: WO2016/208276
PCT Pub. Date: Dec. 29, 2016

(65) Prior Publication Data
US 2018/0137446 A1     May 17, 2018

(30) Foreign Application Priority Data

Jun. 23, 2015  (JP) ................................. 2015-126073
Oct. 5, 2015   (JP) ................................. 2015-198083

(51) Int. Cl.
*G06Q 10/0631*   (2023.01)
*E02D 17/18*     (2006.01)
(Continued)

(52) U.S. Cl.
CPC ....... *G06Q 10/06313* (2013.01); *E02D 17/18* (2013.01); *E02F 9/20* (2013.01);
(Continued)

(58) Field of Classification Search
None
See application file for complete search history.

(56) References Cited

U.S. PATENT DOCUMENTS 5,612,864 A * 3/1997 Henderson .............. E02F 3/847
                                              356/3.01
5,631,658 A * 5/1997 Gudat .................. A01B 79/005
                                              342/457
(Continued)

FOREIGN PATENT DOCUMENTS

JP       09-177321 A     7/1997
JP       11-66149 A      3/1999
(Continued)

OTHER PUBLICATIONS

AU Office Action dated Jun. 18, 2019, issued in the corresponding Australian patent application No. 2016283735.
(Continued)

*Primary Examiner* — Folashade Anderson
(74) *Attorney, Agent, or Firm* — Locke Lord LLP

(57) ABSTRACT

A construction management system includes: a current topography data acquisition unit configured to acquire current topography data indicating a current topography of a construction site; a design topography data acquisition unit configured to acquire design topography data indicating a design topography of the construction site; a construction plan data calculation unit configured to calculate construction plan data including earth cutting plan data and earth banking plan data by collating the current topography data with the design topography data; and a construction plan data output unit configured to output the construction plan data to an output device. The construction plan data output unit causes an output device to output at least two of the design topography data, the cutting plan data, and the banking plan data in parallel.

30 Claims, 39 Drawing Sheets

(51) Int. Cl.
    *G06Q 50/08*           (2012.01)
    *G06Q 10/0633*       (2023.01)
    *E02F 9/20*            (2006.01)
    *E02F 9/26*            (2006.01)

(52) U.S. Cl.
    CPC .............. *E02F 9/2054* (2013.01); *E02F 9/26* (2013.01); *E02F 9/261* (2013.01); *G06Q 10/0633* (2013.01); *G06Q 50/08* (2013.01)

(56) References Cited

U.S. PATENT DOCUMENTS

| | | | | |
|---|---|---|---|---|
| 5,951,613 | A * | 9/1999 | Sahm | E02F 3/847 |
| | | | | 701/50 |
| 5,974,391 | A * | 10/1999 | Hongawa | G06Q 10/06312 |
| | | | | 707/999.1 |
| 5,996,702 | A | 12/1999 | Hall | |
| 6,996,507 | B1 * | 2/2006 | Myr | G06Q 10/06 |
| | | | | 703/2 |
| 7,831,362 | B2 | 11/2010 | Ishibashi et al. | |
| 8,620,535 | B2 | 12/2013 | Friend et al. | |
| 9,822,509 | B1 * | 11/2017 | Chi | G06F 16/2455 |
| 10,684,137 | B2 * | 6/2020 | Kean | G06F 16/51 |
| 11,157,849 | B2 * | 10/2021 | Shike | G06Q 10/06313 |
| 2002/0045986 | A1 * | 4/2002 | Tamaru | E01C 19/00 |
| | | | | 701/482 |
| 2002/0059320 | A1 | 5/2002 | Tamaru | |
| 2005/0171790 | A1 * | 8/2005 | Blackmon | G06Q 10/06 |
| | | | | 705/315 |
| 2005/0268245 | A1 * | 12/2005 | Gipps | G06F 30/13 |
| | | | | 715/762 |
| 2006/0044307 | A1 * | 3/2006 | Song | G06Q 10/06 |
| | | | | 345/419 |
| 2009/0094077 | A1 * | 4/2009 | Fosburgh | G06Q 10/00 |
| | | | | 705/315 |
| 2010/0161183 | A1 * | 6/2010 | Beese | G06Q 50/02 |
| | | | | 701/50 |
| 2010/0211512 | A1 * | 8/2010 | Detwiler | G06Q 50/165 |
| | | | | 705/315 |
| 2010/0250123 | A1 * | 9/2010 | Leman | E02F 9/2054 |
| | | | | 701/532 |
| 2011/0288673 | A1 * | 11/2011 | Mundt | G05B 19/4099 |
| | | | | 901/9 |
| 2014/0137759 | A1 * | 5/2014 | Muona | E21B 7/022 |
| | | | | 102/312 |
| 2014/0277666 | A1 * | 9/2014 | Morkos | G06Q 10/06 |
| | | | | 700/100 |
| 2016/0321763 | A1 * | 11/2016 | Shike | G06Q 10/06313 |
| 2017/0089033 | A1 * | 3/2017 | Matsuyama | E02F 3/437 |
| 2018/0043187 | A1 * | 2/2018 | Yao | A61B 6/4035 |
| 2018/0137446 | A1 | 5/2018 | Shike et al. | |
| 2018/0218304 | A1 * | 8/2018 | Shike | G06Q 10/0631 |
| 2019/0093313 | A1 * | 3/2019 | Ono | E02F 3/844 |
| 2019/0099686 | A1 * | 4/2019 | Barki | G06V 10/225 |
| 2019/0138667 | A1 * | 5/2019 | Benesh | G06Q 10/063 |
| 2019/0218745 | A1 * | 7/2019 | Hashimoto | G05D 1/0274 |
| 2019/0377602 | A1 * | 12/2019 | Mosca | G06N 7/01 |
| 2021/0256457 | A1 * | 8/2021 | Saiki | G06Q 10/06315 |

FOREIGN PATENT DOCUMENTS

| | | |
|---|---|---|
| JP | 2002-188183 A | 7/2002 |
| JP | 2003-239287 A | 8/2003 |
| JP | 2012-222536 A | 11/2012 |
| WO | 2016/208276 A1 | 12/2016 |

OTHER PUBLICATIONS

Dahlan, Nariman, "Development of a Civil Engineering Support System Using Augmented Reality", Proceedings of the Virtual Reality Society of Japan 6th Annual Conference, Sep. 19, 2001, pp. 9-12.

International Search Report dated Jun. 28, 2016, issued for PCT/JP2016/063451.

Australian Examination Report dated Jul. 19, 2021 for corresponding AU Patent Application No. 2019275664, 5 pages.

Australian Examination Report No. 2 dated Mar. 15, 2021 for Australian Application No. 2019203748, 7 pages.

* cited by examiner

440Ap
MESH POINT(Xg, Yg, Zg)

440Bp
MESH POINT(Xg, Yg, Zg)

FIG.27

| PROCESS | CONSTRUCTION AMOUNT | WORK MACHINE | WORK BASIC UNIT | NECESSARY DAYS |
|---|---|---|---|---|
| EXCAVATING PROCESS | 22,240m$^3$ | PC200i × 1 | 576m$^3$ | 39 DAYS |
| BANKING PROCESS | 26,984m$^3$ | D61PX × 1 | 1,000m$^3$ | 27 DAYS |
| SLOPE SURFACE SHAPING PROCESS | 6,208m$^3$ | PC200i × 1 | 200m$^2$ | 31 DAYS |
| TRENCH DIGGING PROCESS | 473m (212m$^3$) | PC200i × 1 | 150m (67.5m$^3$ × 1) | 3 DAYS |

FIG.31

| | | | PLANNED SOIL AMOUNT/ AREA | CUMU-LATIVE ACTUAL ACHIEVE-MENT | NOVEMBER | | | | | | DECEMBER | | | | | | | | | | |
|---|---|---|---|---|---|---|---|---|---|---|---|---|---|---|---|---|---|---|---|---|---|
| | | | | | 25 TUE | 26 WED | 27 THU | 28 FRI | 29 SAT | 30 SUN | 1 MON | 2 TUE | 3 WED | 4 THU | 5 FRI | 6 SAT | 7 SUN | 8 MON | 9 TUE | 10 WED | 11 THU |
| EXCAVATING PROCESS (UNIT: m³) | PLAN | DAILY CONSTRUCTION AMOUNT | – | – | 576 | 576 | 576 | 576 | 576 | 576 | 576 | 576 | 576 | 576 | 576 | 576 | 576 | 576 | 576 | 576 | 576 |
| | | DAILY CUMULATIVE TOTAL | 22,240 | 11,520 | 3456 | 4032 | 4608 | 5184 | 5760 | 5760 | 6336 | 6912 | 7488 | 8064 | 8064 | 9216 | 9216 | 9792 | 10368 | 10944 | 11520 |
| | ACTUAL ACHIEVE-MENT | DAILY CONSTRUCTION AMOUNT | – | – | 576 | 576 | 576 | 576 | 576 | 0 | 0 | 0 | 0 | 576 | 576 | 576 | 0 | 576 | 576 | 576 | 576 |
| | | DAILY CUMULATIVE TOTAL | 22,240 | 9,216 | 3456 | 4032 | 4609 | 5184 | 5760 | 5760 | 5760 | 5760 | 5760 | 6336 | 6912 | 7488 | 7488 | 8064 | 8640 | 9216 | 9216 |
| | | DAILY PROGRESS RATE | – | 41.4% | 15.5% | 18.1% | 20.7% | 23.3% | 25.9% | 25.9% | 25.9% | 25.9% | 25.9% | 28.5% | 31.1% | 33.7% | 33.7% | 36.3% | 38.8% | 41.4% | 41.4% |
| BANKING PROCESS (UNIT: m³) | PLAN | DAILY CONSTRUCTION AMOUNT | – | – | 1000 | 1000 | 1000 | 1000 | 1000 | 1000 | 1000 | 1000 | 1000 | 1000 | 1000 | 1000 | 1000 | 1000 | 1000 | 1000 | 1000 |
| | | DAILY CUMULATIVE TOTAL | 26,984 | 17,000 | 6000 | 7000 | 8000 | 9000 | 10000 | 10000 | 10000 | 10000 | 10000 | 11000 | 12000 | 13000 | 13000 | 14000 | 15000 | 16000 | 17000 |
| | ACTUAL ACHIEVE-MENT | DAILY CONSTRUCTION AMOUNT | – | – | 1000 | 1000 | 1000 | 1000 | 1000 | 0 | 0 | 0 | 0 | 1000 | 1000 | 1000 | 0 | 1000 | 1000 | 1000 | |
| | | DAILY CUMULATIVE TOTAL | 26,984 | 16,000 | 6000 | 7000 | 8000 | 9000 | 10000 | 10000 | 10000 | 10000 | 10000 | 11000 | 12000 | 13000 | 13000 | 14000 | 15000 | 16000 | 16000 |
| | | DAILY PROGRESS RATE | – | 59.3% | 22.2% | 25.9% | 29.6% | 33.4% | 37.1% | 37.1% | 37.1% | 37.1% | 37.1% | 40.8% | 44.5% | 48.2% | 48.2% | 51.9% | 55.6% | 59.3% | 59.3% |
| SLOPE SURFACE SHAPING PROCESS (UNIT: m²) | PLAN | DAILY CONSTRUCTION AMOUNT | – | – | 200 | 200 | 200 | 200 | 200 | 200 | 200 | 200 | 200 | 200 | 200 | 200 | 200 | 200 | 200 | 200 | 200 |
| | | DAILY CUMULATIVE TOTAL | 6,208 | 3,400 | 1200 | 1400 | 1600 | 1800 | 2000 | 2000 | 2000 | 2000 | 2000 | 2200 | 2400 | 2600 | 2600 | 2800 | 3000 | 3200 | 3400 |
| | ACTUAL ACHIEVE-MENT | DAILY CONSTRUCTION AMOUNT | – | – | 200 | 200 | 200 | 200 | 200 | 0 | 0 | 0 | 0 | 200 | 200 | 200 | 0 | 200 | 200 | 200 | |
| | | DAILY CUMULATIVE TOTAL | 6,208 | 3,200 | 1200 | 1400 | 1600 | 1800 | 2000 | 2000 | 2000 | 2000 | 2000 | 2200 | 2400 | 2600 | 2600 | 2800 | 3000 | 3200 | 3200 |
| | | DAILY PROGRESS RATE | – | 51.5% | 19.3% | 22.6% | 25.8% | 29.0% | 32.2% | 32.2% | 32.2% | 32.2% | 32.2% | 35.4% | 38.7% | 41.9% | 41.9% | 45.1% | 48.3% | 51.5% | 51.5% |

CONSTRUCTION SITE A: ○○PREFECTURE, △△CITY, ××TOWN, 1-1-1

CONSTRUCTION SITE B: □□PREFECTURE, □□CITY, ○△TOWN, 2-2-2

CONSTRUCTION SITE C: ○□PREFECTURE, ○×CITY, □△TOWN, 3-3-3

⋮  ⋮

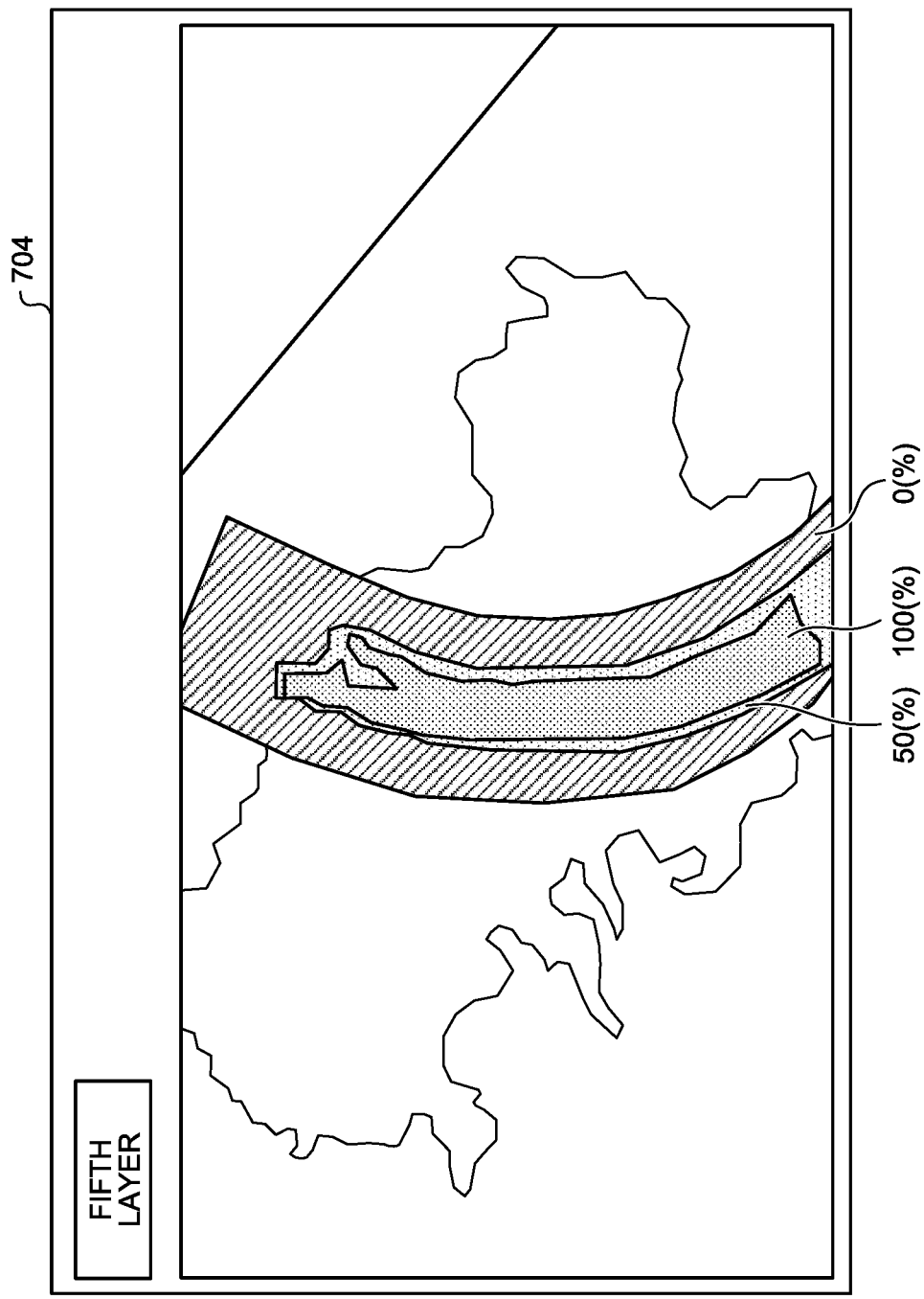

UNITED STATES CONSTRUCTION MANAGEMENT SYSTEM AND METHOD

FIELD

The present invention relates to a construction management system and a construction management method.

BACKGROUND

A construction plan of a construction site may be carried out by a computer system (refer to Patent Literature 1). Also, in recent years, computer aided construction is increasingly introduced in a construction site. The computer aided construction is a system to provide highly efficient and highly accurate construction by an information and communication technology (ICT) utilizing electronic information obtained from respective processes while focusing on construction out of a construction schedule including processes of survey, design, construction, supervision, inspection, and maintenance management. Additionally, productivity improvement and quality assurance in the entire construction schedule can be achieved by utilizing the electronic information obtained from the construction process for other processes. According to a work machine capable of performing the computer aided construction, movement of the work machine can be automatically controlled and a current topography can be constructed into a target topography.

CITATION LIST

Patent Literature

Patent Literature 1: Japanese Laid-open Patent Publication No. 09-177321 A

SUMMARY

Technical Problem

Due to aging of workers in construction sites and a situation in which young people tend to avoid working in the construction industry, labor shortage is predicted in the construction industry. Could optimal construction solution service be provided, productivity in a construction site can be improved and such a problem of labor shortage existing in the construction industry can be solved.

An aspect of the present invention is to provide a construction management system and a construction management method which can improve productivity in a construction site.

Solution to Problem

According to a first aspect of the present invention, provided is a construction management system comprising: a current topography data acquisition unit configured to acquire current topography data indicating a current topography of a construction site; a design topography data acquisition unit configured to acquire design topography data indicating a design topography of the construction site; a construction plan data calculation unit configured to calculate construction plan data including earth cutting plan data and earth banking plan data by collating the current topography data with the design topography data; and a construction plan data output unit configured to output the construction plan data to an output device, wherein the construction plan data output unit causes the output device to output at least two of the current topography data, the design topography data, the cutting plan data, and the banking plan data in parallel.

According to a second aspect of the present invention, provided is a construction management system comprising: a current topography data acquisition unit configured to acquire current topography data indicating a current topography of a construction site; a design topography data acquisition unit configured to acquire design topography data indicating a design topography of the construction site; a construction plan data calculation unit configured to calculate construction plan data indicating a construction plan in the construction site by collating the current topography data with the design topography data; a construction actual achievement data acquisition unit configured to acquire construction actual achievement data indicating construction actual achievement in the construction site; and a construction plan data output unit configured to output the construction plan data and the construction actual achievement data to an output device, wherein the construction plan data output unit causes the output device to output one or both of the construction plan data and the construction actual achievement data relative to a process of the construction for a predetermined construction day or for each construction day.

According to a third aspect of the present invention, provided is a construction management system comprising: a current topography data acquisition unit configured to acquire current topography data indicating a current topography of a construction site, a design topography data acquisition unit configured to acquire design topography data indicating a design topography of the construction site; a basic unit data acquisition unit configured to acquire basic unit data indicating conditions of a work machine that constructs the construction site; a construction plan data calculation unit configured to calculate construction plan data indicating a construction plan of the construction site for each process of the construction on the basis of the current topography data, the design topography data, and the basic unit data; and a construction plan data output unit configured to output the construction plan data to an output device, wherein the construction plan data includes at least one of construction amount data indicating a construction amount required for the process, work machine data indicating a type and number of the work machines required for the process, work basic unit data indicating a workload that can be performed by the work machine per unit time, and necessary time data indicating a time until the process is completed, and the construction plan data output unit causes the output device to output at least one of the construction amount data, the work machine data, the work basic unit data, and the necessary time data for the construction process.

According to a fourth aspect of the present invention, provided is a construction management system comprising: a current topography data acquisition unit configured to acquire current topography data indicating a current topography of a construction site; a construction plan data calculation unit configured to calculate construction plan data indicating a construction plan of the construction site by collating the current topography data with design topography data indicating a design topography of the construction site; a construction actual achievement data acquisition unit configured to acquire construction actual achievement data indicating construction actual achievement data of the construction site; and a construction plan data output unit configured to output the construction plan data and the construction actual achievement data to an output device, wherein the construction plan data output unit causes the output device to output at least two of the current topography data, the construction plan data, and the construction actual achievement data in an overlapping manner.

According to a fifth aspect of the present invention, provided is a construction management system comprising: an approval request data generation unit configured to generate approval request data that requests approval for transmission of design topography data to a work machine that constructs a construction site, the design topography data indicating a design topography of the construction site; and a data output unit configured to transmit the design topography data to the work machine, wherein the data output unit outputs the approval request data to the output device, and transmits the design topography data to the work machine after acquiring authorization data that authorizes transmission of the design topography data.

According to a sixth aspect of the present invention, provided is a construction management system including: a design topography data acquisition unit configured to acquire design topography data indicating a design topography of a construction site; and a construction plan data output unit configured to output the design topography data to an output device, in which the construction plan data output unit causes the output device to output a plurality of pieces of design topography data at the same time.

According to a seventh aspect of the present invention, provided is a construction management method comprising: transmitting approval request data that requests approval for transmission of design topography data to a work machine that constructs a construction site, the design topography data indicating a design topography of the construction site; acquiring authorization data that authorizes transmission of the design topography data generated on the basis of transmission of the approval request data; and transmitting the design topography data to the work machine after acquiring the authorization data.

Advantageous Effects of Invention

According to an aspect of the present invention, provided are a construction management system and a construction management method capable of improving productivity in a construction site.

BRIEF DESCRIPTION OF DRAWINGS

FIG. 27 is a diagram illustrating exemplary output of the output device according to the present embodiment.

FIG. 31 is a diagram illustrating exemplary output of the output device according to the present embodiment.

FIG. 33 is a diagram illustrating exemplary output of the output device according to the present embodiment.

FIG. 44 is a diagram illustrating exemplary output of the output device according to the present embodiment.

DESCRIPTION OF EMBODIMENTS

In the following, embodiments of the present invention will be described with reference to the drawings, but the present invention is not limited thereto. Note that components of the respective embodiments described below can be suitably combined. Additionally, there may be a case where part of the components may not be used.

[Outline of Construction Management System]

Figure 1:
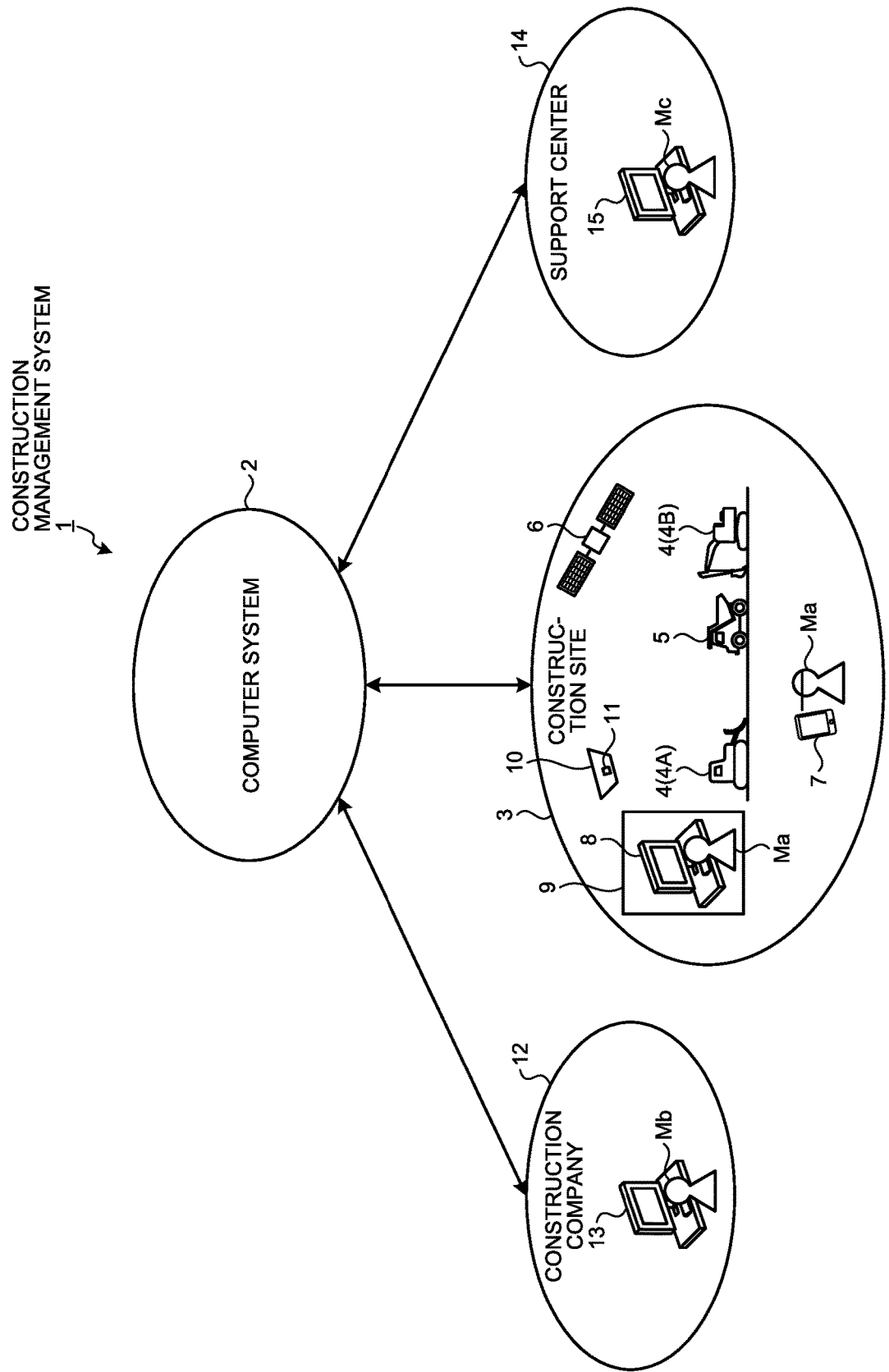
FIG. 1 is a diagram schematically illustrating a construction management system according to the present embodiment.

FIG. 1 is a diagram schematically illustrating a construction management system 1 according to the present embodiment. The construction management system 1 performs one or both of derivation of a construction plan and visualization of construction progress. The construction management system 1 includes a computer system 2 and performs construction planning and construction management for a construction site 3 of civil engineering work. A work machine is operated in the construction site 3. The work machines include, for example: a construction machine 4 that can perform cutting, banking, or leveling in the construction site 3; and a haulage vehicle 5 that can transport earth.

The construction machine 4 is an information and communication technology (ICT) construction machine that can perform computer aided construction. The construction machine 4 includes a bulldozer 4A having a work member and an excavator 4B. The work member represents a member having a blade edge and capable of performing cutting, banking, or leveling for a current topography of the construction site 3. The work members are a blade provided in the bulldozer 4A and a bucket provided in the excavator 4B. The bulldozer 4A performs excavating, cutting, dozing, banking, and leveling of earth in the construction site 3. The excavator 4B performs excavating, cutting, banking, and leveling of the earth.

The haulage vehicle 5 includes a dump truck having a vessel. Using the excavator 4B, earth is loaded on the haulage vehicle 5. For example, the haulage vehicle 5 transports earth from the construction site 3 to the outside of the construction site 3, and transports earth to the construction site 3 from outside the construction site 3.

Additionally, workers Ma perform work in the construction site 3. The workers Ma include an operator of the construction machine 4 and a worker performing supplementary work and the like in the construction site 3. Each worker Ma carries a portable terminal 7. The portable terminal 7 includes a portable computer such as a smartphone or a tablet type personal computer. Additionally, a site office 9 is provided in the construction site 3. An information terminal 8 such as a personal computer is installed in the site office 9. Each worker Ma performs work by using the portable terminal 7 or the information terminal 8.

Furthermore, a drone 10 to detect a current topography of the construction site 3 is operated in the construction site 3. The drone 10 is an unmanned air vehicle. The drone 10 includes an air vehicle remotely operated by radio and an air vehicle that automatically goes up and flies along a preset flight route and descends to a predetermined position. The drone 10 has a camera 11. The drone 10 flies above the construction site 3 with the camera 11 mounted thereon. The camera 11 is a first detection device that can detect a current topography of the construction site 3 in a non-contact manner. The camera 11 provided in the drone 10 aerially photographs the construction site 3 and detects the current topography in a non-contact manner.

The computer system 2 can perform data communication with a construction company 12. In the construction company 12, a design topography of the construction site 3 is created. The design topography is a target shape of a land surface in the construction site 3. An information terminal 13 such as a personal computer is installed in the construction company 12. A worker Mb in the construction company 12 uses the information terminal 13 to create two-dimensional or three-dimensional design topography data.

Furthermore, the computer system 2 can perform data communication with a support center 14 to support the construction site 3. In the support center 14, performed is change of the design topography requested from the construction site 3 or generation of three-dimensional image data. An information terminal 15 such as a personal computer is installed in the support center 14. A worker Mc in the support center 14 performs work by using the information terminal 15. Note that the computer system 2 may be disposed in the support center 14, and processing of the computer system 2 may be executed in the support center 14.

[Construction Machine]

Next, the construction machine 4 will be described. An absolute position indicating a position of a vehicle body of the construction machine 4 in a global coordinate system (XgYgZg coordinate system) is detected by a global positioning system (GPS) including a GPS satellite 6. A relative position indicating a position of a blade edge of a work member with respect to the vehicle body of the construction machine 4 in a local coordinate system (XYZ coordinate system) is detected by a detection device provided in the construction machine 4. The absolute position of the blade edge of the work member is calculated on the basis of the absolute position of the vehicle body and the relative position between the vehicle body and the blade edge of the work member.

Figure 2:
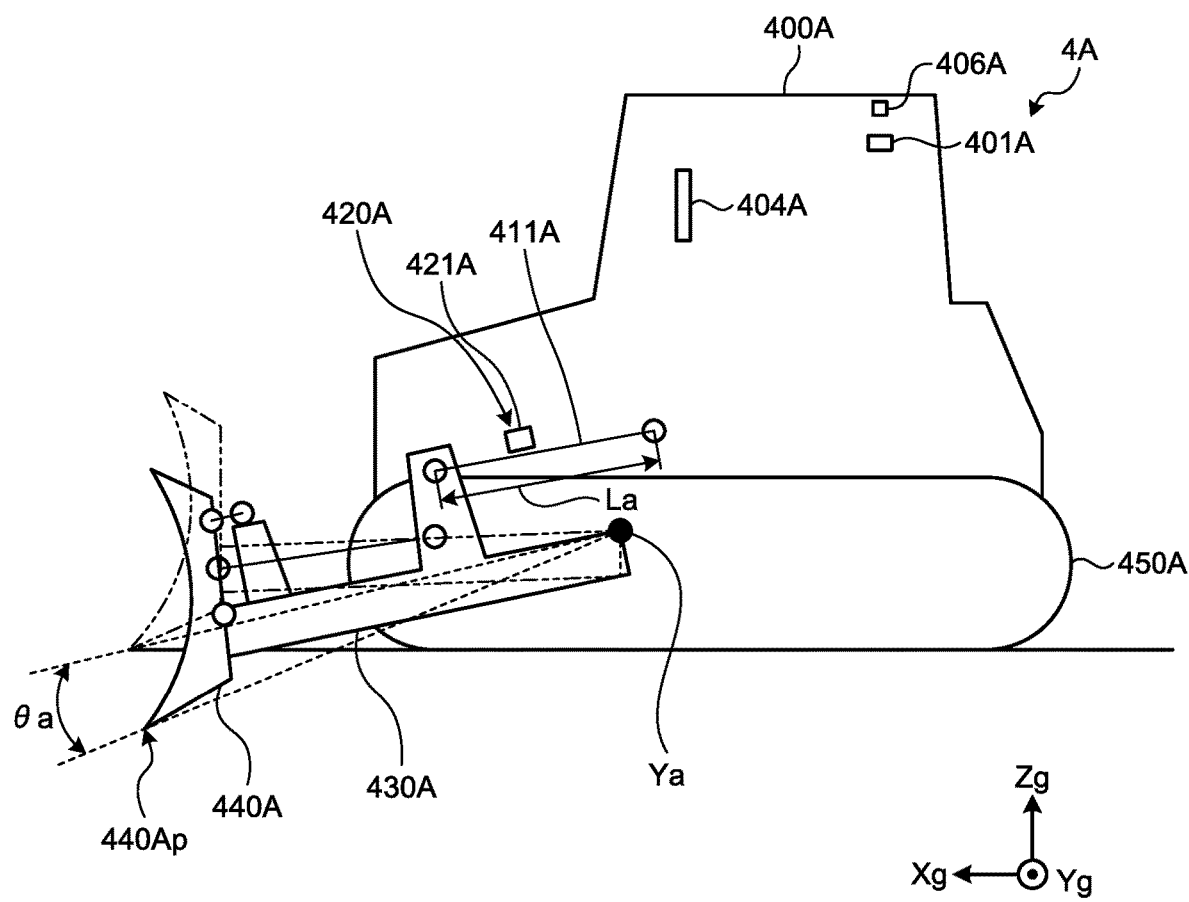
FIG. 2 is a view schematically illustrating a bulldozer according to the present embodiment.

FIG. 2 is a view schematically illustrating the bulldozer 4A. The bulldozer 4A includes a vehicle car body 400A, a GPS receiver 406A to detect an absolute position of the vehicle body 400A, a detection device 420A to detect a relative position of a blade edge 440Ap of a blade 440A with respect to the vehicle body 400A, and a blade control device 401A to control a position of the blade edge 440Ap of the blade 440A.

Furthermore, the bulldozer 4A includes a lift cylinder 411A that is a hydraulic cylinder, a lift cylinder sensor 421A to detect an operation amount of the lift cylinder 411A, a lift frame 430A to support the blade 440A, a travel device 450A to support the vehicle body 400A.

The vehicle body 400A includes an operator's compartment provided with an operation seat to be seated by an operator. In the operator's compartment, various kinds of operating devices and an output device 404A to display image data are disposed.

The travel device 450A includes a crawler. The lift frame 430A is supported by the vehicle body 400A in a manner movable in a vertical direction, centering an axis Ya parallel to a vehicle width direction. The blade 440A is supported by the vehicle body 400A via the lift frame 430A. The lift cylinder 411A is provided in a manner coupling the vehicle body 400A and the lift frame 430A. The lift cylinder 411A moves the lift frame 430A to vertically move the blade 440A. The blade edge 440Ap is disposed at a lower end portion of the blade 440A. The blade edge 440Ap contacts the land surface of the construction site 3 in leveling work and cutting work (excavating work).

The GPS receiver 406A is provided in the vehicle body 400A. A GPS antenna is provided in the vehicle body 400A. The GPS antenna outputs, to the GPS receiver 406A, a signal corresponding to a radio wave received from the GPS satellite 6. The GPS receiver 406A acquires absolute position data indicating an absolute position of an own vehicle. The absolute position data indicating the absolute position of the vehicle body 400A is acquired by the GPS receiver 406A acquiring the absolute position of the own vehicle.

The detection device 420A includes the lift cylinder sensor 421A. The lift cylinder sensor 421A detects lift cylinder length data La indicating a stoke length of the lift cylinder 411A. The blade control device 401A calculates a lift angle θa of the blade 404A on the basis of the lift cylinder length data La. The lift angle θa corresponds to a downward angle from an original position of the blade 440A, namely, an intrusive depth of the blade edge 440Ap into the ground or a height from the ground. In FIG. 2, the original positions of the lift frame 430A and the blade 440A are indicated by two-dot chain lines. In the case where the lift frame 430A and the blade 440A are positioned at the original positions, the blade edge 440Ap of the blade 440A contact the land surface. The bulldozer 4A travels forward while keeping the blade 440A lowered from the original position, thereby performing leveling work and cutting work (excavating work) by the bulldozer 4A.

Additionally, the bulldozer 4A includes an angle cylinder that can move the blade 440A in a rotational direction (angle direction), a tilt cylinder that can move the blade 440A in a rotation direction (tilt direction), an angle cylinder sensor to detect angle cylinder length data, and a tilt cylinder sensor to detect tilt cylinder length data, although not illustrated.

The detection device 420A also includes an angle cylinder sensor and a tilt cylinder sensor in addition to the lift cylinder sensor 421A. The lift cylinder length data detected by the lift cylinder sensor 421A, the angle cylinder length data detected by the angle cylinder sensor, and the tilt cylinder length data detected by the tilt cylinder sensor are output to the blade control device 401A. The blade control device 401A calculates a relative position of the blade edge 440Ap of the blade 440A with respect to the vehicle body 400A on the basis of the lift cylinder length data, angle cylinder length data, and tilt cylinder length data. The blade control device 401A calculates an absolute position of the blade edge 440Ap of the blade 440A on the basis of the calculated relative position of the blade edge 440Ap of the blade 440A with respect to the vehicle body 400A and the absolute position of the vehicle body 400A acquired by the GPS receiver 406A.

Figure 3:
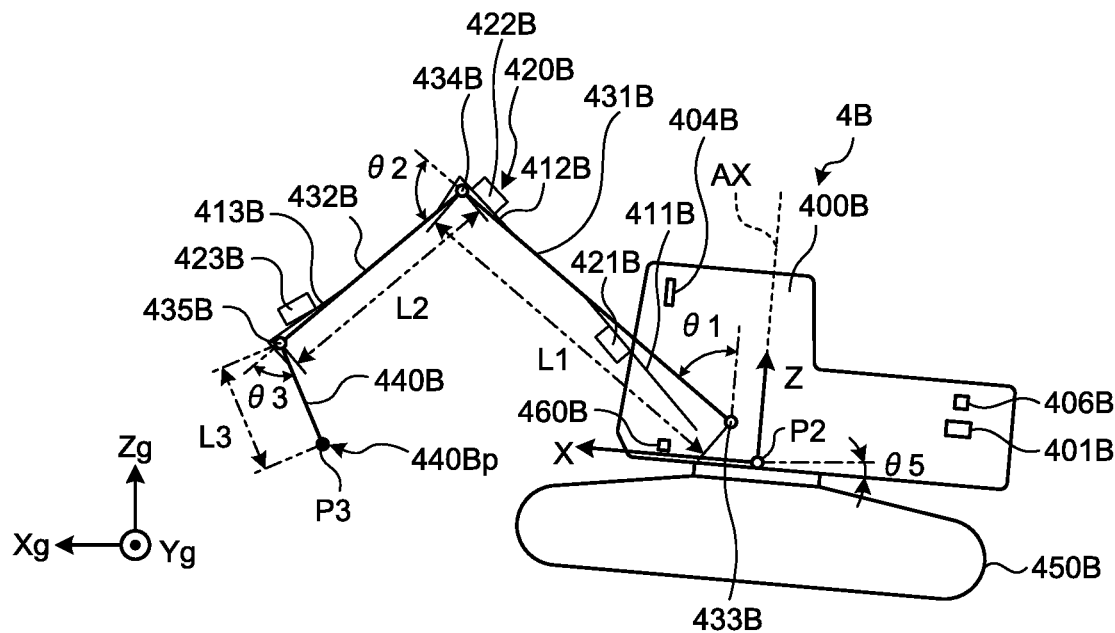
FIG. 3 is a view schematically illustrating an excavator according to the present embodiment.
Figure 4:
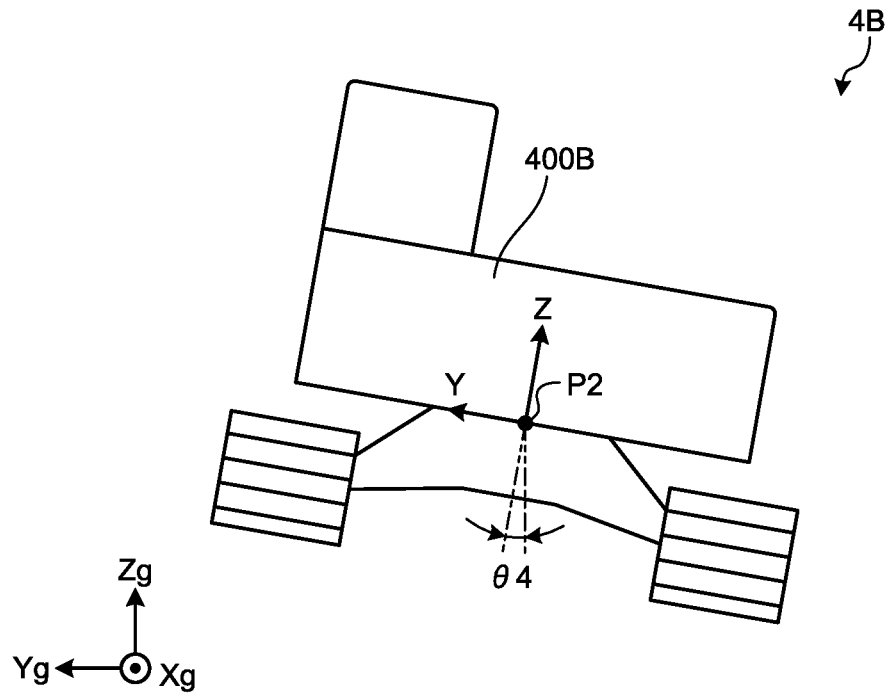
FIG. 4 is a view schematically illustrating the excavator according to the present embodiment.

FIGS. 3 and 4 are views schematically illustrating the excavator 4B. The excavator 4B includes a vehicle car body 400B, a GPS receiver 406B to detect an absolute position of the vehicle body 400B, a detection device 420B to detect a relative position of a blade edge 440Bp of a bucket 440B with respect to the vehicle body 400B, and a bucket control device 401B to control a position of the blade edge 440Bp of the bucket 440B.

Additionally, the excavator 4B includes: a boom 431B connected to the vehicle body 400B via a boom pin 433B; and an arm 432B connected to the boom 431B via an arm pin 434B. The bucket 440B is connected to the arm 432B via a bucket pin 435B.

Furthermore, the excavator 4B includes a boom cylinder 411B to drive the boom 431B, an arm cylinder 412B to drive the arm 432B, a bucket cylinder 413B to drive the bucket 440B, a boom cylinder stroke sensor 421B to detect an operation amount of the boom cylinder 411B, an arm cylinder stroke sensor 422B to detect an operation amount of the arm cylinder 412B, and a bucket cylinder stroke sensor 423B to detect an operation amount of the bucket cylinder 413B. The boom cylinder 411B, arm cylinder 412B, and bucket cylinder 413B are hydraulic cylinders.

Additionally, the excavator 4B includes: a travel device 450B to support the vehicle body 400B; and an inertial measurement unit (IMU) 460B. The vehicle body 400B is supported by the travel device 450B. The vehicle body 400B is an upper swing body that can swing around a swing axis AX. Note that points P2 illustrated in FIGS. 3 and 4 is a point located on the swing axis AX and indicates an origin of a local coordinate system (XYZ coordinate system).

The vehicle body 400B includes an operator's compartment provided with an operation seat to be seated by an operator. In the operator's compartment, various kinds of operating devices and an output device 404B to display image data are disposed.

The travel device 450B includes a crawler. The blade edge 440Bp is disposed at an end portion of the bucket 440B. The blade edge 440Bp contacts the land surface of the construction site 3 in leveling work and cutting work (excavating work).

The GPS receiver 406B is provided in the vehicle body 400B. A GPS antenna is provided in the vehicle body 400B. The GPS antenna outputs, to the GPS receiver 406B, a signal corresponding to a radio wave received from the GPS satellite 6. The GPS receiver 406B acquires absolute position data indicating an absolute position of an own vehicle. The absolute position data indicating the absolute position of the vehicle body 400B is acquired by the GPS receiver 406B acquiring the absolute position of the own vehicle.

The detection device 420B includes the boom cylinder stroke sensor 421B, arm cylinder stroke sensor 422B, and bucket cylinder stroke sensor 423B. The boom cylinder stroke sensor 421B detects boom cylinder length data indicating a stroke length of the boom cylinder 411B. The arm cylinder stroke sensor 422B detects arm cylinder length data indicating a stroke length of the arm cylinder 412B. The bucket cylinder stroke sensor 423B detects bucket cylinder length data indicating a stroke length of the bucket cylinder 413B.

The bucket control device 401B calculates an inclination angle θ1 of the boom 431B with respect to a vertical direction of the vehicle body 400B on the basis of the boom cylinder length data. The bucket control device 401B calculates an inclination angle 82 of the arm 432B with respect to the boom 431B on the basis of the arm cylinder length data. The bucket control device 401B calculates an inclination angle θ3 of the blade edge 440Bp of the bucket 440B with respect to the arm 432B on the basis of the bucket cylinder length data. The bucket control device 401B calculates a relative position of the blade edge 440Bp of the bucket 440B with respect to the vehicle body 400B on the basis of the inclination angle θ1, the inclination angle θ2, the inclination angle θ3, a length L1 of the boom 431B, a length L2 of the arm 432B, and a length L3 of the bucket 440B. The length L1 of the boom 431B is a distance between the boom pin 433B and the arm pin 434B. The length L2 of the arm 432B is a distance between the arm pin 434B and the bucket pin 435B. The length L3 of the bucket 440 is a distance between the bucket pin 435B and the blade edge 440Bp of the bucket 440B.

The IMU 460B is provided in the vehicle body 400B. The IMU 460B detects: an inclination angle θ4 with respect to a lateral direction of the vehicle body 400B; and an inclination angle θ5 with respect to a longitudinal direction of the vehicle body 400B.

The bucket control device 401B calculates an absolute position of the blade edge 440Bp of the bucket 440B on the basis of the calculated relative position of the blade edge 440Bp of the bucket 440B with respect to the vehicle body 400B and the absolute position of the vehicle body 400B acquired by the GPS receiver 406B and the IMU 460B.

Figure 5:
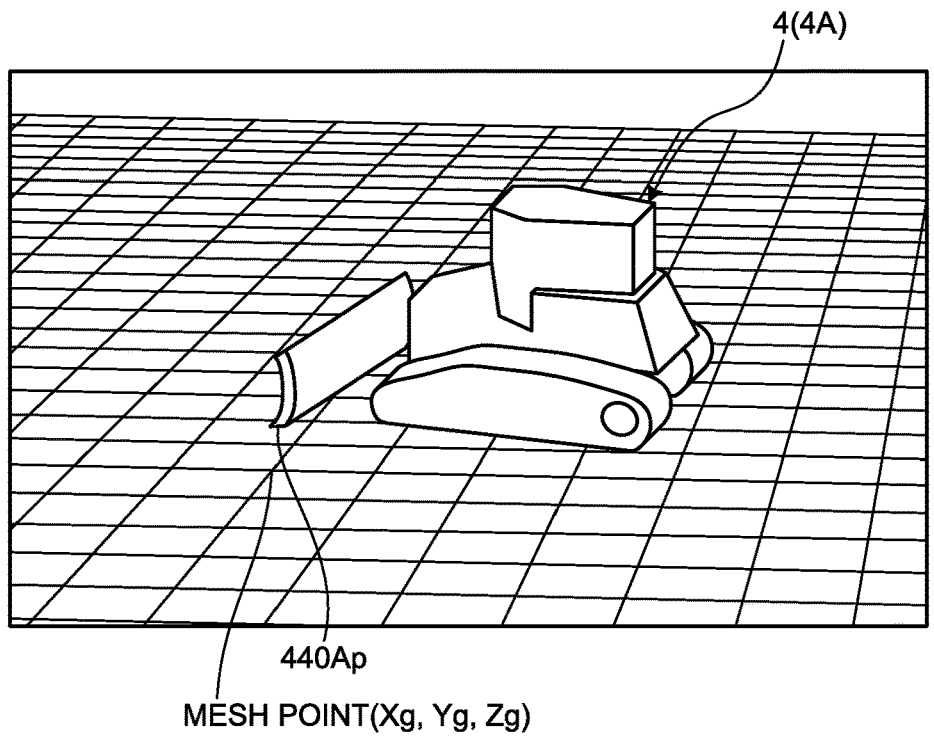
FIG. 5 is a view schematically illustrating computer aided construction according to the present embodiment.
Figure 6:
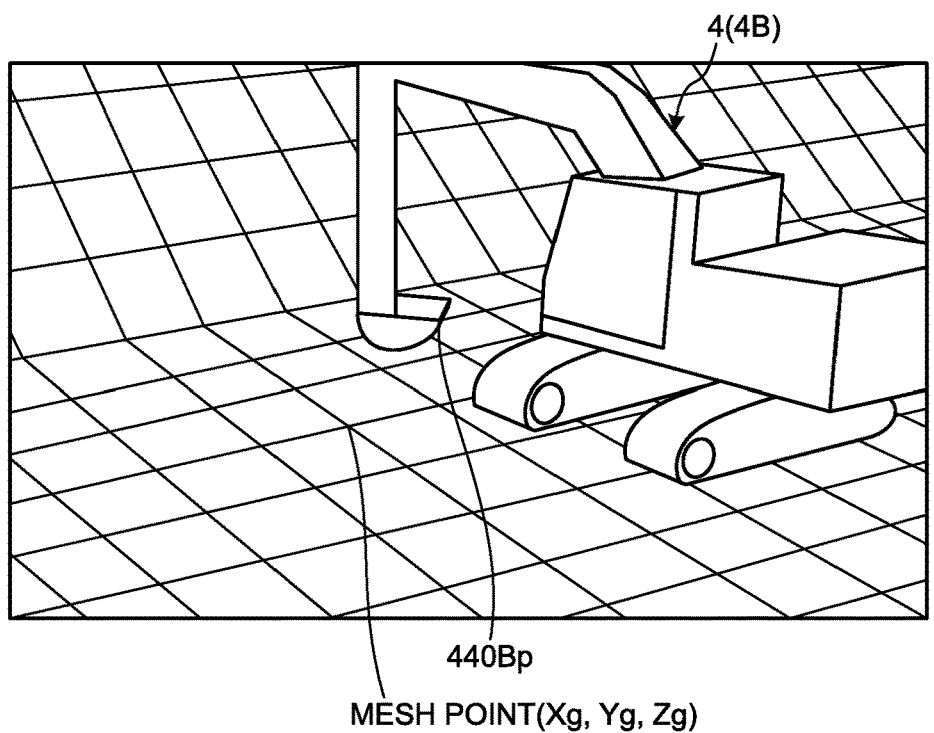
FIG. 6 is a view schematically illustrating the computer aided construction according to the present embodiment.

The construction machine 4 can acquire current topography data indicating a current topography of the land surface of the construction site 3. FIG. 5 is a schematic view illustrating a state in which the bulldozer 4A acquires current topography data, and FIG. 6 is a schematic view illustrating a state in which the excavator 4B acquires current topography data. As illustrated in FIG. 5, a mesh is set in a current topography of the land surface in the construction site 3. The bulldozer 4A can detect an absolute position (a position in an Xg axis direction, a position in a Yg axis direction, and a position in a Zg axis direction) of the blade edge 440Ap. The bulldozer 4A can acquire positional data in each of a plurality of mesh points by making the blade edge 440Ap contact the mesh points representing intersections of the mesh. Similarly, as illustrated in FIG. 6, the excavator 4B can acquire positional data in each of a plurality of mesh points by making the blade edge 440Bp contact the mesh points representing intersections of the mesh. The current topography data of the construction site 3 is acquired by acquiring the positional data of the plurality of mesh points, namely, a track of a blade edge 440p (blade edge 440Ap, blade edge 440Bp). Meanwhile, in the case where the bulldozer 4A or the excavator 4B travels by driving the crawler included in a travel device 450 (450A, 450B), a travel track of the crawler may be acquired as current topography data of the construction site 3 by acquiring a track formed of positions where the crawler has contacted the land surface during travel (travel track of the crawler) on the basis of size information of the vehicle body and absolute position data indicating an absolute position of the own vehicle by a GPS receiver 406 (406A, 406B).

Note that current topography data may be acquired by a stereo camera mounted on the construction machine 4 or a vehicle different from the construction machine 4. The stereo camera can acquire image data of the land surface of the construction site 3 and detect a current topography from the image data. Note that current topography data may be acquired by a three-dimensional laser scanner device mounted on the construction machine 4 or a vehicle different from the construction machine 4. The laser scanner device can optically detect the current topography by irradiating the land surface of the construction site 3 with laser beams as detection light.

Figure 7:
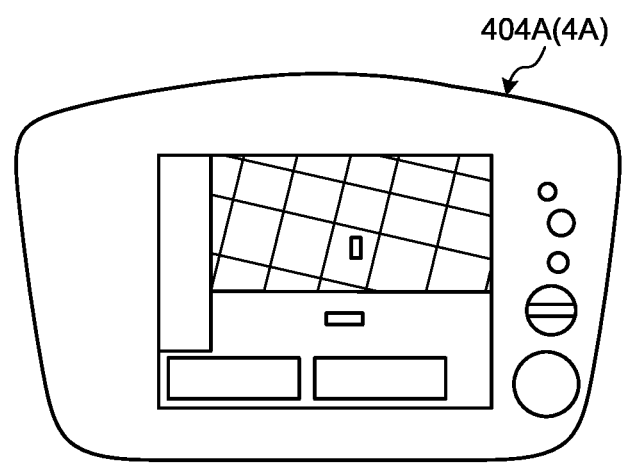
FIG. 7 is a view schematically illustrating an output device provided in the bulldozer according to the present embodiment.
Figure 8:
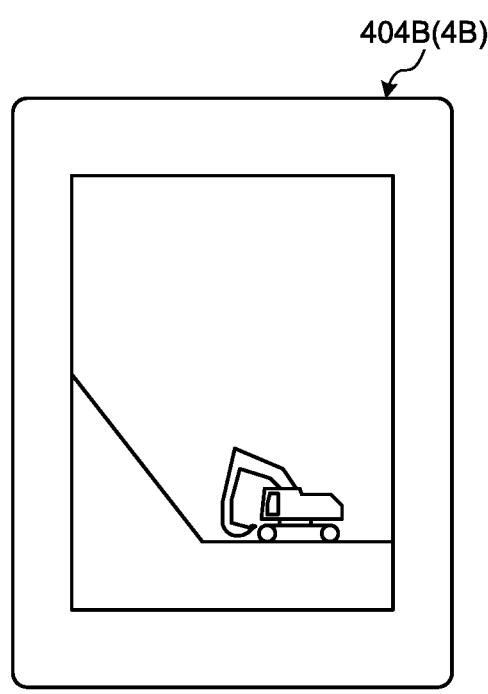
FIG. 8 is a view schematically illustrating an output device provided in the excavator according to the present embodiment.

FIG. 7 is a view illustrating an exemplary output device 404A provided in the operator's compartment of the bulldozer 4A, and FIG. 8 is a view illustrating an exemplary output device 404B provided in the operator's compartment of the excavator 4B. As illustrated in FIGS. 7 and 8, an output device 404 (output device 404A, output device 404B) of the construction machine 4 (bulldozer 4A, excavator 4B) includes a display device that can display image data. Design topography data and the construction machine 4 are displayed on the output device 404. An operator of the construction machine 4 can perform leveling work or cutting work (excavating work) while watching image data displayed on the output device 404.

Thus, the absolute position of a vehicle body 400 (vehicle body 400A, vehicle body 400B) of the construction machine 4 (bulldozer 4A, excavator 4B) is detected by the GPS receiver 406 (406A, 406B) mounted on the vehicle body 400, and the GPS including the GPS satellite 6. Furthermore, the construction machine 4 includes a detection device 420 (detection device 420A, detection device 420B) that can detect a relative position of the blade edge 440p (blade edge 440Ap, blade edge 440Bp) of the work member 440 (blade 440A, bucket 440B) with respect to the vehicle body 400. The construction machine 4 can acquire an absolute position of the work member 440 on the basis of the absolute position of the vehicle body 400 and the relative position of the work member 440 with respect to the vehicle body 400. The construction machine 4 can perform data communication with the computer system 2. The design topography data is transmitted from the computer system 2 to the construction machine 4. The construction machine 4 controls the work member 440 on the basis of the design topography data corresponding to a target shape of an excavating object such that the blade edge 440p of the work member 440 is moved along a design topography.

Additionally, the construction machine 4 can acquire current topography data of the construction site 3 by using the blade edge 440p. Furthermore, the construction machine 4 can acquire construction actual achievement data on the basis of an absolute position of the blade edge 440p of the work member 440 during operation. The current topography data or the construction actual achievement data acquired by the construction machine 4 is transmitted to the computer system 2.

[Drone]

Figure 9:
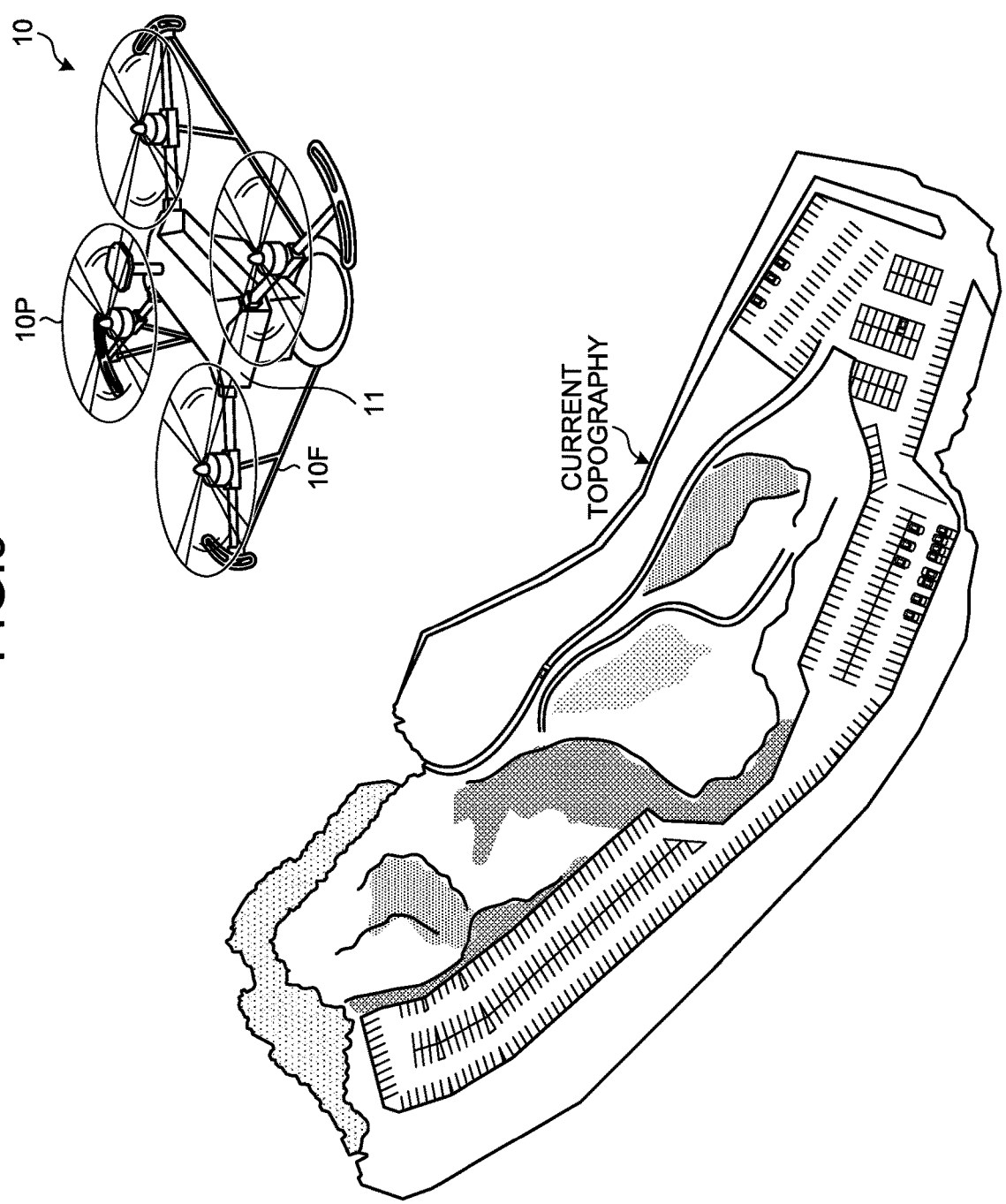
FIG. 9 is a view illustrating a method of acquiring current topography data according to the present embodiment.

FIG. 9 is a view schematically illustrating the drone 10. The drone 10 is an unmanned aerial vehicle that can fly above the construction site 3. A survey for the construction site 3 is performed by the drone 10. The drone 10 is an unmanned helicopter having a propeller 10P. The drone 10 includes a frame member 10F, a camera 11 supported by the frame member 10F, and a propeller 10P provided at the frame member 10F. The drone 10 flies in the air by the propeller 10P rotating. The drone 10 may automatically fly along a flight route while comparing a predetermined flight route with an own current position, or may be remotely controlled by a radio signal from a radio controller held by an operator on the ground and may be made to fly along a flight route intended by the operator. A current topography of the construction site 3 is aerially photographed by the camera 11 of the drone 10. Image data of the current topography acquired by the camera 11 is stored in a storage device 102 described later. The image data stored in the storage device 102 is downloaded from the storage device 102 to a computer on the ground wirelessly or by wire. The image data downloaded to the computer is converted into three-dimensional current topography data indicating the current topography of the construction site 3 by conversion software incorporated in the computer. Consequently, three-dimensional current topography data is acquired. Note that the conversion software may be stored in the storage device 102 of the drone 10, and the three-dimensional current topography data may also be generated by a processor 101 included in the drone 10.

[Hardware Configuration]

Figure 10:
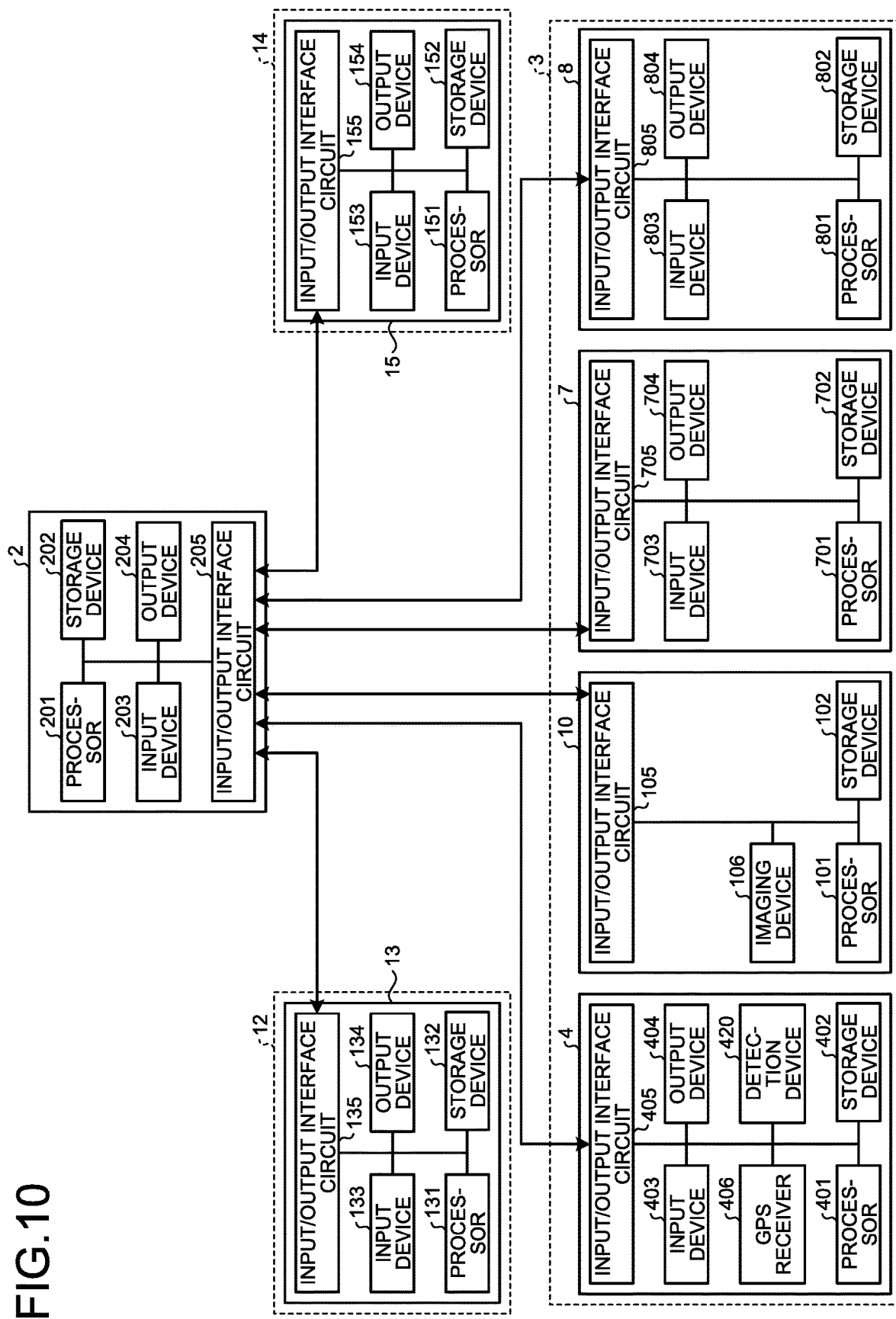
FIG. 10 is a diagram illustrating a hardware configuration of a construction management system according to the present embodiment.

FIG. 10 is a diagram illustrating a hardware configuration of the construction management system 1. The computer system 2 includes: a processor 201 such as a central processing unit (CPU); a storage device 202 including an internal memory such as a read only memory (ROM) or a random access memory (RAM), and an external memory such as a hard disk drive; an input device 203 including input devices such as a keyboard, a mouse, and a touch panel; an output device 204 including a display device like a flat panel display device, and a printing device like an ink jet printer; and an input/output interface circuit 205 including a wired communication device or a wireless communication device.

The information terminal 13 installed in the construction company 12 includes a processor 131, a storage device 132, an input device 133, an output device 134, and an input/output interface circuit 135 including a wired communication device or a wireless communication device.

The construction machine 4 operated in the construction site 3 includes a processor 401, a storage device 402, an input device 403, an output device 404, a GPS receiver 406, a detection device 420, and an input/output interface circuit 405 including a wired communication device or a wireless communication device.

The drone 10 operated in the construction site 3 includes the processor 101, the storage device 102, an imaging device 106 of the camera 11, and an input/output interface circuit 105 including a wired communication device or a wireless communication device.

The portable terminal 7 used in the construction site 3 includes a processor 701, a storage device 702, an input device 703, an output device 704, and an input/output interface circuit 705 including a wired communication device or a wireless communication device.

The information terminal 8 installed in the construction site 3 includes a processor 801, a storage device 802, an input device 803, an output device 804, and an input/output interface circuit 805 including a wired communication device or a wireless communication device.

The information terminal 15 installed in the service center 14 includes a processor 151, a storage device 152, an input device 153, an output device 154, and an input/output interface circuit 155 including a wired communication device or a wireless communication device.

The computer system 2 can perform data communication with the construction machine 4, haulage vehicle 5, portable terminal 7, information terminal 8, and drone 10 in the construction site 3. The portable terminal 7 and the information terminal 8 perform data communication with the computer system 2 via the Internet. The construction machine 4, haulage vehicle 5, and drone 10 perform data communication with the computer system 2 wirelessly via a communication satellite line or a portable phone line. Note that the construction machine 4, haulage vehicle 5, and drone 10 may also perform data communication with the computer system 2 wirelessly by using other communication mode such as a wireless LAN like Wi-Fi.

Furthermore, the computer system 2 performs data communication with the information terminal 13 of the construction company 12 via the Internet. The computer system 2 performs data communication with the information terminal 15 of the support center 14 via the Internet.

[Computer System]

Figure 11:
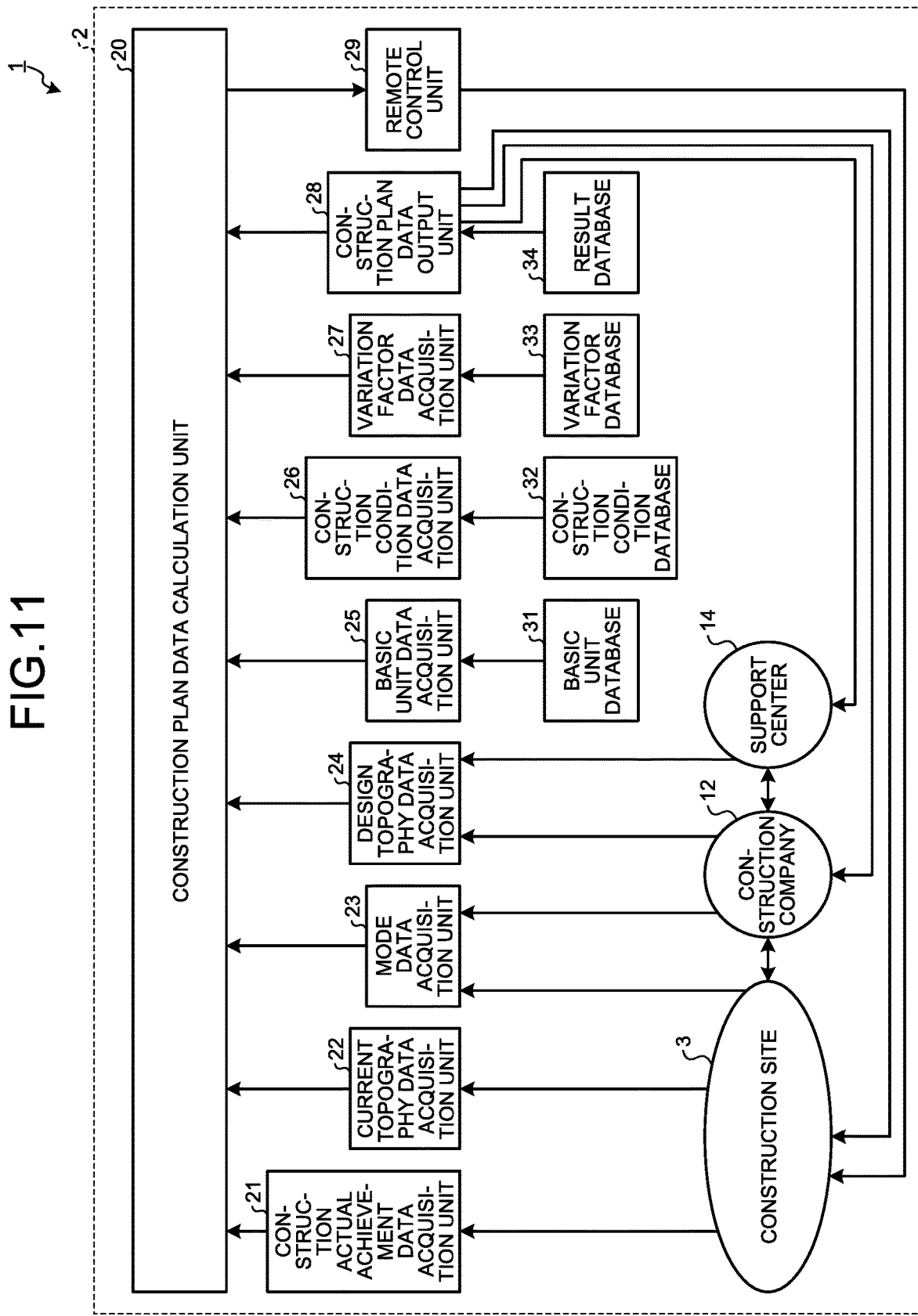
FIG. 11 is a functional block diagram illustrating the construction management system according to the present embodiment.

FIG. 11 is a functional block diagram illustrating the construction management system 1. The computer system 2 includes a construction plan data calculation unit 20, a construction actual achievement data acquisition unit 21, a current topography data acquisition unit 22, a mode data acquisition unit 23, a design topography data acquisition unit 24, a basic unit data acquisition unit 25, a construction condition data acquisition unit 26, a variation factor data acquisition unit 27, a construction plan data output unit 28, and a remote control unit 29.

Furthermore, the computer system 2 includes a basic unit database 31, a construction condition database 32, a variation factor database 33, and a result database 34.

The processor 201 includes the construction plan data calculation unit 20, construction actual achievement data acquisition unit 21, current topography data acquisition unit 22, mode data acquisition unit 23, design topography data acquisition unit 24, basic unit data acquisition unit 25, construction condition data acquisition unit 26, variation factor data acquisition unit 27, construction plan data output unit 28, and remote control unit 29. The storage device 202 includes the basic unit database 31, construction condition database 32, variation factor database 33, and result database 34.

<Current Topography Data Acquisition Unit>

The current topography data acquisition unit 22 acquires current topography data indicating a current topography of the construction site 3. The current topography data is detected by the camera 11 provided in the drone 10. The current topography data acquisition unit 22 acquires the current topography data from the camera 11 of the drone 10, for example, wirelessly. Note that the current topography data acquisition unit 22 may also acquire current topography data from a stereo camera mounted on the construction machine 4 or a vehicle different from the construction machine 4, or may also acquire current topography data from a three-dimensional laser scanner device.

<Design Topography Data Acquisition Unit>

The design topography data acquisition unit 24 acquires design topography data indicating a design topography of the construction site 3. The design topography is created in the construction company 12. The design topography data acquisition unit 24 acquires the design topography data from the information terminal 13 of the construction company 12 via the Internet.

<Basic Unit Data Acquisition Unit>

The basic unit data acquisition unit 25 acquires basic unit data indicating conditions of a work machine that performs construction in the construction site 3. The basic unit data is stored in the basic unit database 31. The basic unit data acquisition unit 25 acquires the basic unit data from the basic unit database 31.

The conditions of a work machine in the basic unit data include at least one of a type, a vehicle class of a work machine, and the number of work machines that can be procured for the construction site 3. The conditions of a work machine also include a management state of a work machine that can be procured.

Furthermore, the conditions of a work machine in the basic unit data include a workload that can be performed by the work machine per unit time. The workload that can be performed by the work machine per unit time is an index indicating work capacity of the work machine and corresponds to an earth amount that can be moved by the work machine per unit time. The workload that can be performed by the work machine per unit time is also referred to as a construction work basic unit. In the case where the work machine is the bulldozer 4A, a workload of the bulldozer 4A represents to a dozing amount (earth amount that can be dozed) and a banking amount (earth amount that can be banked) which can be executed by the bulldozer 4A per unit time. In the case where the work machine is the excavator 4B, a workload of the excavator 4B represents a loading amount (amount that can be loaded on the haulage vehicle 5), a cutting amount (amount that can be excavated), and a banking amount (earth amount that can be banked) which can be executed by the excavator 4B per unit time. In the case where the work machine is the haulage vehicle 5, a workload of the haulage vehicle 5 represents an earth amount that can be transported by the haulage vehicle 5 per unit time.

The workload that can be performed by the construction machine 4 per unit time depends on a size of the work member 440. The larger the size of the work member 440, the larger the workload is, and the smaller the size of the work member 440 is, the smaller the workload is. Therefore, the workload of the work machine 4 includes the size of the work member 440. The workload of the bulldozer 4A includes a size of the blade 440A, and the workload of the excavator 4B includes a size of the bucket 440B (bucket capacity).

Furthermore, the basic unit data further includes conditions of a worker Ma in the construction site 3. The conditions of a worker Ma include the number of workers Ma who can be procured for the construction site 3. Additionally, the conditions of a worker include a skill of a worker Ma who can be procured.

In other words, the basic unit data is data indicating resources required for construction, such as the conditions of a work machine and the conditions of a worker. The basic unit data is known data that can be acquired prior to construction and is held in the basic unit database 31.

<Construction Condition Data Acquisition Unit>

The construction condition data acquisition unit 26 acquires construction condition data indicating construction conditions of the construction site 3. The construction conditions include matters set in the construction company 12. The construction condition data is stored in the construction condition database 32. The construction condition data acquisition unit 26 acquires the construction condition data from the construction condition database 32.

The construction condition data includes at least one of a budget, a construction period, work details, a work procedure, a working period, and a site environment related to construction. The site environment includes at least one of a topography of the construction site 3 and a size of the construction site 3. The construction condition data is known data set prior to construction and is held in the construction condition database 32.

<Variation Factor Data Acquisition Unit>

The variation factor data acquisition unit 27 acquires variation factor data indicating a variation factor of the construction site 3. The variation factor data includes variation factors such as a natural environment of the construction site 3, and influences work efficiency of construction. The variation factor data is stored in the variation factor database 33. The variation factor data acquisition unit 27 acquires the variation factor data from the variation factor database 33.

The variation factor data includes soil property data indicating a type and a state of earth in the construction site 3. Additionally, the variation factor data includes buried object data indicating a buried object in underground of the construction site 3. Furthermore, the variation factor data includes weather data for the construction site 3. The soil property data and buried object data are acquired from a preliminary survey conducted prior to construction. As a preliminary survey, a boring survey is exemplified. The weather data is acquired from the meteorological agency or a weather company. The variation factor data acquired prior to construction is stored in the variation factor database 33.

<Construction Actual Achievement Data Acquisition Unit>

The construction actual achievement data acquisition unit 21 acquires construction actual achievement data indicating construction actual achievement in the construction site 3. The construction actual achievement data is data indicating construction actual achievement performed by the construction machine 4. The construction machine 4 acquires own construction actual achievement data. The construction machine 4 can detect a current topography on the basis of: a track of an absolute position of the blade edge 440$p$ of the work member 440 which contacts the current topography; or a travel track of the crawler. The construction machine 4 compares the current topography detected from the absolute position of the blade edge 440$p$ with a design topography which is a target shape, and can acquire the construction actual achievement data indicating progress of work (cutting or banking of earth) relative to the design topography. The construction actual achievement data acquisition unit 21 wirelessly acquires the construction actual achievement data from the construction machine 4. Note that the computer system 2 may also acquire current topography data from the construction machine 4 and acquire the construction actual achievement data by comparing a current topography with a design topography. Note that the construction actual achievement data acquisition unit 21 may also acquire construction actual achievement data by comparing a design topography with a current topography detected by a stereo camera mounted on the construction machine 4 or a vehicle different from the construction machine 4, or may also acquire construction actual achievement data by comparing a design topography with a current topography detected by a three-dimensional laser scanner device.

<Mode Data Acquisition Unit>

The mode data acquisition unit 23 acquires mode data indicating a construction priority item. Details of the mode data will be described later. The construction priority item is selected by a worker Ma in the construction site 3 or a worker Mb in the construction company 12. The worker Ma operates the input device 703 of the portable terminal 7 or the input device 803 of the information terminal 8 to input the construction priority item. The worker Mb operates the input device 133 of the information terminal 13 to input the construction priority item. The mode data acquisition unit 23 acquires mode data indicating the construction priority item from at least one of the portable terminal 7, information terminal 8, and information terminal 13 via, for example, the Internet.

The mode data includes at least one of construction period priority mode data that prioritizes a construction period and cost priority mode data that prioritizes a construction cost. In the case of wishing to finish construction early, the worker Ma or the worker Mb selects a construction period as a construction priority item, and operates the input device 703, input device 803, or input device 133. Since the input device is operated, the construction period priority mode data that prioritizes the construction period is acquired by the mode data acquisition unit 23. On the other hand, in the case of wishing to perform construction at a low cost, the worker Ma or the worker Mb selects a cost as a construction priority item, and operates the input device. Since the input device is operated, the cost priority mode data that prioritizes the construction cost is acquired by the mode data acquisition unit 23

<Construction Plan Data Calculation Unit>

The construction plan data calculation unit 20 calculates construction plan data indicating a construction plan for the construction site 3 on the basis of current topography data acquired by the current topography data acquisition unit 22, design topography data acquired by the design topography data acquisition unit 24, and basic unit data acquired by the basic unit data acquisition unit 25.

The construction plan data calculation unit 20 calculates construction plan data indicating a construction plan for the construction site 3 by collating a current topography data with a design topography data.

The construction plan data includes at least one of construction range data indicating a construction range in the construction site 3, earth cutting plan data, and earth banking plan data.

The cutting plan data includes at least one of cutting region data indicating a region requiring earth cutting (excavating) in the construction range, and cutting amount data indicating a earth cutting amount (excavating amount) in the construction range. The banking plan data includes at least one of banking region data indicating a region requiring earth banking (filling) in the construction range, and banking amount data indicating an earth banking amount in the construction range.

The cutting amount data includes at least one of: cutting numerical data indicating a value of an earth cutting amount; and cutting image data (icon or animation) illustrating the earth cutting amount. The banking amount data includes at least one of: banking numerical data indicating a value of an earth banking amount; and cutting image data (icon or animation) illustrating the earth banking amount.

The construction range data is data indicating a range in which a current topography is changed on the basis of a design topography data. The construction range data indicates a construction range or a construction amount indicating a difference between the current topography data and the design topography data.

In the following description, cutting amount data indicating an earth cutting amount in the construction range, or banking amount data indicating an earth banking amount in the construction range will be suitably referred to as soil amount data. The soil amount data indicates an amount of earth to be excavated in the construction range (excavating amount or cutting amount), or an amount of earth charged in the construction range (filling amount or banking amount).

The construction plan data calculation unit 20 calculates a cutting region and a cutting amount from a current topography and a banking region and a banking amount to the current topography by collating the current topography with the design topography data. The construction plan data calculation unit 20 calculates construction plan data on the basis of calculated construction range data, soil amount data, and basic unit data.

Additionally, the construction plan data includes at least one of work machine data indicating a type, a vehicle class, and the number of work machines to be used in the construction site 3, a construction time schedule data indicating a construction time schedule of construction in which the work machine is used, and cost data indicating a cost required for the construction. The construction time schedule data includes at least one of flow data indicating a work procedure of construction, working period data indicating a working period for each work of the construction, and construction period data indicating a period until the construction is completed.

Furthermore, the construction plan data calculation unit 20 calculates construction plan data on the basis of the calculated construction range data, soil amount data indicating a cutting amount or a banking amount of earth in a construction range, and basic unit data.

Additionally, in the case where construction condition data is acquired by the construction condition data acquisition unit 26, the construction plan data calculation unit 20 calculates construction plan data on the basis of the current topography data, design topography data, basic unit data, and construction condition data.

Furthermore, in the case where variation factor data is acquired by the variation factor data acquisition unit 27, the construction plan data calculation unit 20 calculates construction plan data on the basis of the current topography data, design topography data, basic unit data, and variation factor data.

Additionally, in the case where mode data is acquired by the mode data acquisition unit 23, the construction plan data calculation unit 20 calculates construction plan data on the basis of the current topography data, design topography data, basic unit data, and mode data.

Furthermore, in the case where construction actual achievement data is acquired by the construction actual achievement data acquisition unit 21, the construction plan data calculation unit 20 recalculates construction plan data on the basis of the construction actual achievement data.

Additionally, the construction plan data calculation unit 20 calculates construction plan data for each construction process. Furthermore, the construction plan data calculation unit 20 calculates construction plan data for each construction day.

The construction plan data is calculated on the basis of the current topography, design topography, and basic unit data. As described above, the basic unit data indicates conditions of a work machine including at least one of a type, a vehicle class of a work machine, and the number of work machines. In other words, the basic unit data indicates work capacity of a work machine that can be used in the construction site. The construction plan data calculation unit 20 can estimate, on the basis of a cutting region and a cutting amount from a current topography and the basic unit data indicating capacity of a work machine, a period within which a cutting process is completed in accordance with a type or a class of a work machine and the number of used work machines. Similarly, the construction plan data calculation unit 20 can estimate, on the basis of a banking region and a banking amount from the current topography and basic unit data indicating capacity of a work machine, a period within which a banking process is completed in accordance with on a type or a class of a work machine and the number of used work machines. Therefore, the construction plan data calculation unit 20 can calculate construction plan data indicating a period until the cutting process and the banking process are completed in the case of using a work machine derived from the basic unit data, on the basis of a current topography derived from the current topography data acquired by the current topography data acquisition unit 22, a design topography derived from the design topography data acquired by the design topography data acquisition unit 24, and the basic unit data acquired by the basic unit data acquisition unit 25.

Furthermore, the construction plan data calculation unit 20 calculates flow data indicating a working procedure of construction on the basis of the current topography and the design topography. For example, in the case of performing banking in a region requiring banking and in the case where banking can be performed without transporting earth from the outside of the construction site by using cut earth in a construction range, the construction plan data calculation unit 20 calculates flow data such that banking is performed by using the cut earth existing at a position of a height (altitude) higher than the region requiring banking. Since the flow data is calculated such that earth is transported from the high position to a low position, a work burden is reduced and work efficiency is improved.

<Construction Plan Data Output Unit>

The construction plan data output unit 28 outputs construction plan data calculated by the construction plan data calculation unit 20. The construction plan data output unit 28 outputs the construction plan data to the result database 34. In the following description, the construction plan data output unit 28 may be simply referred to as a data output unit 28.

Additionally, the construction plan data output unit 28 outputs, via the Internet, the construction plan data calculated by the construction plan data calculation unit 20 to at least one of the portable terminal 7, the information terminal 8 provided in the construction site 3, the information terminal 13 provided in the construction company 12, and the information terminal 15 provided in the support center 14. Each of the output device 704 of the portable terminal 7, the output device 804 of the information terminal 8, the output device 134 of the information terminal 13, and the output device 154 of the information terminal 15 function as a first output device that can output construction plan data.

Each of the output device 704 of the portable terminal 7, the output device 704 of the information terminal 8, the output device 134 of the information terminal 13, and the output device 154 of the information terminal 15 includes a display device capable of displaying display image data. Each of the output device 704, output device 804, output device 134, and output device 154 includes a flat panel display such as a liquid crystal display. Each of the portable terminal 7, information terminal 8, information terminal 13, and information terminal 15 converts construction plan data into image data, and display the image data on each of the output device 704, output device 804, output device 134, and output device 154.

Note that each of the output device 704, output device 804, output device 134, and output device 154 may include a printing device to print construction plan data on a medium such as a paper medium. Each of the output device 704, output device 804, output device 134, and output device 154 may include a printing device such as an ink jet printer.

The construction plan data output unit 28 outputs, to each of the output devices 704, 804, 134, and 154, output data to be output by each of the output devices 704, 804, 134, and 154, together with a command signal that commands an output format. The construction plan data output unit 28 outputs a command signal to each of the output devices 704, 804, 134, and 154, and designates an output format of output data to be output by each of the output devices 704, 804, 134, and 154. Each of the output devices 704, 804, 134, and 154 outputs the output data on the basis of the output format designated by the construction plan data output unit 28.

In the following description, it is assumed that the output device 704, output device 804, output device 134, and output device 154 are display devices, and the output device 704 of the portable terminal 7 will be suitably referred to as a display device 704, the output device 804 of the information terminal 8 will be suitably referred to as a display device 804, the output device 134 of the information terminal 13 will be suitably referred to as a display device 134, and the output device 154 of the information terminal 15 will be suitably referred to as a display device 154. Output by the output devices includes display by the display devices.

The construction plan data output unit 28 outputs, to each of the display devices 704, 804, 134, 154, display data to be displayed by each of the display devices 704, 804, 134, and 154, together with a command signal that commands a display format. The construction plan data output unit 28 outputs a command signal to each of the display devices 704, 804, 134, and 154, and designates a display format of display data to be displayed by each of the display devices 704, 804, 134, and 154. Each of the display devices 704, 804, 134, and 154 displays the display data on the basis of the display format designated by the construction plan data output unit 28.

Current topography data acquired by the camera 11 of the drone 10 and design topography data created in the construction company 12 are output to the portable terminal 7, information terminal 8, information terminal 13, and information terminal 15 via the construction plan data calculation unit 20 and the construction plan data output unit 28. The construction plan data calculation unit 20 processes each of the acquired current topography data and design topography data into three-dimensional image data. In other words, the construction plan data calculation unit 20 converts, into three-dimensional image data, the image data of the current topography acquired by the camera 11. Additionally, the construction plan data calculation unit 20 converts, into three-dimensional image data, two-dimensional design topography data or three-dimensional design topography data which is a design drawing created by the construction company 12. The construction plan data calculation unit 20 outputs the three-dimensional image data of each of the current topography data and design topography data to the portable terminal 7, information terminal 8, information terminal 13, and information terminal 15 via the construction plan data output unit 28.

The construction plan data output unit 28 outputs the current topography data and the design topography data as display data, and outputs a three-dimensional display command signal as a command signal to designate a display format. The construction plan data output unit 28 designates the display format in each of the display devices 704, 804, 134, and 154 such that the current topography data and design topography data are three-dimensionally displayed. The display device 704 of the portable terminal 7, display device 804 of the information terminal 8, display device 134 of the information terminal 13, and display device 154 of the information terminal 15 three-dimensionally display the current topography data and the design topography data on the basis of the display format designated by the construction plan data output unit 28.

Additionally, the construction plan data output unit 28 can designate a display format in each of the display devices 704, 804, 134, and 154 such that current topography data and the design topography data are displayed in a display format of not only the three-dimensional image format but also at least one of a two-dimensional image format, a numerical format, a character format, and a table format.

Furthermore, construction actual achievement data acquired by the construction machine 4 is output to the portable terminal 7, information terminal 8, information terminal 13, and information terminal 15 via the construction plan data calculation unit 20 and the construction plan data output unit 28. Each of the portable terminal 7, information terminal 8, information terminal 13, and information terminal 15 function as a second output device that can output construction actual achievement data. The construction plan data calculation unit 20 processes, into three-dimensional image data, construction actual achievement data acquired from the construction machine 4. In other words, the construction plan data calculation unit 20 converts, into three-dimensional image data, positional data in each of a plurality of mesh points acquired by the construction machine 4. The construction plan data calculation unit 20 outputs construction actual achievement data to the portable terminal 7, information terminal 8, information terminal 13, and information terminal 15 via the construction plan data output unit 28.

The construction plan data output unit 28 outputs the construction actual achievement data as display data, and outputs a three-dimensional display command signal as a command signal that designates a display format. The construction plan data output unit 28 designates the display format in each of the display devices 704, 804, 134, and 154 such that the construction actual achievement data is three-dimensionally displayed. Each of the display device 704 of the portable terminal 7, display device 804 of the information terminal 8, display device 134 of the information terminal 13, and display device 154 of the information terminal 15 three-dimensionally displays the construction actual achievement data on the basis of the display format designated by the construction plan data output unit 28.

Additionally, the construction plan data output unit 28 can designate a display format in each of the display devices 704, 804, 134, and 154 such that construction actual achievement data is displayed in a display format of not only the three-dimensional image format but also at least one of a two-dimensional image format, a numerical format, a character format, and a table format.

[Support Center]

The information terminal 15 of the support center 14 can execute a function equivalent to that of the construction plan data calculation unit 20 of the computer system 2. For example, the information terminal 15 can execute generation of three-dimensional image data that can be executed by the construction plan data calculation unit 20. The information terminal 15 can execute, in the place of the construction planning data calculation unit 20: processing, into three-dimensional image data, construction actual achievement data acquired from the construction machine 4; and converting, into three-dimensional image data, two-dimensional design topography data or three-dimensional design topography data which is a design drawing created by the construction company 12. The generated three-dimensional image data is transmitted to the portable terminal 7 and information terminal 8 via the input/output interface circuit 155 and the computer system 2.

Additionally, the support center 14 accepts change of a design topography requested from the construction site 3. In the support center 14, design topography data indicating a changed design topography is calculated by using the information terminal 15. The information terminal 15 transmits changed design topography data to the computer system 2 via, for example, the Internet. The design topography data acquisition unit 24 of the computer system 2 acquires the changed design topography data output from the support center 14. The construction plan data calculation unit 20 recalculates construction plan data on the basis of the changed design topography data.

The changed design topography data is transmitted to the construction machine 4. The work member 440 is controlled on the basis of the changed design topography data.

<Remote Control Unit>

Additionally, the computer system 2 may include a remote control unit 29 that outputs a control signal to remotely operate the construction machine 4 on the basis of design topography data. The remote control unit 29 remotely controls the construction machine 4. In the case where a design topography is changed by a request from the construction site 3, the remote control unit 29 can output a control signal to remotely operate the construction machine 4 on the basis of changed design topography data.

[Construction Management Method]

Figure 12:
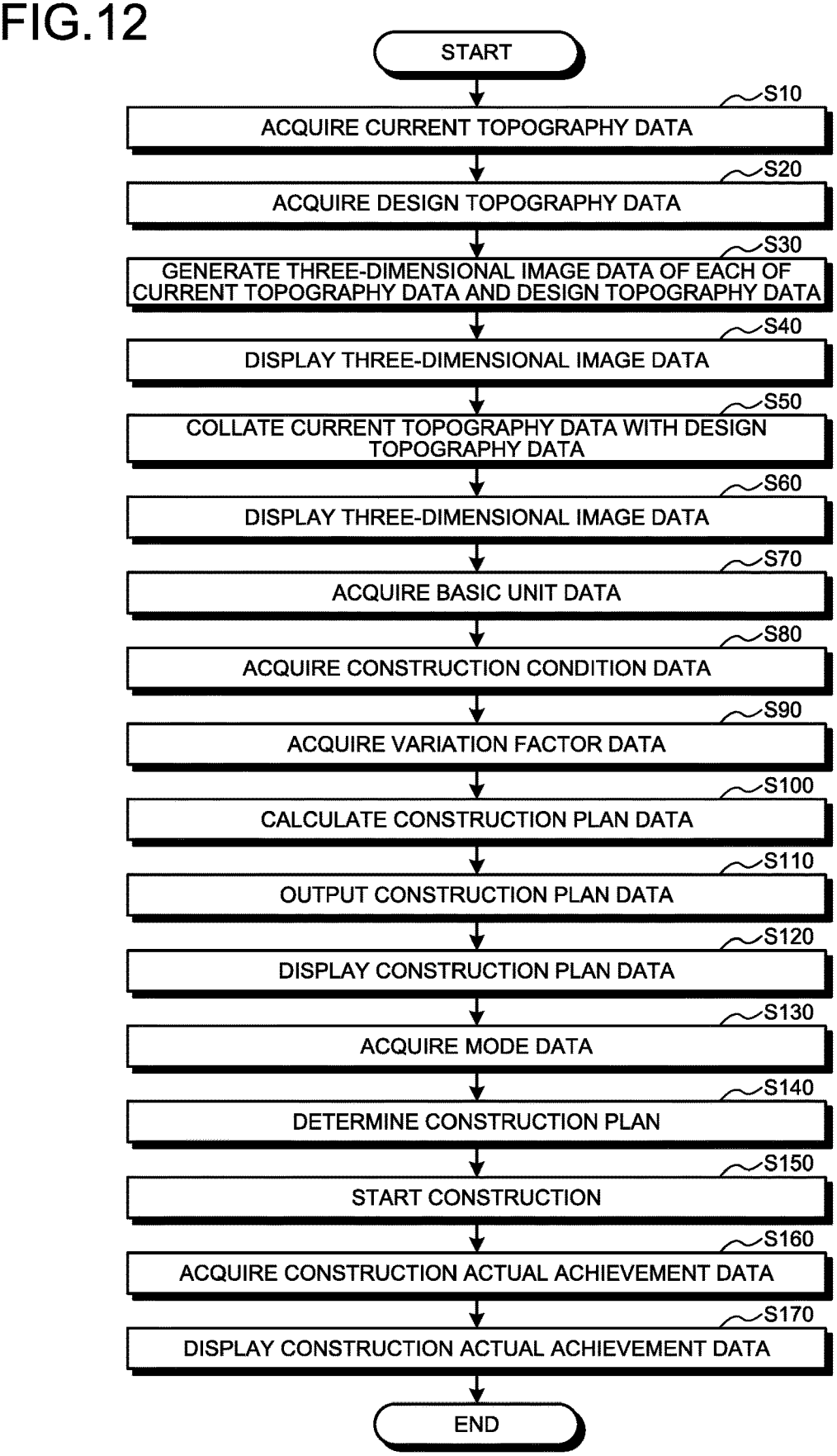
FIG. 12 is a flowchart illustrating a construction planning method according to the present embodiment.

Next, a construction management method using the construction management system 1 will be described. FIG. 12 is a flowchart illustrating a construction planning method.

As described above, current topography data, design topography data, construction plan data, and construction actual achievement data are acquired in the computer system 2. The construction plan data output unit 28 of the computer system 2 outputs at least one of the current topography data, design topography data, construction plan data, and construction actual achievement data to each of the portable terminal 7, information terminal 8, information terminal 13, and information terminal 15. Each of the display device 704 of the portable terminal 7, display device 804 of the information terminal 8, display device 134 of the information terminal 13, and display device 154 of the information terminal 15 can display the current topography data, design topography data, construction plan data, and construction actual achievement data output from the construction plan data output unit 28. In the following description, it is assumed that the construction plan data output unit 28 outputs at least one of the current topography data, design topography data, construction plan data, and construction actual achievement data to the display device 704 of the portable terminal 7 in order to simplify the description.

A survey for the construction site 3 is performed by using the drone 10. The camera 11 of the drone 10 acquires three-dimensional current topography data of the construction site 3. The current topography data acquisition unit 22 acquires the current topography data from the camera 11 (step S10).

Additionally, design topography data is acquired by the design topography data acquisition unit 24 (step S20).

The construction plan data calculation unit 20 generates three-dimensional image data of the current topography data and three-dimensional image data of the design topography data (step S30).

The three-dimensional image data of the current topography data and the three-dimensional image data of the design topography data are transmitted to the portable terminal 7. The three-dimensional image data of the current topography data and the three-dimensional image data of the design topography data are displayed on the display device 704 of the portable terminal 7 (step S40).

Figure 13:
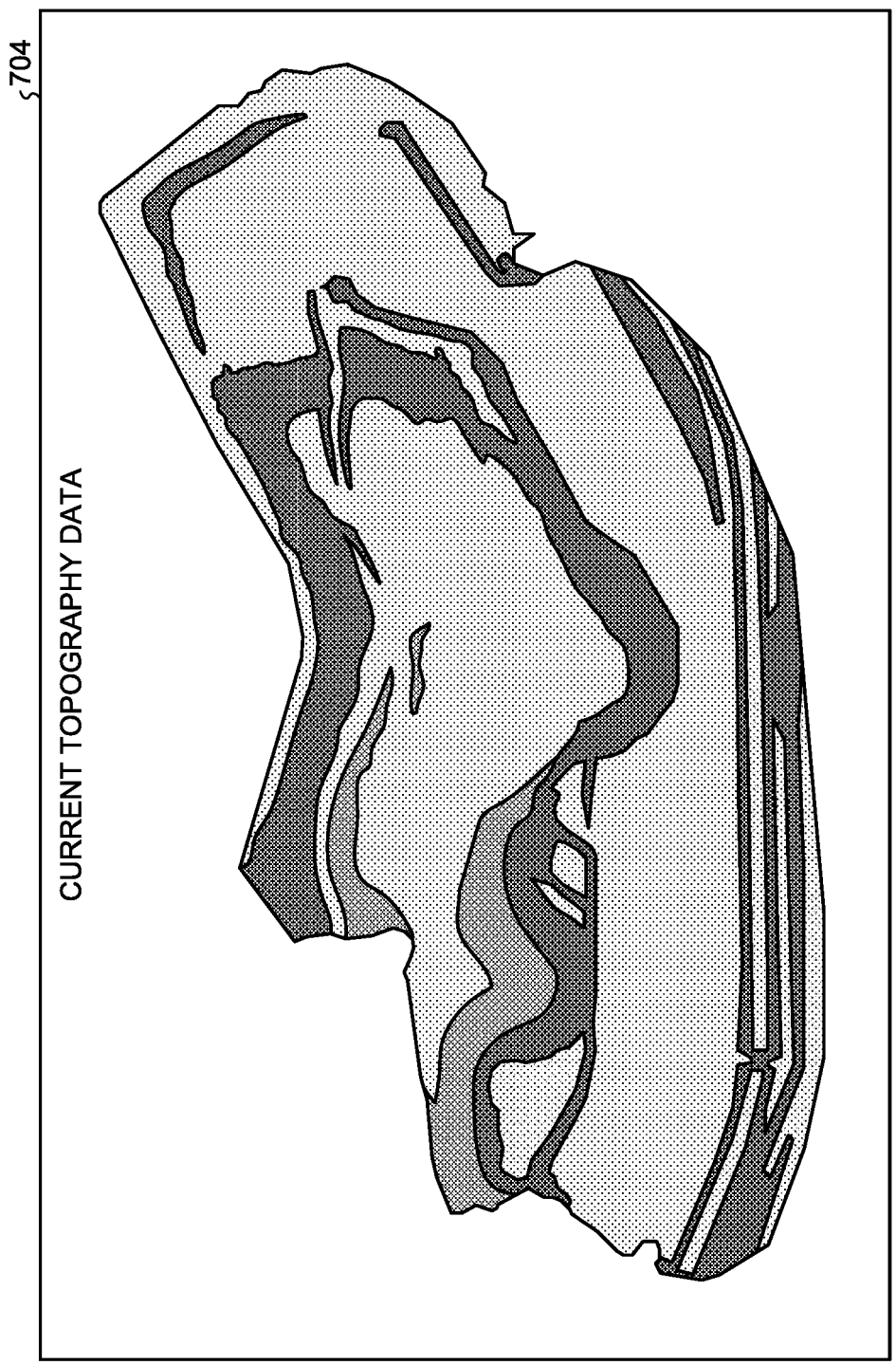
FIG. 13 is a diagram illustrating exemplary output of the output device according to the present embodiment.

FIG. 13 is a diagram illustrating exemplary display of three-dimensional image data of the current topography data by the display device 704. The construction plan data output unit 28 causes the display device 704 to three-dimensionally display the current topography data. The display device 704 displays a plurality of regions of the current topography in different designs (colors or patterns). In the example illustrated in FIG. 13, the current topography is discretely divided into a plurality of regions on the basis of an altitude of the present topography. A region located at an altitude of a first range is displayed in a first design, a region located at an altitude of a second range having an altitude different from that of the first range is displayed in a second design, and a region located at an altitude of an $N^{th}$ range is displayed in an $N^{th}$ design. Note that N is a natural number of 3 or more.

Figure 14:
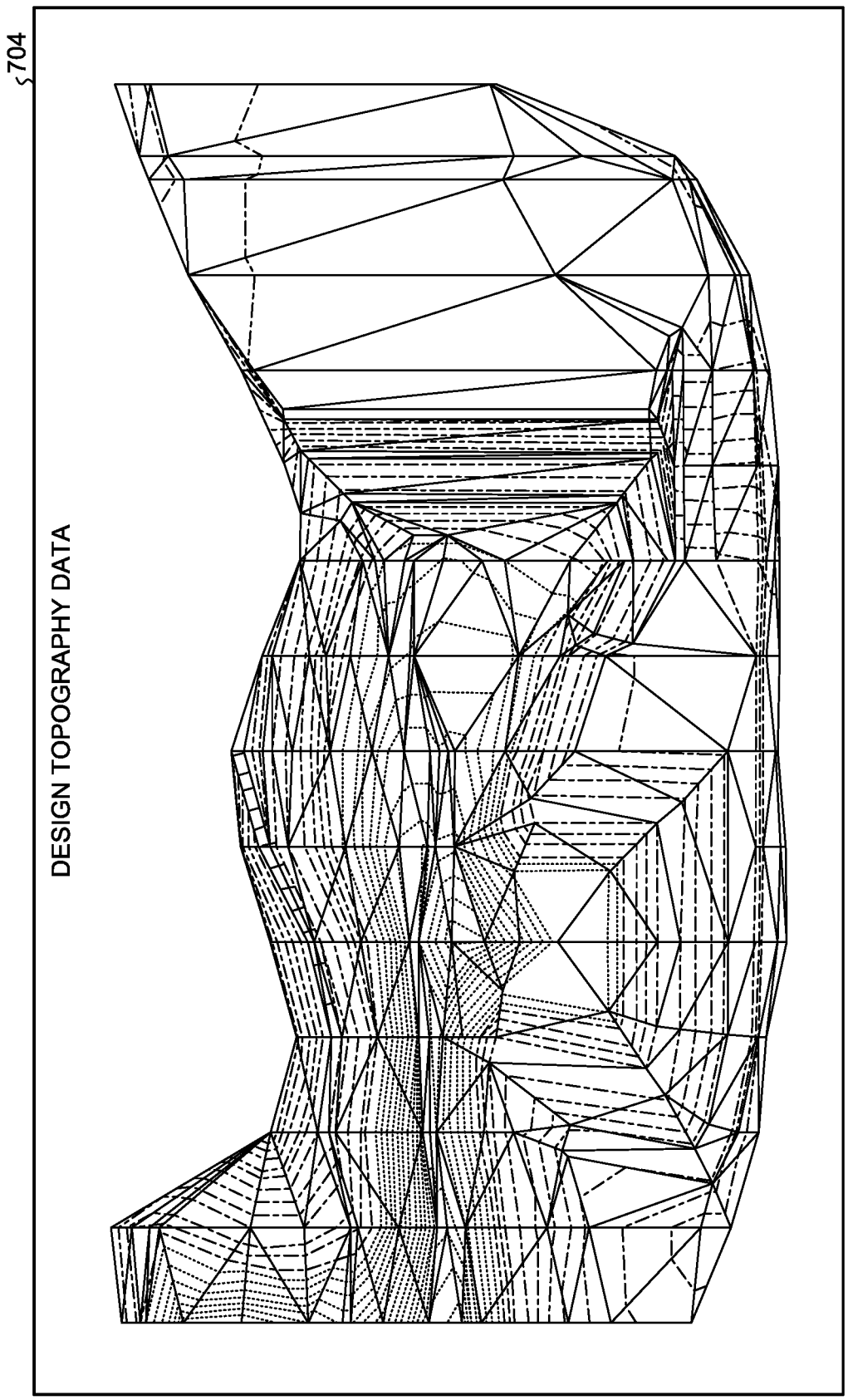
FIG. 14 is a diagram illustrating exemplary output of the output device according to the present embodiment.

FIG. 14 is a diagram illustrating exemplary display of three-dimensional image data of design topography data by the display device 704. For example, a shape of a design topography is displayed as three-dimensional image data by polygon display. The construction plan data output unit 28 causes the display device 704 to three-dimensionally display the design topography data. The display device 704 displays the design topography corresponding to a target shape after construction by using a plurality of lines.

Figure 15:
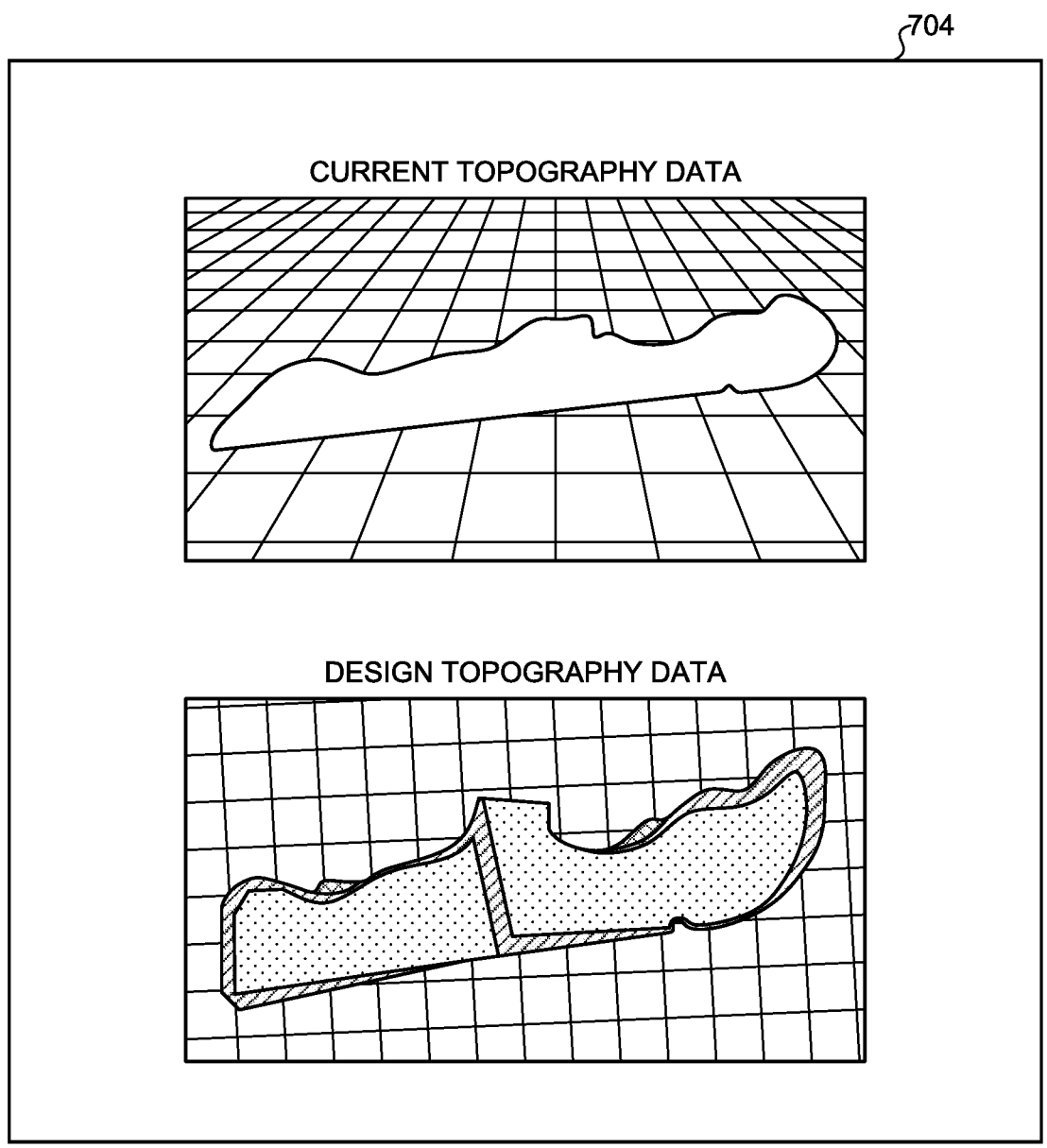
FIG. 15 is a diagram illustrating exemplary output of the output device according to the present embodiment.

FIG. 15 illustrates another exemplary display by the display device 704. As illustrated in FIG. 15, the construction plan data output unit 28 can cause the display device 704 to three-dimensionally display current topography data and design topography data in parallel. In the example illustrated in FIG. 15, the three-dimensional image data of the current topography data and the three-dimensional image data of the design topography data are displayed at the same time in parallel on a display screen of the display device 704.

The construction plan data calculation unit 20 calculates construction range data indicating a construction range of the construction site, earth cutting plan data in the construction range, and earth banking plan data in the construction range by collating the current topography data with the design topography data. As described above, the cutting plan data includes at least one of cutting region data and cutting amount data, and the banking plan data includes at least one of banking region data and banking amount data. The cutting amount data includes cutting numerical data, and the banking amount data includes banking numerical data. The construction plan data calculation unit 20 calculates the cutting plan data including the cutting region data indicating a region requiring earth cutting in the construction range and banking plan data including the banking region data indicating a region requiring earth banking in the construction range. Furthermore, the construction plan data calculation unit 20 calculates, by collating the current topography data with the design topography data: the cutting numerical data that is the cutting amount data indicating an earth cutting amount to be cut in the construction range; and the banking numerical data that is the banking amount data indicating an earth banking amount to be charged in the construction range (step S50). Soil amount data includes the cutting amount data (cutting numerical data) and the banking amount data (banking numerical data).

The construction plan data calculation unit 20 calculates three-dimensional image data of each of the construction range data and the soil amount data, and transmits the same to the portable terminal 7 via the construction plan data output unit 28. The display device 704 of the portable terminal 7 displays the three-dimensional image data of each of the construction range data and the soil amount data (step S60).

Figure 16:
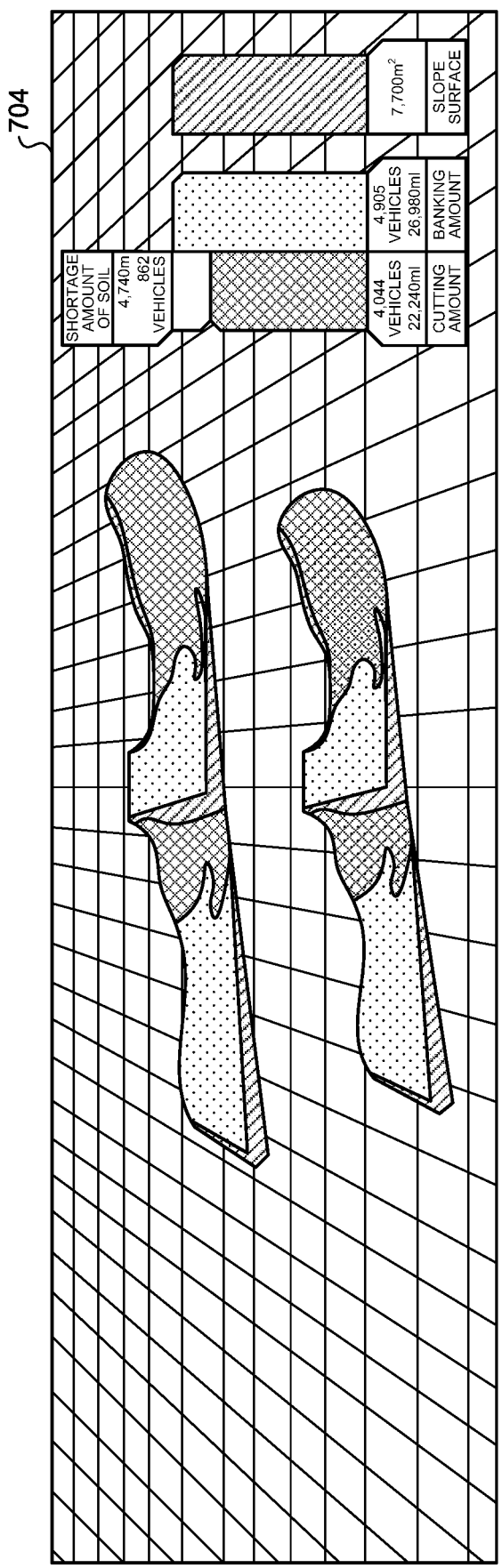
FIG. 16 is a diagram illustrating exemplary output of the output device according to the present embodiment.

FIG. 16 illustrates exemplary display of three-dimensional image data by the display device 704 related to construction range data and soil amount data. As illustrated in FIG. 16, numerical data may be displayed together with the three-dimensional image data. Since a difference between current topography data and design topography data is visualized in the three-dimensional image data by color coding or pattern coding, a worker or a supervisor can grasp a range to be constructed prior to construction, also can grasp a shape and the like on the halfway of the construction or after the construction. For example, a range where construction is completed is displayed in a blue color, and a range where construction is not completed yet is displayed in a yellow color in the three-dimensional topography data. Using the numerical data, a worker or a supervisor can grasp a cutting amount so far, a required cutting amount, a charged banking amount, a required soil amount, a size of a slope surface area where construction is not completed yet, a size of a slope surface where the construction is completed.

Furthermore, the construction plan data output unit 28 outputs, to the display device 704 of the portable terminal 7, construction range data, cutting plan data, and banking plan data calculated by the construction plan data calculation unit 20.

Figure 17:
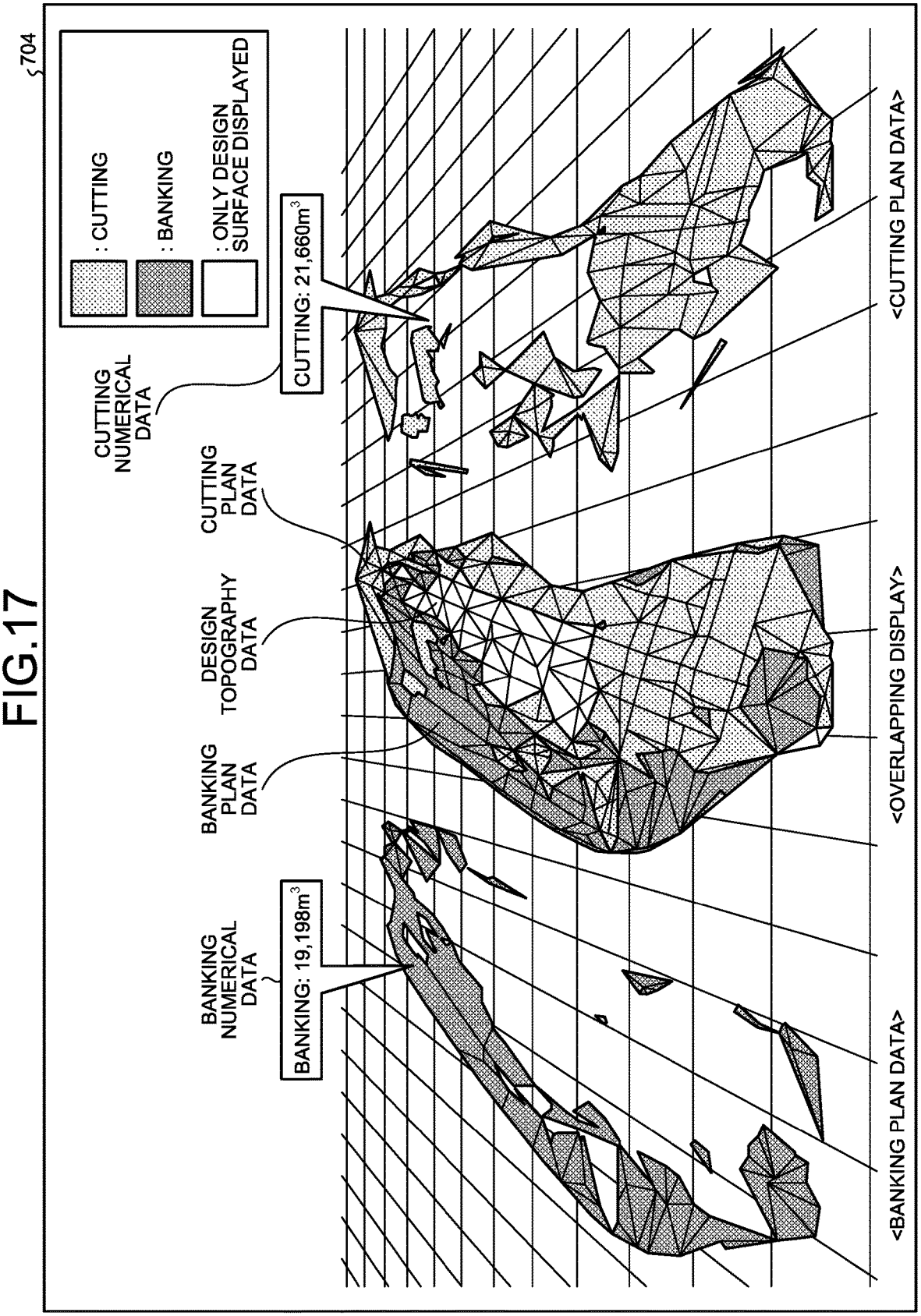
FIG. 17 is a diagram illustrating exemplary output of the output device according to the present embodiment.

FIG. 17 is a diagram illustrating exemplary display by the display device 704 of design topography data, construction range data, cutting region data of cutting plan data, cutting numerical data of the cutting plan data, banking region data of banking plan data, and banking numerical data of the banking plan data. As illustrated in FIG. 17, the construction plan data output unit 28 causes the display device 704 to three-dimensionally display the cutting plan data (cutting region data) and the banking plan data (banking region data) in the construction range in parallel. The design topography data, cutting plan data (cutting region data), and banking plan data (banking region data) are three-dimensionally displayed, for example, by polygon display. The cutting plan data (cutting region data) and banking plan data (banking region data) are displayed in different designs (colors or patterns) such that both can be distinguished from each other when displayed in an overlapping manner as described later.

Furthermore, the construction plan data output unit 28 causes the display device 704 to display the design topography data, cutting plan data (cutting region data), and banking plan data (banking region data) in an overlapping manner within the construction range. The design topography data, cutting plan data (cutting region data), and banking plan data (banking region data) are displayed in different designs in an overlapping manner.

Additionally, the construction plan data output unit 28 causes the display device 704 to display cutting numerical data and banking numerical data. In the example illustrated in FIG. 17, a cutting amount "21,660 m$^3$" is displayed as the cutting numerical data, and a banking amount "19,198 m$^3$" is displayed as the banking numerical data.

Note that the construction plan data output unit 28 may cause the display device 704 to three-dimensionally display current topography data and cutting plan data (cutting region data or cutting amount data) in parallel, or display current topography data and banking plan data (banking region data or banking amount data) in parallel. The construction plan data output unit 28 can cause the display device 704 to three-dimensionally display, in parallel, at least two of the current topography data, design topography data, construction range data, cutting plan data (cutting region data or cutting amount data), and banking plan data (banking region data or banking amount data).

Note that the construction plan data output unit 28 may also cause the display device 704 to display the current topography data and the cutting plan data (cutting region data or cutting amount data) in an overlapping manner, or display the current topography data and the banking topography data (banking region data or banking amount data) in an overlapping manner. The construction plan data output unit 28 can cause the display device 704 to display, in an overlapping manner, at least two of the current topography data, design topography data, construction range data, cutting plan data (cutting region data or cutting amount data), and banking plan data (banking region data or banking amount data).

Note that the construction plan data output unit 28 may cause the display device 704 to display the cutting numerical data and not necessarily display the banking numerical data. Note that the construction plan data output unit 28 may cause the display device 704 to display the banking numerical data and not necessarily display the cutting numerical data. As described above, since the cutting plan data, banking plan data, design topography data, current topography data, and the like are displayed in three-dimensional display on the display device 704, a supervisor and the like in the construction site can grasp a location, a kind, and an extent of construction which are required. Furthermore, for example, since the current topography data and cutting plan data or banking plan data are displayed in an overlapping manner, it is possible to grasp progress of construction.

Basic unit data is acquired by the basic unit data acquisition unit 25 (step S70). The construction plan data calculation unit 20 having acquired the basic unit data generates image data of the basic unit data, and causes the display device 704 of the portable terminal 7 to display the image data of the basic unit data.

Figure 18:
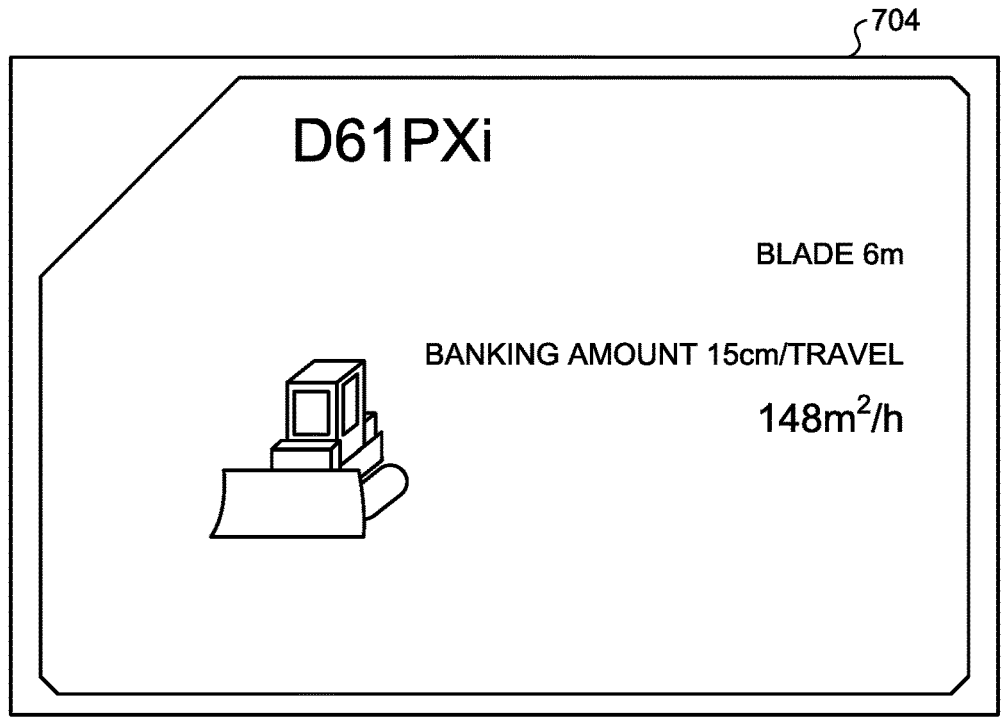
FIG. 18 is a diagram illustrating exemplary output of the output device according to the present embodiment.
Figure 19:
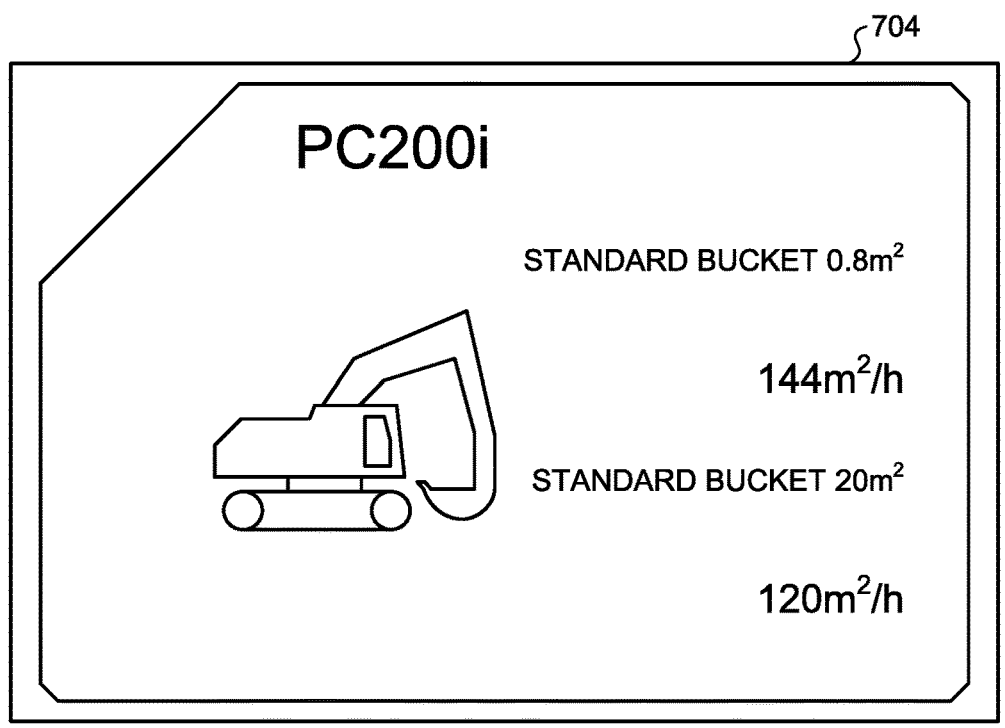
FIG. 19 is a diagram illustrating exemplary output of the output device according to the present embodiment.

FIG. 18 illustrates exemplary display of basic unit data of the bulldozer 4A. As the basic unit data of the bulldozer 4A, a type, a vehicle class (model name), a blade size, a dozing amount or a banking amount that can be performed per unit time, or the like of the bulldozer 4A are displayed. FIG. 19 illustrates exemplary display of basic unit data of the excavator 4B. As the basic unit data of the excavator 4B, a type, a vehicle class (model name), a bucket capacity, a cutting amount (excavating amount), a banking amount (filling amount), a loading amount which can be performed per unit time, or the like of the excavator 4B are displayed.

Construction condition data is acquired by the construction condition data acquisition unit 26 (step S80). Additionally, variation factor data is acquired by the variation factor data acquisition unit 27 (step S90).

The construction plan data calculation unit 20 calculates construction plan data on the basis of the current topography data, design topography data, basic unit data, construction condition data, and variation factor data (step S100). The construction plan data calculation unit 20 simulates construction and formulates optimal construction plan data on the basis of the current topography data, design topography data, basic unit data, construction condition data, and variation factor data.

As described above, the basic unit data includes capacity of a work machine and includes, for example, a size of the work member 440. Therefore, for example, a soil amount that can be excavated by the bucket 440B in one-time excavating operation is acquired on the basis of the basic unit data. The number of times of excavating operation by the bucket 440B required to shape the current topography into the design topography is acquired from a difference between the current topography data and the design topography data. Furthermore, the number of times of excavating operation that can be performed by the excavator 4B per unit time (work capacity of the excavator 4B) is also acquired from the basic unit data which is known data. Therefore, the number of excavators 4B to be used to complete the construction within a target construction period can be calculated. Additionally, the number of work machines to be used or the number of workers to be sent can be acquired on the basis of constraint conditions indicated by the construction condition data.

Furthermore, in the case of transporting earth to the construction site 3 from the outside of the construction site 3 by using the haulage vehicle 5 in order to perform banking, timing when earth is to be transported to the construction site 3 or an amount of earth that can be transported by the haulage vehicle 3 per unit time may be varied by a travel route, a travel speed, and traffic condition (presence of congestion or the like) in the case where the haulage vehicle 5 travels on a general road. For example, when the haulage vehicle 5 arrives at the construction site 3 later than target timing, there may be a situation in which operation of the construction machine 4 or a worker Ma cannot help suspending the work until the haulage vehicle 5 arrives at the construction site 3. Therefore, construction plan data can be formulated on the basis of the basic unit data related to the haulage vehicle 5 including a travel route of the haulage vehicle 5, an estimated time point of arrival at the construction site 3, and the like such that efficient work is performed.

Additionally, a soil property may be changed as excavating progresses in the construction site 3. A work speed may be varied by the soil property even though a work machine having the same work capacity is used. For example, comparing the case of excavating clayey soil with the case of excavating sandy land surface, excavating the clayey land surface takes a longer working period than the case of excavating sandy land surface does because of degradation of the work speed even though a work machine having the same work capacity is used. The soil property is known data that can be acquired in advance by a preliminary investigation like a boring survey. Additionally, the work speed of the work machine according to the soil property can also be acquired in advance. Therefore, it is possible to simulate a working period in the case of using a specific work machine by considering the variation factor data including the soil property data.

Furthermore, difficulty of construction (trafficability) is different between when rainy weather and when fine weather. The trafficability means ability of a land surface to withstand travel of a work machine (travelable level). For example, in the rainy weather, a maximum travelable speed of the haulage vehicle 5 may become slower, and a work speed of the construction machine (for example, bulldozer 4A) may become slower, compared with those in the fine weather. The work speed of the work machine or the maximum travelable speed of the haulage vehicle 5 according to the weather can also be acquired in advance. Therefore, a working period in the case of using a specific work machine can be simulated considering the variation factor data including weather data. Furthermore, it is also possible to formulate, on the basis of the weather data, a construction plan in which a construction machine 4 having specifications coping with rainy or snowy weather is used in the construction site 3, for example. The construction machine 4 having the specifications coping with the rainy weather is, for example, a bulldozer 4A provided with a wide crawler belt so as to be able to travel on a muddy road surface, a haulage vehicle 5 provided with tires coping with snowy weather, or the like.

Additionally, there may be a case where a workable time during which construction can be performed and a non-workable period during which construction cannot be performed are determined by audit or terms of labor of the construction site 3. The schedule data indicating the workable time and the non-effect period are data known in advance, and are stored in the construction condition database as the construction condition data. In the case where the construction condition data is acquired, the construction plan data calculation unit 20 calculates construction plan data on the basis of the construction condition data including the schedule data.

Additionally, process design data indicating work details and a work procedure to be performed in construction is preliminarily determined, and stored in the construction condition database as construction condition data. The construction plan data calculation unit 20 calculates construction plan data on the basis of the construction condition data including the process design data.

The construction plan data output unit 28 outputs the calculated construction plan data to the portable terminal 7 (step S110). The display device 704 of the portable terminal 7 displays the construction plan data (step S120).

Figure 20:
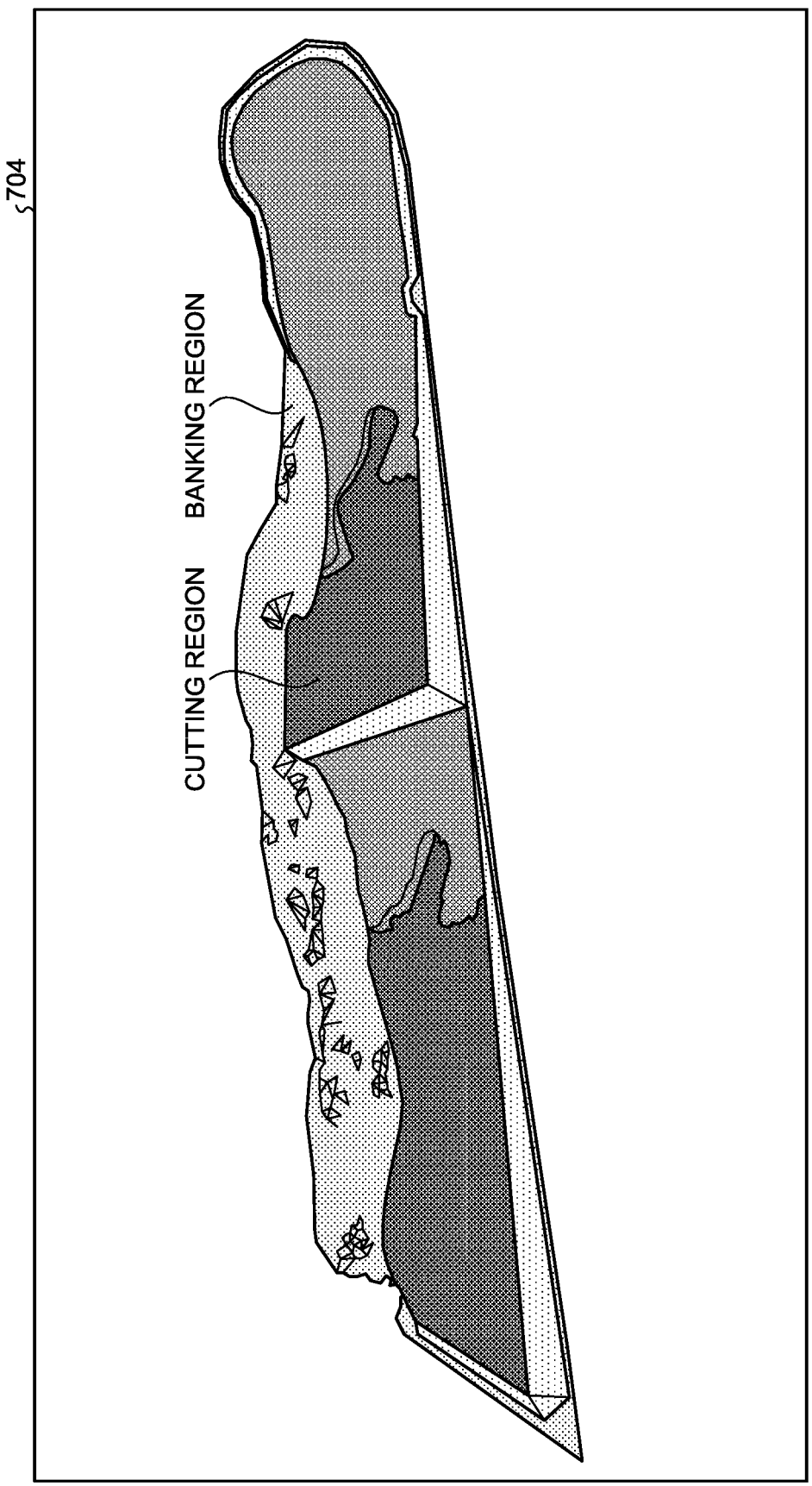
FIG. 20 is a diagram illustrating exemplary output of the output device according to the present embodiment.

FIG. 20 illustrates exemplary display of the construction plan data by the display device 704. The construction plan data output unit 28 causes the display device 704 to three-dimensionally display cutting plan data (cutting region data) and banking plan data (banking region data). The display device 704 displays a cutting region indicating a region requiring cutting and a banking region indicating a region requiring banking in different designs.

Figure 21:
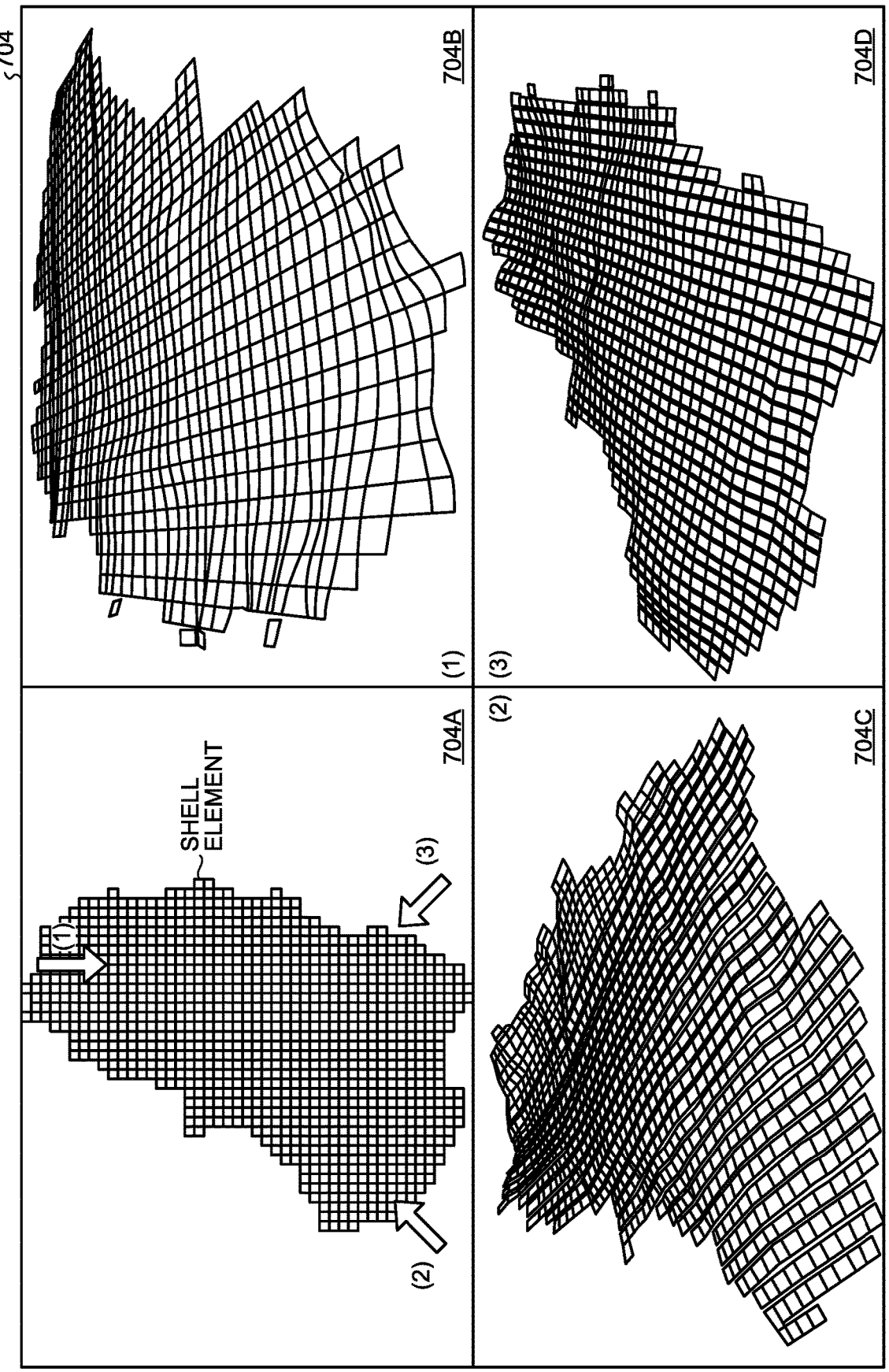
FIG. 21 is a diagram illustrating exemplary output of the output device according to the present embodiment.

FIG. 21 illustrates exemplary display of construction plan data by the display device 704. As illustrated in FIG. 21, the construction plan data output unit 28 defines cutting plan data (cutting region data) and banking plan data (banking region data) with a plurality of shell elements, and can cause the display device 704 to perform two-dimensional display. In the example illustrated in FIG. 21, a plurality of display areas 704A, 704B, 704C, and 704D is set on the display screen of the display device 704. A current topography defined by the plurality of shell elements is displayed in the display area 704A. The display device 704 displays, out of the plurality of shell elements, a cutting shell element indicating a region requiring cutting and a banking shell element indicating a region requiring banking in different designs. Furthermore, the construction plan data output unit 28 causes the display area 704B to display three-dimensional image data when viewing two-dimensional image data displayed in the display area 704A from a direction (1), causes the display area 704C to display three-dimensional image data when viewing the two-dimensional image data from a direction (2), and causes the display area 704D to display three-dimensional image data when viewing the two-dimensional image data from a direction (3).

Figure 22:
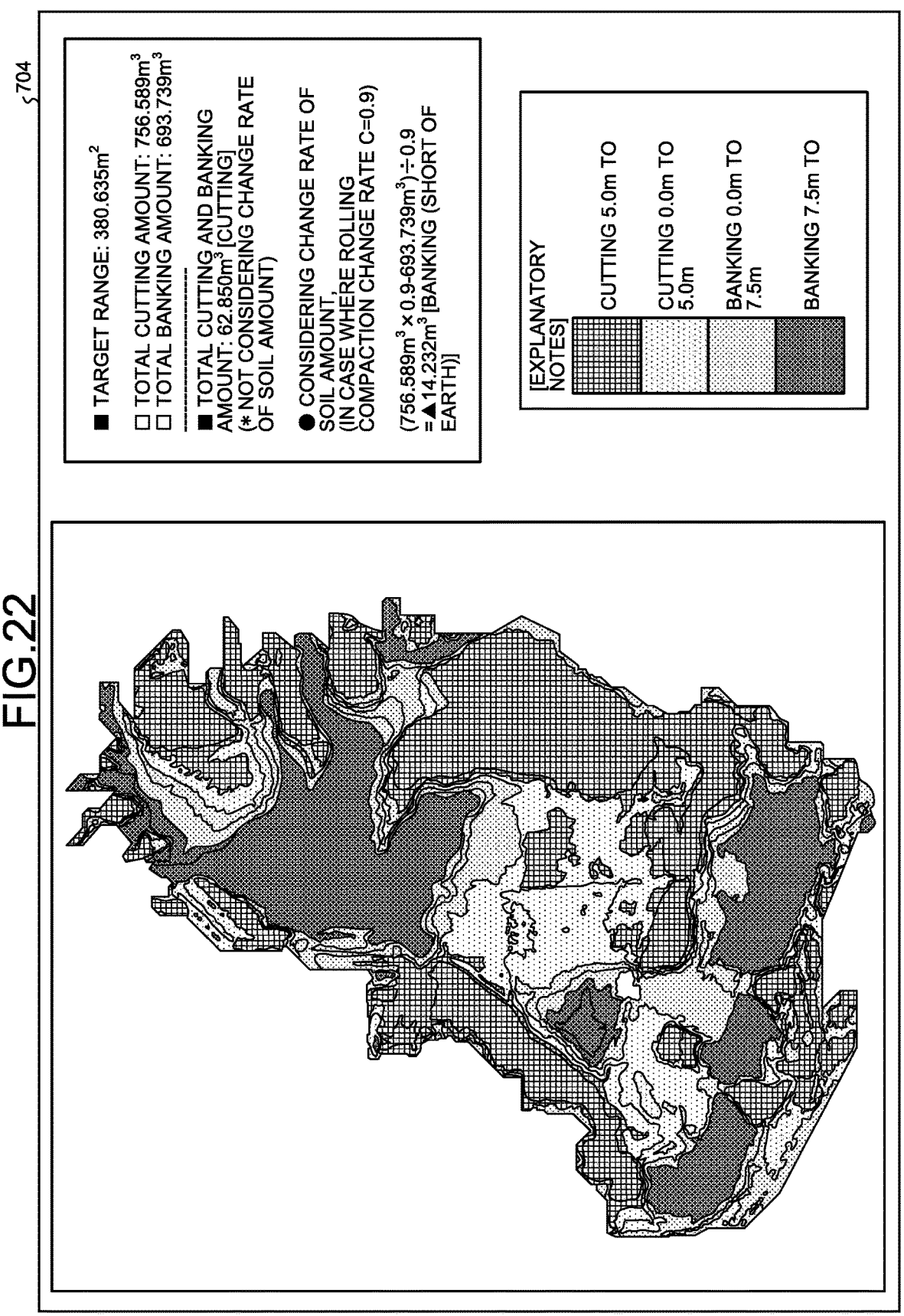
FIG. 22 is a diagram illustrating exemplary output of the output device according to the present embodiment.

FIG. 22 illustrates exemplary display of construction plan data by the display device 704. As illustrated in FIG. 22, the construction plan data output unit 28 can cause the display device 704 to display a current topography in which each cutting amount and each banking amount have different designs. Such display of the construction plan data may be displayed before constructing the construction site in order to confirm a construction plan, or may also be displayed after starting construction of the construction site in order to sequentially confirm construction results. Furthermore, the construction plan data output unit 28 can cause the display device 704 to display numerical data of a total cutting amount and numerical data of a total banking amount. In the example illustrated in FIG. 22, a two-dimensional image of the current topography is displayed in an area on the left side of the display screen of the display device 704. Additionally, a description for designs of each cutting amount and each banking amount are displayed in a lower area on the right side of the display screen of the display device 704. In the example illustrated in FIG. 22, an area where a cutting amount is 0.0 [$m^3$] or more and less than 5.0 [$m^3$] is displayed in a first design, and an area where a cutting amount is 5.0 [$m^3$] or more is displayed in a second design out of the two-dimensional image indicating the current topography in the two-dimensional image of the current topography. Furthermore, out of the two-dimensional image indicating the current topography, an area where a banking amount is 0.0 [$m^3$] or more and less than 7.5 [$m^3$] is displayed in a third design, and an area where a banking amount is 7.5 [$m^3$] or more is displayed in a fourth design. Additionally, additionally, "target range: 380.635 $m^2$" which is character data and numerical data indicating an area of a construction range is displayed, "total cutting amount: 756.589 $m^3$" which is numerical data of a total cutting amount is displayed, and "total banking amount: 693.739 $m^3$" indicating numerical data of a total banking amount is displayed in the area on the right side of the display screen of the display device 704. Additionally, calculation results and explanatory notes for the cutting amount and the banking amount are displayed as character data and numerical data. From such display of the construction plan data, a supervisor and the like in the construction site can grasp a location, a kind, and an extent of construction which are necessary.

Figure 23:
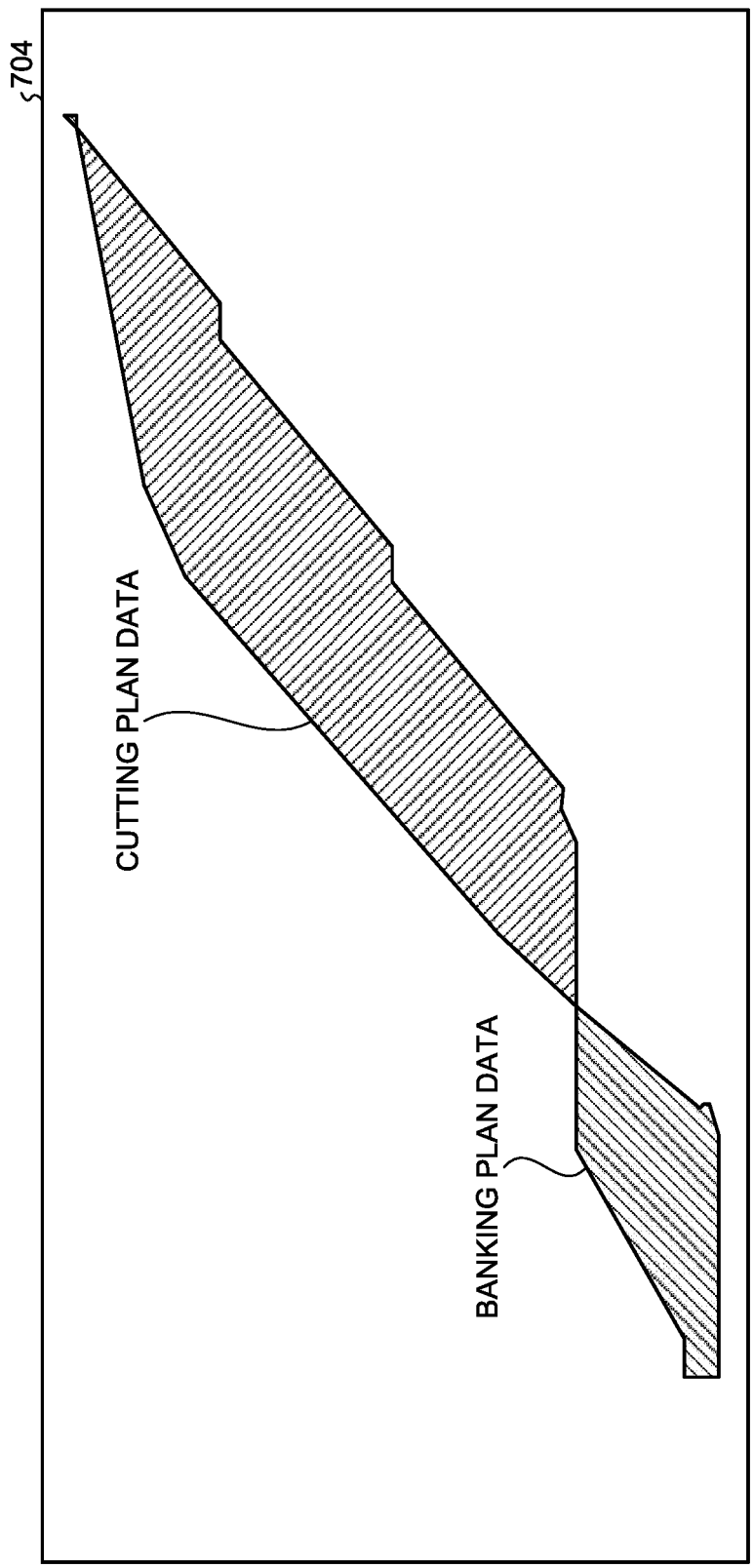
FIG. 23 is a diagram illustrating exemplary output of the output device according to the present embodiment.

FIG. 23 illustrates exemplary display of construction plan data by the display device 704. As illustrated in FIG. 23, the construction plan data output unit 28 causes the display device 704 to two-dimensionally display a cross-sectional shape at an arbitrary position of a current topography, and furthermore display cutting plan data indicating a region requiring cutting, and banking plan data requiring banking in different designs (colors or patterns). For example, the construction plan data output unit 28 causes the display device 704 to display a cross-sectional shape requiring cutting in a first color (for example, pink), and display a cross-sectional shape requiring banking in a second color (for example, blue).

Figures 24, 25:
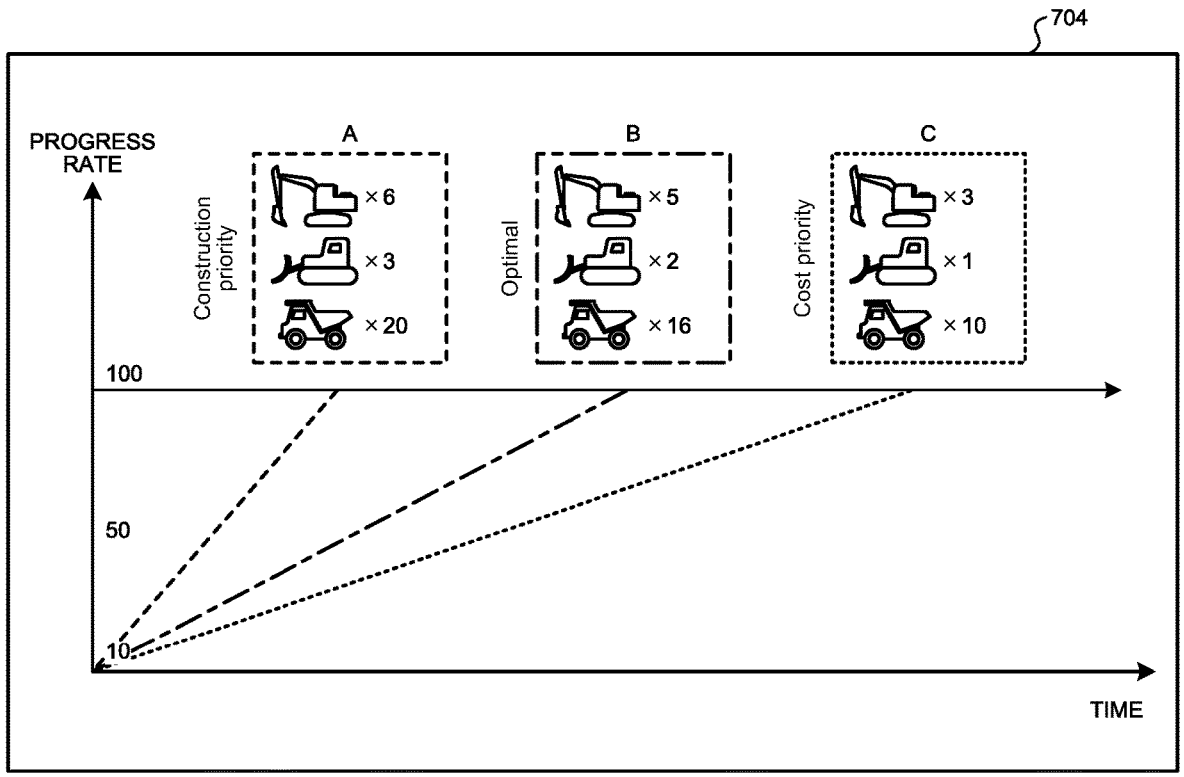
FIG. 24 is a diagram illustrating exemplary output of the output device according to the present embodiment.
FIG. 25 is a diagram illustrating exemplary output of the output device according to the present embodiment.
Figure 26:
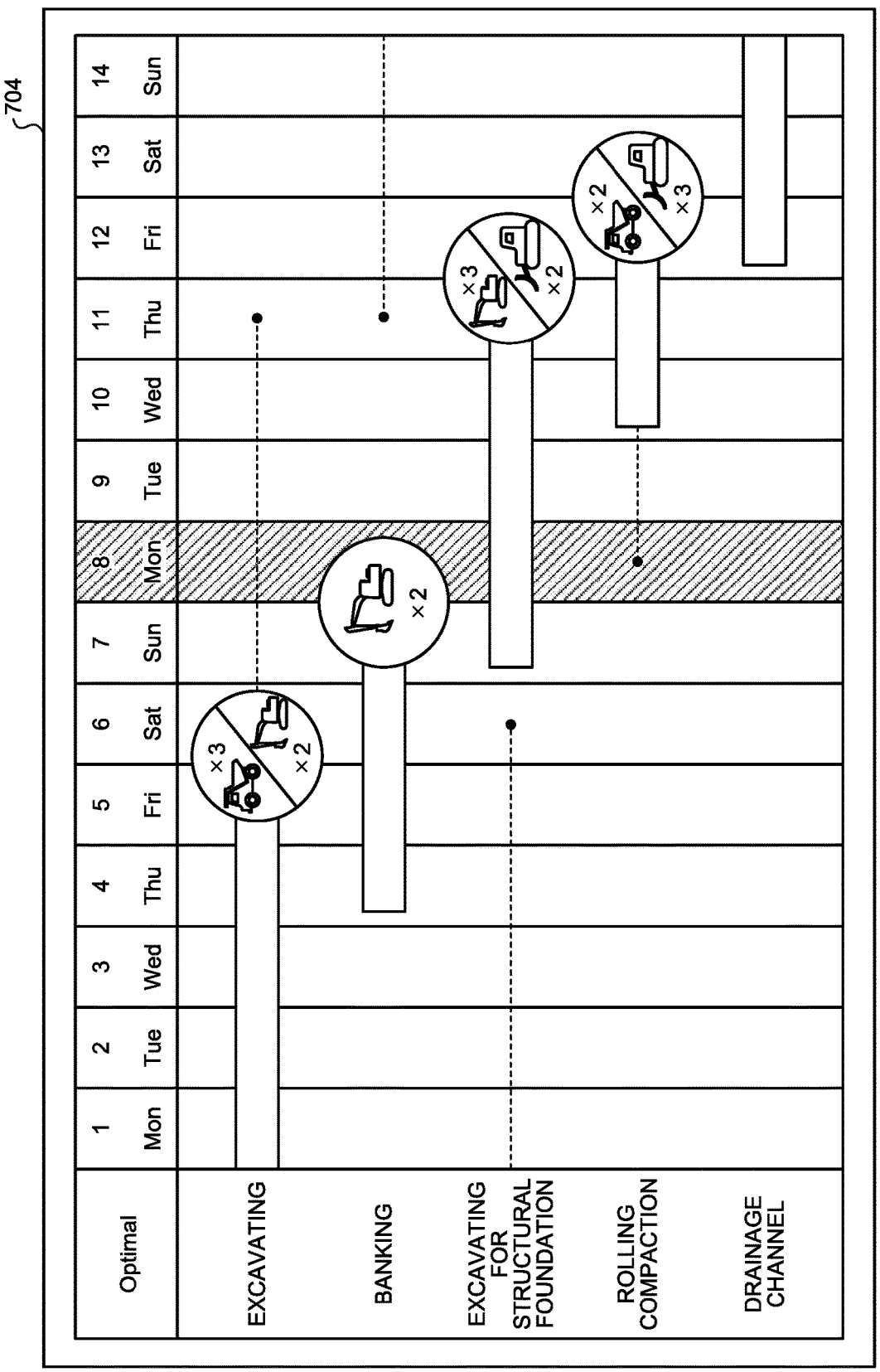
FIG. 26 is a diagram illustrating exemplary output of the output device according to the present embodiment.

FIGS. 24, 25, and 26 illustrate exemplary display of construction plan data by the display device 704. As illustrated in FIG. 24 and FIG. 25, work machine data indicating a type and number of work machines to be used in the construction site 3 is displayed as the construction plan data. Furthermore, as illustrated in FIGS. 24 and 26, construction time schedule data indicating a construction time schedule of the construction in which a work machine is used is displayed as the construction plan data. As illustrated in FIG. 26, flow data illustrating a work procedure of the construction is displayed as the construction time schedule data. As illustrated in FIGS. 24 and 26, working period data indicating a working period for each work of the construction is displayed as the construction time schedule data. Furthermore, as illustrated in FIG. 25, construction period data indicating a period until construction is completed is displayed as the construction time schedule data.

Additionally, as illustrated in FIGS. 25 and 26, cost data indicating a cost required for construction is displayed as the construction plan data. In the present embodiment, the cost data includes a type, a vehicle class, and the number of work machines to be used.

Also, as illustrated in FIG. 25, the construction plan data corresponding to mode data is displayed. A horizontal axis in FIG. 25 represents an estimated elapsed period from start of construction, and a vertical axis represents a progress rate of the construction. The construction plan data calculation unit 20 simulates and displays the cost data indicated by a type, a vehicle class, and the number of work machines and estimated period data from start of the construction to end of the construction as for each of the modes: the construction period priority mode that prioritizes a construction period; the cost priority mode that prioritizes a construction cost; and an intermediate mode directed to achieving a good balance between the construction period and the cost. "A" illustrated in FIG. 25 indicates cost data and estimated period data in the case where the construction period priority mode is selected. "A" indicates that a construction period is shortened in the case where six excavators 4B are used, three bulldozers 4A are used, and twenty haulage vehicles 20 are used. "C" illustrated in FIG. 25 indicates cost data and estimated period data in the case where the cost priority mode is selected. "C" indicates that a cost can be reduced but a construction period is extended in the case where three excavators 4B are used, one bulldozer 4A is used, and ten haulage vehicles 20 are used. "B" illustrated in FIG. 25 indicates cost data and estimated period data in the case where the intermediate mode is selected. "B" indicates that values of a cost and a construction period can be made intermediate between the construction period priority mode and the cost priority mode in the case where five excavators 4B are used, two bulldozers 4A are used and sixteen haulage vehicles 20 are used. Thus, the construction plan data calculation unit 100 can calculate a plurality of patterns of construction plan data and offer proposals to a worker or a supervisor.

The mode data is acquired by the mode data acquisition unit 23 (step S130). In other words, a worker Ma operates the input device 703 of the portable terminal 7 or the input device 803 of the information terminal 8, and selects arbitrary construction plan data from the three patterns "A", "B", and "C" of the construction plan data proposed by the construction management system 1 and illustrated in FIG. 25. When the input device 703 is operated, the mode data indicating a priority item of construction is acquired by the mode data acquisition unit 23 via, for example, the Internet.

A construction plan is determined by selecting the mode data (step S140). The construction management system 1 calculates construction time schedule data on the basis of the selected construction plan, and can automatically request a management company that owns work machines, an operator of a work machine, a rental company of work machines, or the like to arrange work machines. Consequently, construction can be started early in the construction site.

The construction time schedule data illustrated in FIG. 26 will be described. For example, as for an excavating process, illustrated is a plan in which three haulage vehicles 5 and two excavators 4B are used in the construction site during a period from the first day to the sixth day. Additionally, as for a banking process, illustrated is a plan in which two excavators 4B are used in the construction site during a period from the fourth day to the eighth day. Thus, according to the construction time schedule data, it is possible to visually and easily grasp a period and the required number of construction machines 4 or haulage vehicles 5 in each process.

Figure 28:
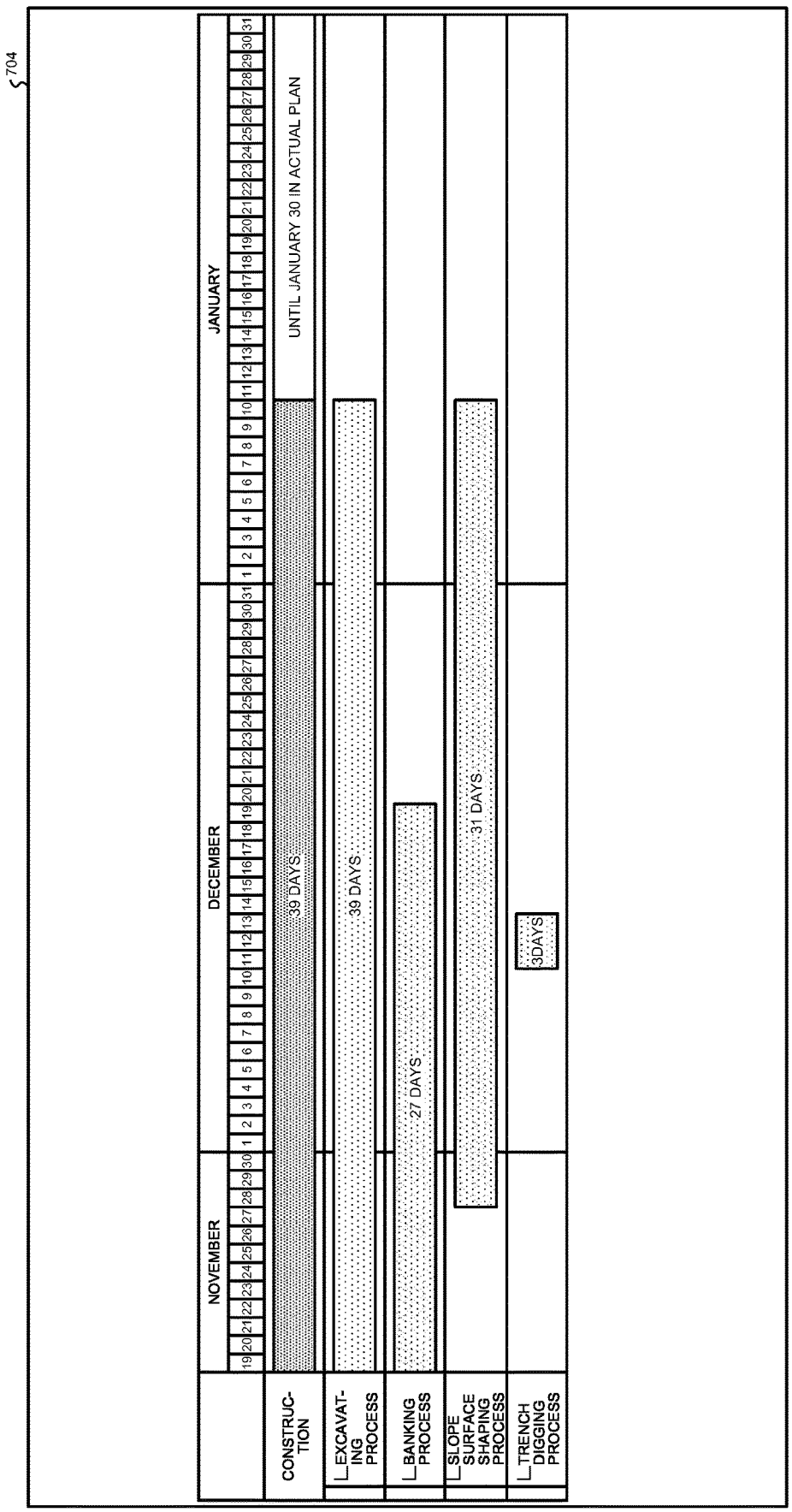
FIG. 28 is a diagram illustrating exemplary output of the output device according to the present embodiment.

FIGS. 27 and 28 illustrate other exemplary display of construction plan data by the display device 704. As illustrated in FIGS. 27 and 28, the construction plan data output unit 28 can cause the display device 704 to display construction plan data for each process of construction. In the examples illustrated in FIGS. 27 and 28, the display device 704 displays, for example, construction plan data in each of an excavating process, a banking process, a slope surface shaping process, and a trench digging process.

As illustrated in FIG. 27, the construction plan data output unit 28 causes the display device 704 to display, as the construction plan data, construction amount data indicating a construction amount required in each process, work machine data indicating a type and number of work machines required in each process, work basic unit data indicating a work basic unit corresponding to a workload that can be performed by a work machine per unit time, and a necessary time data indicating a necessary period until each process is completed, in a table format by using character data and numerical data. An item "construction amount" is displayed as the construction amount data, an item "work machine" is displayed as the work machine data, an item "work basic unit" is displayed as the work basic unit data, and an item "necessary days" is displayed as the necessary time data.

A construction amount is the sum of a cutting amount or a banking amount planned in each process. In the present embodiment, the construction amount and a soil amount indicate the same meaning. In the example illustrated in FIG. 27, a construction amount in the excavating process is "22,240 $m^3$", a construction amount in the banking process is "26,984 $m^3$", a construction amount in the slope surface shaping process step is "6,208 $m^3$", and a construction amount of the trench digging process is "473 $m^3$".

A type of work machine required in each process includes a size (class) of the work machine. "PC200i" and "D61PX" illustrated in FIG. 27 indicate types of work machines, and "×1" indicates the required number of work machine.

The work basic unit is a workload that can be performed by a work machine per unit time. In the example illustrated in FIG. 27, the work basic units of the excavating process, banking process, slope surface shaping process, and trench digging process are "576 $m^3$", "1,000 $m^3$", "200 $m^3$", and "150 $m^3$", respectively.

The necessary days indicate the necessary periods until the respective processes of the excavating process, banking process, slope surface shaping process, and trench digging process are completed, which are "39 days", "27 days", "31 days", and "3 days", respectively. A supervisor and the like in the construction site can easily arrange, from such construction plan data, a work machine, secure an operator, estimate a cost required for the construction, and the like.

Meanwhile, in the construction plan data illustrated in FIG. 27, the construction plan data output unit 28 may also cause the display device 704 to display at least one of: construction amount data indicating a construction amount required in each process of construction; work machine data indicating a type and the number of work machines required in each process; work basic unit data indicating a work basic unit corresponding to a workload that can be performed by a work machine per unit time; and necessary time data indicating a necessary period until each process is completed. Additionally, instead of displaying construction amount data and the like for all of scheduled processes, all of the construction amount data, work machine data, work basic unit data, and necessary time data may be displayed for a certain process, or at least one of the construction amount data, work machine data, work basic unit data, and necessary time data may be displayed for a certain process.

Furthermore, as illustrated in FIG. 28, the construction plan data output unit 28 can cause the display device 704 to display construction time schedule data indicating a construction time schedule (schedule) for each process. In the example illustrated in FIG. 28, assuming that November 19 is the first day, illustrated in a bar graph style is that 39 days are required to complete the "excavating process", and illustrated in a bar graph style is that 27 days are required to complete the "banking process". Furthermore, illustrated in a bar graph style is that 31 days are required to complete the "slope surface shaping process" assuming that November 28 is the first day, and illustrated in a bar graph style is that 3 days are required for the "trench digging process" assuming that December 11 is the first day. Using such construction time schedule data, a supervisor and the like in the construction site can also easily arrange a work machine, and arrange and secure an operator or a worker.

Construction is started in the construction site 3 on the basis of the determined construction plan (step S150). The design topography data and the construction plan data are transmitted to the construction machine 4 from the construction plan data output unit 28. The construction machine 4 performs construction in the construction site 3 while controlling the work member 440 on the basis of the design topography data. Consequently, highly accurate construction conforming to a design drawing can be performed even by a construction machine 4 operated by an operator having not much experience. Furthermore, productivity is dramatically improved in the case where a construction machine 4 is operated by a skilled operator.

Construction actual achievement data is transmitted to the computer system 2 from the construction machine 4 that performs work, for example, in real time. The construction actual achievement data may be transmitted from the construction machine 4 to the computer system 2, for example, at a fixed time or periodically in a day. The construction actual achievement data acquisition unit 21 acquires the construction actual achievement data of the construction machine 4 (step S160).

As described with reference to FIGS. 5 and 6, the construction machine 4 can detect an absolute position of the blade edge 440$p$ that contacts a current topography. The construction machine 4 acquires positional data indicating an absolute position in the Xg axis direction, an absolute position in the Yg axis direction, and an absolute position in the Zg axis direction at each mesh point on the basis of the absolute position of a blade edge 400$p$, and detects the current topography.

Figure 29:
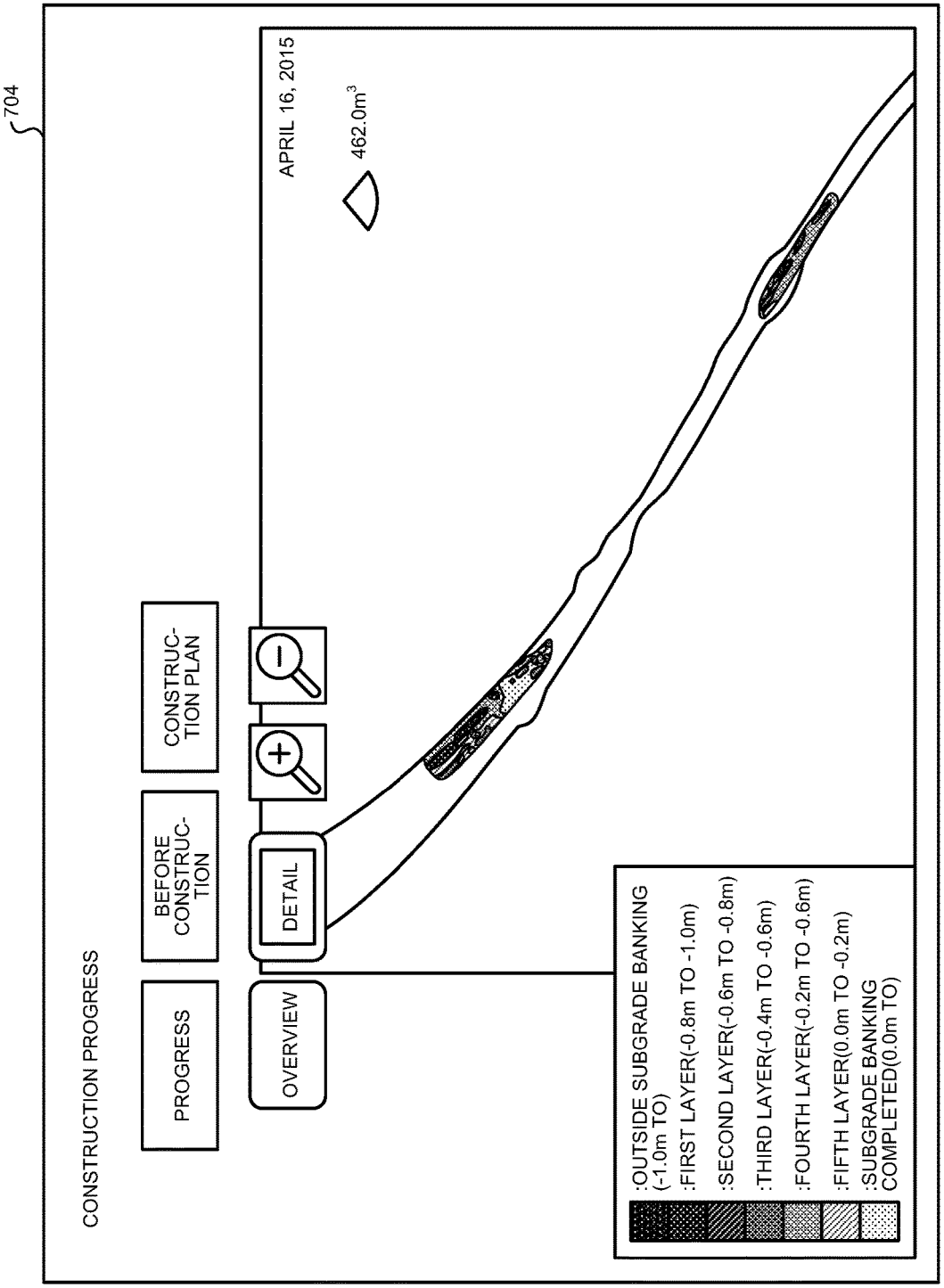
FIG. 29 is a diagram illustrating exemplary output of the output device according to the present embodiment.
Figure 30:
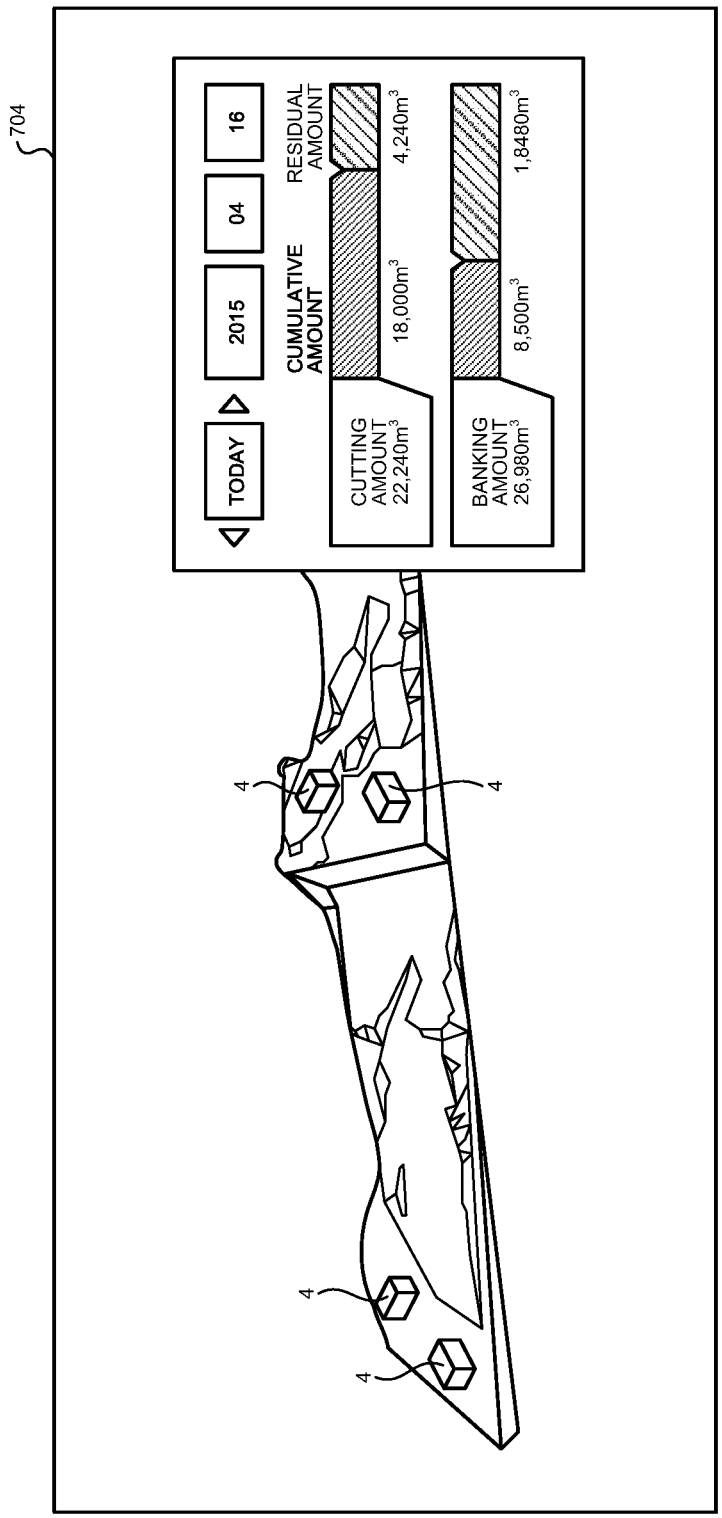
FIG. 30 is a diagram illustrating exemplary output of the output device according to the present embodiment.

The positional data of each mesh point is output to the construction actual achievement data acquisition unit 21. The display device 704 of the portable terminal 7 displays the construction actual achievement data (step S170). FIG. 29 is exemplary display of the construction actual achievement data, and illustrates exemplary two-dimensional display. FIG. 30 illustrates exemplary three-dimensional display. Thus, a worker can visually confirm, in real time, the construction actual achievement (performance) on that day. In other words, the construction management system 1 can constantly "visualize" a daily construction plan and construction actual achievement.

The exemplary construction actual achievement data illustrated in FIG. 29 will be described. Construction progress at a certain time point (for example, Apr. 16, 2015) in a certain construction site is two-dimensionally displayed. Banking is performed in this construction site. A state in which banking is performed a plurality of times (a plurality of layers) on a road floor is visualized by color coding or pattern coding. Additionally, a cumulative amount of banking is displayed as a numerical value (for example, 462.0 m$^3$ in FIG. 29). Meanwhile, when a "Before Construction" button is selected, color coding or pattern coding in a state before construction is displayed, and when a "Construction Plan" button is selected, color coding or pattern coding in a state of a construction plan is displayed. The progress of construction can be easily and visually grasped from such two-dimensional display.

The exemplary construction actual achievement data illustrated in FIG. 30 will be described. Construction progress at a certain time point (for example, Apr. 16, 2015) in a certain construction site is three-dimensionally displayed. The current topography is three-dimensionally displayed in different tones. The computer system 2 acquires, from each construction machine 4, absolute position data indicating an absolute position of the own vehicle by the GPS receiver 406B provided in the construction machine 4, and visually displays a position of the construction machine 4 in the construction site. Furthermore, as a work result so far, a target cutting amount (for example, 22,240 m$^3$) and a target banking amount (for example, 26,980 m$^3$) are displayed as numerical values, and each cumulative amount (cumulative total) and a remaining amount to reach each target amount is displayed by a numerical value or a bar graph. The progress of construction can be easily and visually grasped from such three-dimensional display.

FIG. 31 illustrates another exemplary display of construction actual achievement data by the display device 704. As illustrated in FIG. 31, the construction plan data output unit 28 can cause the display device 704 to display construction actual achievement data for each construction process and each construction day. Furthermore, the construction plan data output unit 28 can cause the display device 704 to display construction plan data and construction actual achievement data for each construction process and each construction day. As illustrated in FIG. 31, the construction plan data output unit 28 causes the display device 704 to display the construction plan data and the construction actual achievement data in a table format.

In the example illustrated in FIG. 31, a "plan" indicating the construction plan data and "actual achievement" indicating the construction actual achievement data are displayed at the same time on the display device 704 for each of the processes including excavating process, banking process, and slope surface shaping process. Also, the "plan" and the "actual achievement" are displayed for each construction day from November 25 to December 11.

In a field of the "plan" indicating the construction plan data, displayed are a "daily construction amount" indicating a construction amount for each construction day, "daily cumulative total" indicating a cumulative amount of construction amounts in each of the construction days from start of the construction.

The construction actual achievement data includes: the construction amount actual achievement data indicating a construction amount for each construction process and each construction day; cumulative construction amount actual achievement data; and progress rate data indicating a construction progress rate relative to the construction plan data.

In a field of the "actual achievement" indicating construction actual achievement data, displayed are "daily construction amount" indicating a construction amount actually achieved in each construction day, "daily cumulative total" indicating a cumulative amount of construction amounts up to each of the construction days from start of the construction, and "daily progress rate" indicating a construction progress rate for each construction day. The "daily progress rate" is a ratio of the cumulative amount (daily cumulative total) of the actually achieved construction amounts relative to a planned soil amount at a time point when daily construction is finished. For example, in the case of FIG. 31, as for the excavating process, excavation of a daily cumulative total 9,216 m$^3$ is performed relative to a planned soil amount 22,240 m$^3$ at the time point of December 11, and a daily progress rate of 41.4% can be obtained by dividing the value of the daily cumulative total on that day by the planned soil amount. Instead of such a "daily progress rate" or together with this "daily progress rate", a ratio of a construction amount on that day (daily construction amount) relative to a construction amount planned for that day (daily construction amount) may be calculated and displayed as a daily progress rate. For example, in the case of FIG. 31, as for the excavating process, actual achievement of a daily construction amount is 576 m$^3$ while a planned daily construction amount is 576 m$^3$ on November 25. Therefore, a daily progress rate of 100% can be obtained by dividing the actual achievement of the daily construction amount by the planned daily construction amount. In other words, the excavating process is performed on November 25 as it has been planned. Such a daily progress rate may be displayed on the display device 704 in a table format like FIG. 31, or may also be displayed in a graph in which a horizontal axis is set as a construction date and a vertical axis is set as a daily progress rate.

Furthermore, the construction plan data output unit 28 may cause the display device 704 to display only construction plan data for a construction process, or may display only construction actual achievement data for a construction process, or may display both of the construction plan data and the construction actual achievement data for a construction process. In this case, one or both of the construction plan data and the construction actual achievement data may be displayed for a predetermined construction day, or one or both of the construction plan data and the construction actual achievement data may be displayed for each construction day.

Figure 32:
FIG. 32 is a diagram illustrating exemplary output of the output device according to the present embodiment.

FIG. 32 is another exemplary display of construction actual achievement data by the display device 704. The construction actual achievement data includes: cutting completion data indicating a region where earth excavating is completed; and banking completion data indicating a region where earth banking is completed. As illustrated in FIG. 32, the construction plan data output unit 28 causes the display device 704 to three-dimensionally display the cutting completion data and the banking completion data.

Furthermore, the construction plan data output unit 28 can cause the display device 704 to display cutting plan data (cutting region data or cutting amount data) and banking plan data (banking region data or banking amount data) together with the cutting completion data and the banking completion data. The construction plan data output unit 28 causes the display device 704 to three-dimensionally display the cutting plan data and the cut cutting completion data in different designs at the same time, and three-dimensionally display the banking plan data and the banking completion data in different designs at the same time. As illustrated in FIG. 32, the cutting plan data, banking plan data, cutting completion data, and banking completion data are displayed in different designs. For example, in a place where the plan data conforms to the completion data, plan data and the completion data may be three-dimensionally displayed in different designs such that a place where the construction is performed as planned can be recognized.

Since the construction plan and the construction actual achievement are "visualized", a series of work including construction planning before construction, management of construction progresses during the construction, and construction evaluation on the construction can be quickly performed, so to speak, plan do check action (PCDA) can be rotated at a high speed.

Additionally, in the case where there is a request to change a design topography in the construction site 3, support is provided by the support center 14. In the support center 14, the design topography data is altered and reflected on process management.

Furthermore, design plan data and construction actual achievement data are accumulated in the result database 34. Note that current topography data, design topography data, basic unit data, construction condition data, variation factor data, and mode data may also be accumulated in the result database 34. These data accumulated in the result database 34 can be utilized and put into practical use also after completion of construction, for example, for maintenance and repair, future maintenance service, restoration work in an area suffering from a natural disaster, and the like, and can contribute to significant reduction of man-hours.

Effects

As described above, according to the present embodiment, the construction plan data output unit 28 causes the display device 704 to three-dimensionally display at least two of current topography data, design topography data, construction range data, cutting plan data, and banking plan data in parallel. Therefore, a worker or a supervisor can sensuously and promptly grasp a construction plan because at least two of the current topography data, design topography data, construction range data, cutting plan data, and banking plan data out of the construction plan prior to construction are visualized in a compared state. Consequently, productivity in the construction site can be improved.

Furthermore, according to the present embodiment, the construction plan data output unit 28 causes the display device 704 to display, in an overlapping manner, at least two of the current topography data, design topography data, construction range data, cutting plan data, and banking plan data. Therefore, a worker or a supervisor can promptly and visually grasp a region and an extent of construction in the construction range.

Furthermore, according to the present embodiment, the construction plan data output unit 28 causes the display device 704 to display one or both of cutting numerical data and banking numerical data. Therefore, a worker or a supervisor can not only sensuously grasp a construction plan but also correctly grasp the construction plan on the basis of the numerical data.

Moreover, according to the present embodiment, the construction plan data output unit 28 causes the display device 704 to display construction plan data and construction actual achievement data for each construction process and each construction day. Therefore, a worker or a supervisor can grasp actual achievement for each process and each construction day, and also can grasp actual achievement relative to the plan. Since the actual achievement is grasped for each process and each construction day, measures can be taken to improve productivity in the construction site on the basis of the grasped actual achievement. For example, when there is a process in which actual achievement is delayed relative to the plan, measures to improve the productivity in the entire construction site can be taken by allocating, to the delayed process, a resource used in a process in which actual achievement progresses ahead of the plan, for example.

Furthermore, according to the present embodiment, construction actual achievement data includes progress rate data indicating a construction progress rate relative to construction plan data. Since the progress rate for each process and each construction day is visually grasped, appropriate measures can be taken to improve productivity in the construction site.

Additionally, according to the present embodiment, the construction actual achievement data includes construction amount actual achievement data indicating a construction amount for each process and each construction day, and cumulative construction amount actual achievement data. Consequently, it is possible to promptly and visually grasp the actual achievement and the cumulative construction amount for each process and each construction day.

Furthermore, according to the present embodiment, the construction plan data output unit 28 causes the display device 704 to three-dimensionally display one or both of cutting completion data indicating a region where earth cutting is completed and banking completion data indicating a region where earth banking is completed. Consequently, it is possible to promptly and visually grasp a region where the cutting process is completed or a region where the banking process is completed out of the construction range.

Furthermore, according to the present embodiment, the construction plan data output unit 28 causes the display device 704 to three-dimensionally display cutting plan data and cutting completion data in different designs at the same time, and three-dimensionally display banking plan data and banking completion data in different designs at the same time. Consequently, it is possible to sensuously and promptly grasp actual achievement of cutting and banking relative to the plan.

Additionally, according to the present embodiment, the construction plan data output unit 28 causes the display device 704 to display, for each construction process, construction amount data indicating a construction amount required for each process, work machine data indicating a type and the number of work machines required for each process, work basic unit data indicating a workload that can be performed by a work machine per unit time, and necessary time data indicating a time until each process is completed. Consequently, a worker or a supervisor can promptly and visually grasp construction plan data.

Moreover, according to the present embodiment, the construction plan data output unit 28 causes the display device 704 to display construction time schedule data indicating a construction time schedule for each process. Consequently, a worker or a supervisor can visually and sufficiently grasp the construction time schedule.

Furthermore, according to the present embodiment, since the construction management system 1 includes the current topography data acquisition unit 22, design topography data acquisition unit 24, basic unit data acquisition unit 25, and construction plan data calculation unit 20, the construction plan data calculation unit 20 can derive a construction range and a construction amount to be constructed on the basis of current topography data and design topography data. The construction management system 1 can formulate an optimal construction plan by using the construction plan data calculation unit 20 of the computer system 2 on the basis of the derived construction range, construction amount, and the basic unit data. Consequently, productivity in the construction site can be improved, and a problem of labor shortage existing in the construction industry can be solved.

In the present embodiment, (1) accurate construction plan can be created prior to construction and during construction, (2) a difference between a plan and actual achievement (achieved shape/performance) can be grasped in real time, (3) an optimal construction procedure and setup can be proposed, and (4) a construction plan can be calculated while predicting possibility of a variation factor. Consequently, productivity in the construction site 3 can be significantly improved.

Furthermore, according to the present embodiment, the construction management system 1 can provide total support to the construction company 12 and for the work related to construction of the construction site 3 from before construction, during construction, after construction, to maintenance management.

Additionally, according to the present embodiment, the construction plan data is transmitted from the construction plan data output unit 28 to the portable terminal 7 and the information terminal 8 functioning as the first output devices. Consequently, the portable terminal 7 and the information terminal 8 can display the construction plan data. Therefore, a worker Ma in the construction site 3 can visually and sufficiently grasp the construction plan.

Furthermore, according to the present embodiment, the portable terminal 7 and the information terminal 8 three-dimensionally display current topography data and design topography data. Consequently, a worker Ma can intuitively grasp a difference between a current topography and a design topography.

Additionally, according to the present embodiment, the camera 11 functioning as the first detection device detects a current topography in a non-contact manner and wirelessly transmits current topography data to the current topography data acquisition unit 22 of the computer system 2. Consequently, a survey for the current topography and transmission of a survey result can be promptly performed.

Moreover, according to the present embodiment, the camera 11 is mounted on the drone 10 which is an unmanned air vehicle and surveys the current topography by aerial photographing. Consequently, surveying can be completed in a short time.

Furthermore, according to the present embodiment, conditions of a work machine indicated by basic unit data includes at least one of a type and a vehicle class of the work machine, the number of work machines, and a management state of the work machine. Consequently, simulation accuracy of construction is improved on the basis of the basic unit data, and an optimal construction plan can be formulated.

Additionally, according to the present embodiment, the conditions of the work machine indicated by the basic unit data include a workload that can be performed by a work machine per unit time. Consequently, simulation of construction can be performed with high accuracy per unit time or for each process.

Furthermore, according to the present embodiment, a work machine includes a work member capable of changing a current topography, and the workload includes a size of the work member. Since the size of the work member is invariable data which can be known in advance, a burden to calculate the workload is reduced.

Additionally, according to the present embodiment, a work machine includes a haulage vehicle that transports earth to a construction site, and the workload includes an earth amount that can be transported per unit time. The earth amount that can be transported per unit time is varied by traveling conditions (travel route, a travel distance, and a travel speed), traffic condition, a vessel size, and the like of the haulage vehicle 5 traveling on a general road. Since the traveling conditions, traffic condition, vessel size, and the like of the haulage vehicle 5 are considered, simulation accuracy of construction is improved, and an optimal construction plan data is calculated. For example, in the case where earth banking is required in the construction site 3 and in the case where the haulage vehicle 5 loaded with earth does not readily arrive at the construction site 3 due to the traffic condition, construction may be stopped. Since construction plan data is calculated on the basis of the conditions of the haulage vehicle 5 so as to prevent such a situation, productivity in the construction site 3 is improved.

Furthermore, according to the present embodiment, the basic unit data further includes conditions of a worker in the construction site. Productivity of the construction site 3 depends on not only a work machine but also a worker. Therefore, the productivity in the construction site 3 is improved by calculating a construction plan also considering the conditions of a worker.

Additionally, according to the present embodiment, the conditions of a worker include at least one of the number of workers and a skill of a worker. Consequently, simulation accuracy of construction is improved, and an optimal construction plan is formulated.

Furthermore, according to the present embodiment, the construction plan data calculation unit 20 calculates construction range data indicating a construction range of the construction site and a soil amount data indicating a cutting amount and a banking amount of earth required in the construction range by collating current topography data with design topography data, and calculates construction plan data on the basis of the construction range data, soil amount data, and basic unit data. Consequently, optimal construction plan data can be calculated, and productivity in the construction site 3 can be improved.

Additionally, according to the present embodiment, the construction plan data includes at least one of work machine data indicating a type and a vehicle class of a work machine and the number thereof to be used in the construction site, construction time schedule data indicating a construction time schedule of construction in which the work machine is used, and cost data indicating a cost required for the construction. Since the work machine data, construction time schedule data, and cost data are calculated, actual construction is performed smoothly and productivity is improved.

Furthermore, according to the present embodiment, the construction time schedule data includes at least one of flow data indicating a work procedure of construction, working period data indicating a working period for each work of the construction, and construction period data indicating a period until the construction is completed. Consequently, a worker Ma can smoothly perform the work in accordance with the data.

Additionally, according to the present embodiment, provided is the construction condition data acquisition unit 26 to acquire construction condition data indicating construction conditions of the construction site, and the construction plan data calculation unit 20 calculates construction plan data on the basis of the construction condition data. Since the construction conditions which are initial conditions or constraint conditions are determined, a solution can be obtained promptly and correctly in simulation of the construction, and appropriate construction plan data can be calculated.

Furthermore, according to the present embodiment, the construction condition data includes at least one of a budget, a construction period, work details, a work procedure, a working period, and a site environment related to construction. Since simulation of the construction is performed in a state that the budget and construction period are defined, a plurality of construction plans can be appropriately proposed within the budget and the construction period. Additionally, since the work details, work procedure, and working period are defined in advance, appropriate construction plan data can be calculated in an appropriate work environment, and a construction result conforming to a target can be achieved.

Additionally, according to the present embodiment, the site environment includes at least one of a topography of the construction site and a size of the construction site. A period required for work is varied by the topography and the size of the construction site. Therefore, since the topography and the size of the construction site are set, simulation accuracy of construction is improved.

Furthermore, according to the present embodiment, provided is the variation factor data acquisition unit 27 to acquire variation factor data indicating a variation factor of the construction site, and the construction plan data calculation unit 20 calculates construction plan data on the basis of the variation factor data. The variation factor data includes at least one of soil property data indicating a kind and a state of earth of the construction site, buried object data indicating a buried object buried under the construction site 3, and weather data for the construction site 3. A period required for work is varied by the soil property of the construction site. For example, a period required for each kind of work such as excavating, dozing work, banking work, cutting work, leveling work, or loading work by the construction machine 4 is different in each case of using heavy soil, light soil, clayey soil, or sandy soil. Also, trafficability of the haulage vehicle 5 is varied by the soil property, and a transporting period required by the haulage vehicle 5 is also varied by the same. Additionally, a period required for work by a work machine is different between the case of fine weather and the case of rainy weather. Since the variation factors caused by such natural phenomena are considered, simulation accuracy of construction is further improved, and appropriate construction plan data can be calculated.

Furthermore, according to the present embodiment, the support center 14 to accept change of a design topography is provided, the design topography data acquisition unit 24 acquires changed design topography data output from the support center 14, and the construction plan data calculation unit 20 recalculates construction plan data on the basis of the changed design topography data. The support center 14 accurately reflects determination in the construction site 3 on construction while reducing a burden on the construction site 3.

Additionally, as illustrated in the present embodiment, the remote control unit 29 to output a control signal to remotely operate a work machine may also be provided on the basis of the changed design topography data. Consequently, a burden on an operator of the work machine is reduced, and computer aided construction work can be performed in accordance with the changed design topography data.

Furthermore, according to the present embodiment, provided is the construction actual achievement data acquisition unit 21 to acquire construction actual achievement data indicating construction actual achievement in the construction site 3, and the construction plan data calculation unit 20 calculates construction plan data on the basis of the construction actual achievement data. Consequently, an optimal construction plan can be formulated each time in accordance with construction progress.

Additionally, according to the present embodiment, the construction actual achievement data is displayed on the portable terminal 7 and the information terminal 8 functioning as the second output devices. Consequently, a worker can grasp progress of daily construction.

Furthermore, according to the present embodiment, a work machine acquires construction actual achievement data, and the construction actual achievement data acquisition unit 21 wirelessly acquires the construction actual achievement data 21 from the work machine. Consequently, construction actual achievement can be promptly grasped in real time.

Additionally, according to the present embodiment, provided is the mode data acquisition unit 23 to acquire mode data indicating a priority item of construction, and the construction plan data calculation unit 20 calculates construction plan data on the basis of the mode data. Consequently, in the case where a plurality of patterns of construction plan is proposed by the construction plan data calculation unit 20, a worker or a supervisor can acquire a construction plan according to the priority item only by operating the input device to transmit the mode data to the mode data acquisition unit 23.

Furthermore, according to the present embodiment, the mode data includes at least one of construction period priority mode data that prioritizes a construction period and cost priority mode data that prioritizes a construction cost. Since the construction period and the cost are set as the priority items, a construction plan according to a budget and a target construction period can be selected.

Meanwhile, in the present embodiment, current topography data is acquired by using, as an air vehicle, the drone 10 having a power source. As the air vehicle, a model aircraft may also be used or a balloon having no power source may be also used. A current topography may also be detected by a camera mounted on the balloon.

Modified Example of Acquiring Current Topography Data

As described with reference to FIGS. 2 to 6, the construction machine 4 includes the vehicle body 400 and the work member 440 relatively moved with respect to the vehicle body 400. The work member 440 includes the blade edge 400p that contacts a current topography. The construction machine 4 includes the processor 401 (blade control device 401A, bucket control device 401B) to detect a current topography on the basis of an absolute position of the blade edge 440p. The absolute position of the vehicle body 400 is detected by the GPS receiver 406. The construction machine 4 includes detection devices 420 (420A, 420B) to detect a relative position of the blade edge 440p with respect to the vehicle body 400. The absolute position of the blade edge 440p is acquired on the basis of the absolute position of the vehicle body 400 and a detection result of the detection position 420. The construction site 3 is constructed by the blade edge 440p, and a current topography is formed. In other words, since the absolute position of the blade edge 440p is clarified, an absolute position of a mesh point on a surface of the current topography is clarified. Therefore, the processor 401 can detect the current topography by detecting the absolute position of the blade edge 440p.

The processor 401 of the construction machine 4 wirelessly transmits the current topography data to the computer system 2. The current topography data acquisition unit 22 of the computer system 2 wirelessly acquires the current topography data from the construction machine 4.

The current topography data may be acquired not only by the air vehicle like the drone 10 as described above but also by using the construction machine 4. For example, in the case where it is difficult to make the drone 10 fly because there is an obstacle such as a tree in the construction site 3, current topography data can be smoothly acquired by using the construction machine 4.

Second Embodiment of Construction Management System

A second embodiment of a construction management system 1 will be described. Similar to an embodiment described above, the construction management system 1 according to the present embodiment includes: a current topography data acquisition unit 22 to acquire current topography data indicating a current topography of a construction site; a design topography data acquisition unit 24 to acquire design topography data indicating a design topography of the construction site; a construction plan data calculation unit 20 to calculate construction plan data indicating a construction plan of the construction site by collating the current topography data with the design topography data; a construction actual achievement data acquisition unit 21 to acquire construction actual achievement data indicating construction actual achievement in the construction site; and a construction plan data output unit 28.

Figure 34:
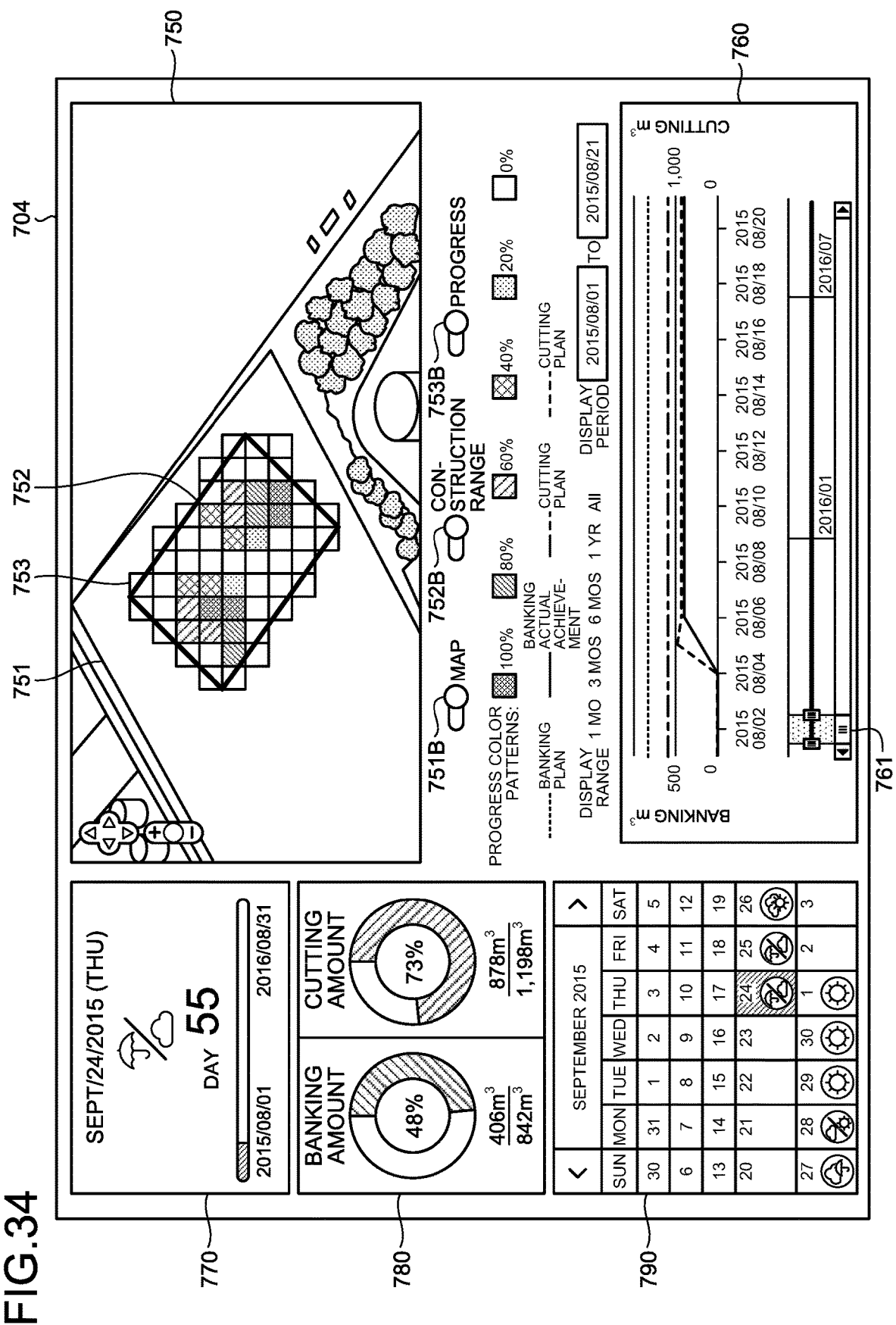
FIG. 34 is a diagram illustrating exemplary output of the output device according to the present embodiment.

FIGS. 33 and 34 are diagrams illustrating exemplary display of a display device 704 according to the present embodiment. The portable terminal 7 is operated such that a power source of the portable terminal 7 is turned from an off state to an on state to start the portable terminal 7, and when communication between the portable terminal 7 and a computer system 2 is established, an initial image as illustrated in FIG. 33 is displayed on a display device 704 of the portable terminal 7. In the display device 704, data for a plurality of construction sites managed or registered in the computer system 2 is displayed. In the example illustrated in FIG. 33, the display device 704 displays site names of the plurality of construction sites. Thus, in the present embodiment, the construction plan data output unit 28 causes the display device 704 to display, as the initial image after starting the portable terminal 7, site identification data to identify the plurality of construction sites managed or registered in the computer system 2.

The display device 704 includes a touch panel. A worker Ma selects an arbitrary construction site out of the plurality of construction sites displayed on the display device 704, and operates (taps) a display screen of the display device 704. In the present embodiment, it is assumed that a construction site A is selected and a display area of "construction site A" is tapped on the display screen of the display device 704.

When the "construction site A" is tapped, detailed data for the construction site A as illustrated in FIG. 34 is displayed on the display device 704.

As illustrated in FIG. 34, in the present embodiment, the construction plan data output unit 28 causes the display screen of the display device 704 to display a plurality of pieces of display data in parallel. The display screen of the display device 704 is set with a first display area 750 to display first display data, a second display area 760 to display second display data, a third display area 770 to display third display data, a fourth display area 780 to display fourth display data, and a fifth display area 790 to display fifth display data.

The construction plan data output unit 28 causes the first display area 750 of the display device 704 to display at least two of current topography data, construction plan data, and construction actual achievement data in an overlapping manner.

The construction plan data output unit 28 causes the second display area 760 of the display device 704 to display the construction plan data and the construction actual achievement data for each construction day.

The construction plan data output unit 28 causes the third display area 770 of the display device 704 to display date data, weather data, elapsed days data from start of construction in the construction site A, and ratio data of elapsed construction days relative to a target construction period of the construction site A.

The construction plan data output unit 28 causes the fourth display area 780 of the display device 704 to display banking amount data and cutting amount data.

The construction plan data output unit 28 causes the fifth display area 790 of the display device 704 to display a calendar and weather data.

The current topography data displayed in the first display area 750 includes a photographed image 751 of a current topography. In the present embodiment, the photographed image 751 of the current topography is an aerial photograph or a satellite photograph obtained by photographing the current topography from the sky. The construction plan data displayed in the first display area 750 includes a construction range image 752 indicating a construction range. In the present embodiment, the construction range image 752 is an image illustrating a contour of the construction range. The construction actual achievement data displayed in the first display area 750 includes progress rate data indicating a progress rate of construction relative to the construction plan. In the present embodiment, the progress rate data of the construction site is a progress rate image 753 in which each of a plurality of partitioned areas formed by partitioning a construction range is output in a different design in accordance with a progress rate.

As illustrated in FIG. 34, the display device 704 displays the photographed image 751 of the current topography and the construction range image 752 in an overlapping manner. The construction range of the first display area 750 is partitioned into a plurality of partitioned areas. In the present embodiment, a shape of each partitioned area is a square. Progress rate images 753 having different designs are displayed in these partitioned areas in accordance with the progress rates corresponding to the respective partitioned areas in the construction range. The progress rate image 753 is square image data displayed in one square partitioned area in an overlapping manner.

The progress rate image 753 may have a different color of different hatching in accordance with a progress rate corresponding to each of the partitioned areas in the construction site. In the present embodiment, when a progress rate of a partitioned area in the construction site is 100 [%], the partitioned area is displayed in a red color. When a progress rate of a partition area in the construction site is 80 [%], the partitioned area is displayed in an orange color. When a progress rate of a partitioned area in the construction site is 60 [%], the partitioned area is displayed in a yellow color. When a progress rate of a partition area in the construction site is 40 [%], the partitioned area is displayed in a green color. When a progress rate of a partition area in the construction site is 20 [%], the partitioned area is displayed in a blue color. When a progress rate of a partition area in the construction site is 0 [%], the partitioned area is not colored and the photographed image 751 is displayed without coloring. Note that above selection of the colors in accordance with the progress rates is an example, and an arbitrary color can be selected. Additionally, in the present embodiment, the progress rates are displayed in six levels (100 [%], 80 [%], 60 [%], 40 [%], 20 [%], and 0 [%]), but the number of levels is arbitrary. For example, progress rates may also be displayed in eleven levels such as 100 [%], 90 [%], 80 [%], 70 [%], 60 [%], 50 [%], 40 [%], 30 [%], 20 [%], 10 [%], and 0 [%].

The construction plan data output unit 28 causes the display screen of the display device 704 to display a selection unit as a graphical user interface (GUI). In the present embodiment, the selection unit includes selection units (751B, 752B, and 753B) to make a worker Ma select data to be displayed on the display device 704 from among the current topography data (photographed image 751), construction plan data (construction range 752), and construction actual achievement data (progress rate image 753). When the switch 751B is turned on, a captured image 751 is displayed in the first display area 750, and when the switch 751B is turned, the captured image 751 is not displayed. When the switch 752B is turned on, the construction range image 752 is displayed in the first display area 750, and when the switch 752B is turned off, the construction range image 752 is not displayed. When the switch 753B is turned on, the progress rate image 753 is displayed in the first display area 750, and when the switch 753B is turned off, the progress rate image 753 is not displayed. FIG. 34 illustrates the example in which all of the switches 751B, 752B, and 753B are turned on, and the captured image 751, construction range image 752, and progress rate image 753 are displayed in an overlapping manner.

The current topography data (photographed image 751), the construction plan data (construction range image 752), and the construction actual achievement data (progress rate image 753) are data defined in a global coordinate system. The construction plan data output unit 28 can cause the first display area 750 to display the photographed image 751, construction range image 752, and progress rate image 753 in an overlapping manner in a state that a latitude and a longitude in each of the images are matched.

The construction plan data displayed in the second display area 760 includes cutting plan data and banking plan data of earth. The construction actual achievement data displayed in the second display area 760 includes cutting actual achievement data and banking actual achievement data of earth.

In the present embodiment, in the second display area 760, the construction plan data output unit 28 causes the second display area 760 of the display device 704 to display a graph in which a horizontal axis represents a construction date and a vertical axis represents construction plan data (cutting plan and banking plan) or construction actual achievement data (cutting actual achievement and banking actual achievement). The construction plan data output unit 28 displays a line graph in which a horizontal axis represents a construction date and a vertical axis represents a construction plan or construction actual achievement.

FIG. 34 illustrates the example in which a construction plan and construction actual achievement for each of construction days from 'Aug. 1, 2015' to 'Aug. 21, 2015' are plotted, and the line graph is formed by connecting the plots.

Note that, in the example illustrated in FIG. 34, the vertical axis of the graph displayed in the second display area 760 represents banking numerical data [$m^3$] and cutting amount numerical data [$m^3$] for each construction day. The vertical axis may represent a ratio [%] of an actual achievement value relative to a final target value of the banking amount or the cutting amount.

The construction plan data output unit 28 causes the display screen of the display device 704 to display a sliding unit as a graphical user interface (GUI). In the present embodiment, the sliding unit includes a slider bar 761 to change a period represented by the horizontal axis. For example, in the case where the slider bar 761 is at a position illustrated in FIG. 34, the banking amount data and the cutting amount data from "Aug. 1, 2015" to "Aug. 21, 2015" are displayed as described above. In the case of moving the slider bar 761 rightward, for example, banking amount data and cutting amount data in a period from "Aug. 1, 2015" to "Jan. 21, 2016" which is longer than the period from "Aug. 1, 2015" to "Aug. 21, 2015" are displayed. In the case of moving the slider bar 761 leftward, for example, banking amount data and cutting amount data in a period from "Aug. 1, 2015" to "Aug. 11, 2016" which is shorter than the period from "Aug. 1, 2015" to "Aug. 21, 2015" are displayed.

Meanwhile, the vertical axis of the graph displayed in the second display area 760 may represent a construction date and the horizontal axis may represent banking amount data and cutting amount data. Meanwhile, in the second display area 760, the banking amount data may be displayed and cutting amount data may not be necessarily displayed, or the cutting amount data may be displayed and the banking amount data may not be necessarily displayed. Meanwhile, in the second display area 760, a planned value of the banking amount may be displayed and an actual achievement value thereof may not be necessarily displayed, or the actual achievement value of the banking amount may be displayed and the planned value thereof may not be necessarily displayed. Meanwhile, in the second display area 760, a planned value of the cutting amount may be displayed and an actual achievement value thereof may not be necessarily displayed, or the actual achievement value of the cutting amount may be displayed and the planned value thereof may not be necessarily displayed.

In the third display area 770 of the display device 704, displayed are: a date (day when the portable terminal 7 is started); a day of the week; weather on the day; the number of elapsed days after start of construction in a construction site A; and a bar graph indicating a ratio of the number of elapsed construction days relative to a target construction period of the construction site A. In the example illustrated in FIG. 34, the weather on the day is displayed using an icon. A construction start date in the construction site A is "Aug. 1, 2015", a scheduled construction completion date in the construction site is "Aug. 31, 2016", and the number of elapsed days from start of construction in the construction site A is 55 days. The target construction period is thirteen months (396 days) from "Aug. 1, 2015" to "Aug. 31, 2016", and the ratio of the number of elapsed construction days relative to the target construction period (in the present example, about 14 [%]) is displayed.

In the fourth display area 780 of the display device 704, a planned value (842 [m$^3$]) and an actual achievement value (406 [m$^3$]) of the banking amount on the day are displayed, and also a ratio of an actual achievement value relative to the planned value of the banking amount (48 [%]) is displayed. Additionally, the ratio (48 [%]) of the actual achievement value relative to the planned value of the banking amount on the day is displayed in a pie chart. Furthermore, in the fourth display area 780 of the display device 704 displayed are: a planned value (1198 [m$^3$]) and an actual achievement value (878 [m$^3$]) of the cutting amount, and also displayed is a ratio of the actual achievement value relative to the planned value (73 [%]) of the cutting amount. Additionally, the ratio (73 [%]) of the actual achievement value relative to the planned value of the cutting amount is displayed as a pie chart.

In the fifth display area 790 of the display device 704, a calendar and an icon of forecasted weather corresponding to each date are displayed.

Figure 35:
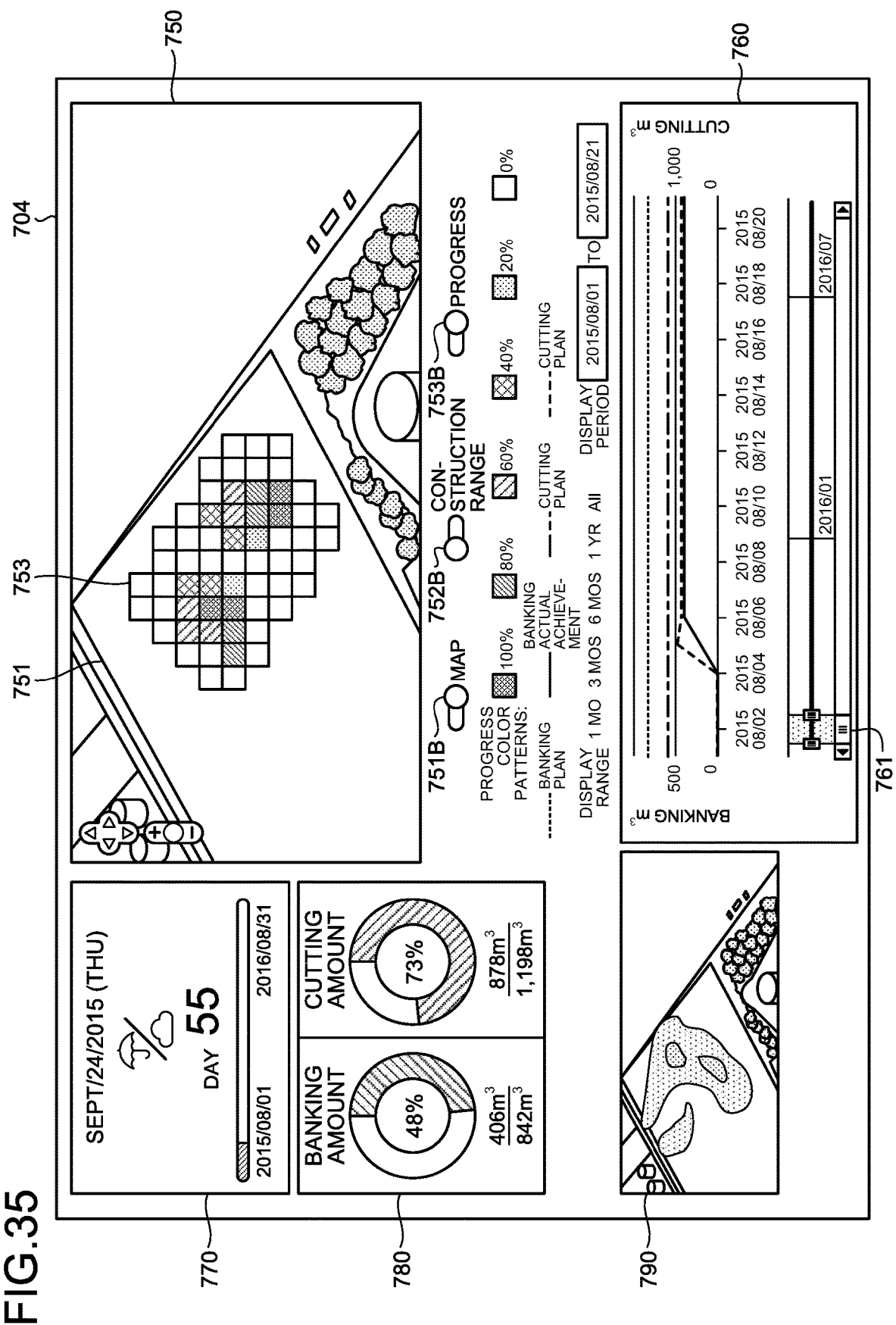
FIG. 35 is a diagram illustrating exemplary output of the output device according to the present embodiment.

FIG. 35 is a diagram illustrating another exemplary display of the display device 704 according to the present embodiment. In the example illustrated in FIG. 35, an image of a nimbus radar in the construction site A is displayed as one of weather data instead of the calendar in the fifth display area 790 of the display device 704.

Note that FIG. 35 illustrates the example in which the switches 751B and 753B are turned on and the switch 752B is turned off. Consequently, the construction range image 752 is not displayed, and the captured image 751 and the progress rate image 753 are displayed in an overlapping manner in the first display area 750.

As described above, according to the present embodiment, detailed construction data of a selected construction site can be displayed on the display device 704 only by selecting a construction site from the initial image illustrated in FIG. 33. Furthermore, according to the present embodiment, at least two of current topography data, construction plan data, and construction actual achievement data are displayed in an overlapping manner on the display device 704. Since at least two of the current topography data, construction plan data, and construction actual achievement data are visualized in a compared state, a worker or a supervisor can sensuously and promptly grasp a construction state. Consequently, productivity in the construction site can be improved.

Furthermore, according to the present embodiment, current topography data includes a photographed image 751 from an aerial photograph or a satellite photograph of a current topography, construction plan data includes a construction range image 752 indicating a construction range, and construction actual achievement data includes a progress rate image 753 in which each of a plurality of partitioned areas formed by partitioning a construction range is output in a different design in accordance with a progress rate. Consequently, a worker or a supervisor can promptly and more sensuously grasp a construction state.

Additionally, according to the present embodiment, the display device 704 is made to display the selection unit as the graphical user interface to select data to be displayed on the display device 704 from among current topography data, construction plan data, and construction actual achievement data. Consequently, a worker or a supervisor can display only necessary image data or can display a plurality of optional image data in an overlapping manner only by operating the display device 704.

Furthermore, in the present embodiment, the construction plan data output unit 28 causes the display device 704 to display at least one of construction plan data and construction actual achievement data in a graph format for each construction day. Consequently, a worker or a supervisor can sensuously and promptly grasp progress in the construction site.

Additionally, according to the present embodiment, the sliding unit 761 is displayed on the display device 704 as the graphical user interface to change a construction period represented by the horizontal axis (or the vertical axis) of the graph. Since the sliding unit 761 is provided, a worker or a supervisor can easily change a display range of the construction period. A worker or a supervisor can roughly confirm progress of banking or cutting in a long construction period by moving the sliding unit 761 rightward. A worker or a supervisor can confirm detailed progress of banking or cutting in a short construction period by moving the sliding unit 761 leftward.

Moreover, according to the present embodiment, the construction plan data output unit 28 causes the display device 704 to display weather data. Work efficiency in the construction site is affected by the weather in most cases. Since not only the weather on the day but also forecasted weather are displayed on the display device 704, a worker or a supervisor can easily and promptly confirm the weather data in the construction site selected in the initial image only by starting the portable terminal 7 without separately checking a television, a newspaper, and the like, for example.

Third Embodiment of Construction Management System

Figure 36:
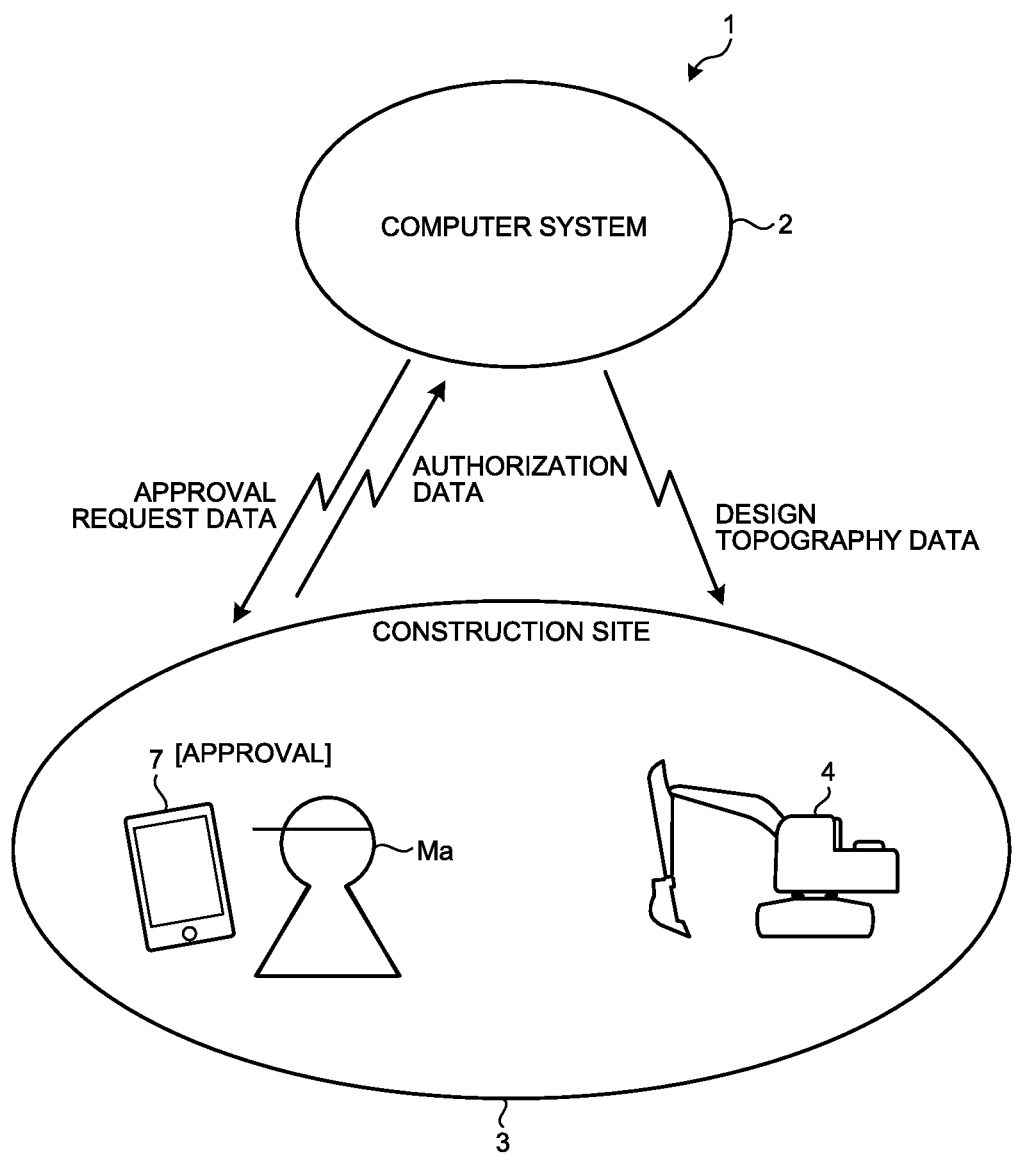
FIG. 36 is a diagram schematically illustrating a construction management system according to the present embodiment.

A third embodiment of a construction management system 1 will be described. FIG. 36 is a schematic diagram illustrating an exemplary construction management system 1 according to the present embodiment. Similar to embodiments described above, a construction machine 4 is operated in the construction site 3. Each worker Ma carries a portable terminal 7.

Similar to the above-described embodiments, the construction machine 4 can perform data communication with a computer system 2. A construction plan data output unit 28 of the computer system 2 can transmit design topography data to the construction machine 4 that constructs the construction site 3. In the present embodiment, the construction plan data output unit 28 that can transmit design topography data to the work machine 4 will be simply referred to as a data output unit 28.

The design topography data of the construction site is transmitted from the computer system 2 to the construction machine 4. The construction machine 4 controls a work member 440 on the basis of design topography data corresponding to a target shape of an excavating object such that a blade edge 440p of the work member 440 is moved along a design topography.

In the present embodiment, a construction plan data calculation unit 20 of the computer system 2 generates approval request data that requests approval for transmission of design topography data to the work machine 4. In the present embodiment, the construction plan data calculation unit 20 of the computer system 2 will be suitably referred to as an approval request data generation unit 20.

The approval request data generation unit 20 generates approval request data. Prior to transmission of the design topography data to the construction machine 4, the data output unit 28 outputs, to the portable terminal 7 including an output device 704, the approval request data that requests approval for transmission of the design topography data to the construction machine 4. The data output unit 28 transmits the design topography data to the construction machine 4 after acquiring authorization data that authorizes transmission of the design topography data from the portable terminal 7 including the output device 704.

Figure 37:
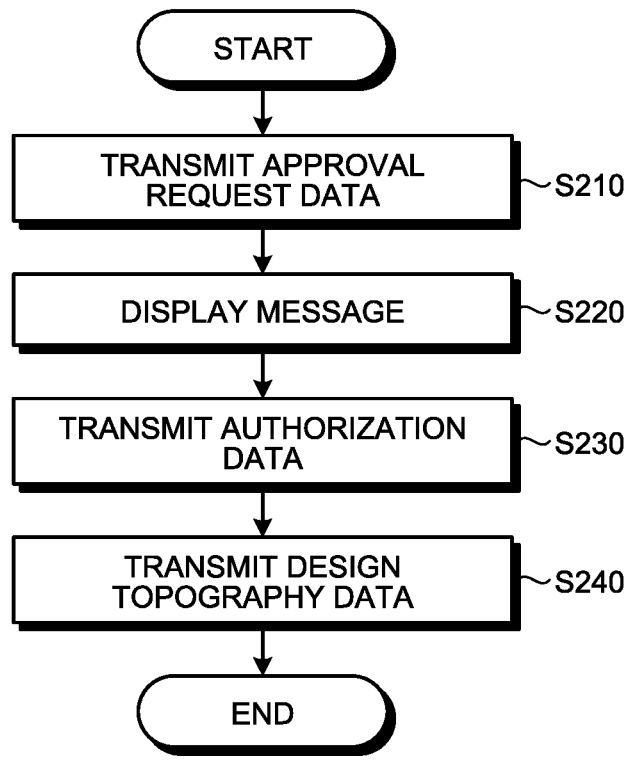
FIG. 37 is a flowchart illustrating a construction planning method according to the present embodiment.

FIG. 37 is a flowchart illustrating an exemplary construction management method according to the present embodiment. The data output unit 28 outputs the approval request data to the portable terminal 7 after the approval request data that requests approval for transmission of the design topography data to the construction machine 4 is generated in the approval request data generation unit 20 as illustrated in FIG. 37. The approval request data is transmitted from the computer system 2 to the portable terminal 7 (step S210).

Note that the data output unit 28 may transmit, to the portable terminal 7, information indicating content of the design topography data to be transmitted to the construction machine 4, together with the approval request data.

Upon receipt of the approval request data, the portable terminal 7 displays the received approval request data on the display device 704 which is the output device. In the present embodiment, the approval request data includes a message requesting approval. A message is displayed on the display device 704 of the portable terminal 7 (step S220). Here, the portable terminal 7 may display information indicating the content of the design topography data to be transmitted to the construction machine 4, together with the message to request approval. In other words, the data output unit 28 may transmit, to the portable terminal 7, approval request data including the information indicating the content of the design topography data to be transmitted to the construction machine 4. Here, the portable terminal 7 may also cause the display device 704 to first display the information indicating the content of the design topography data to be transmitted to the construction machine 4, and display the message to request approval when a predetermined time passes or a worker Ma performs operation to switch a screen.

Figure 38:
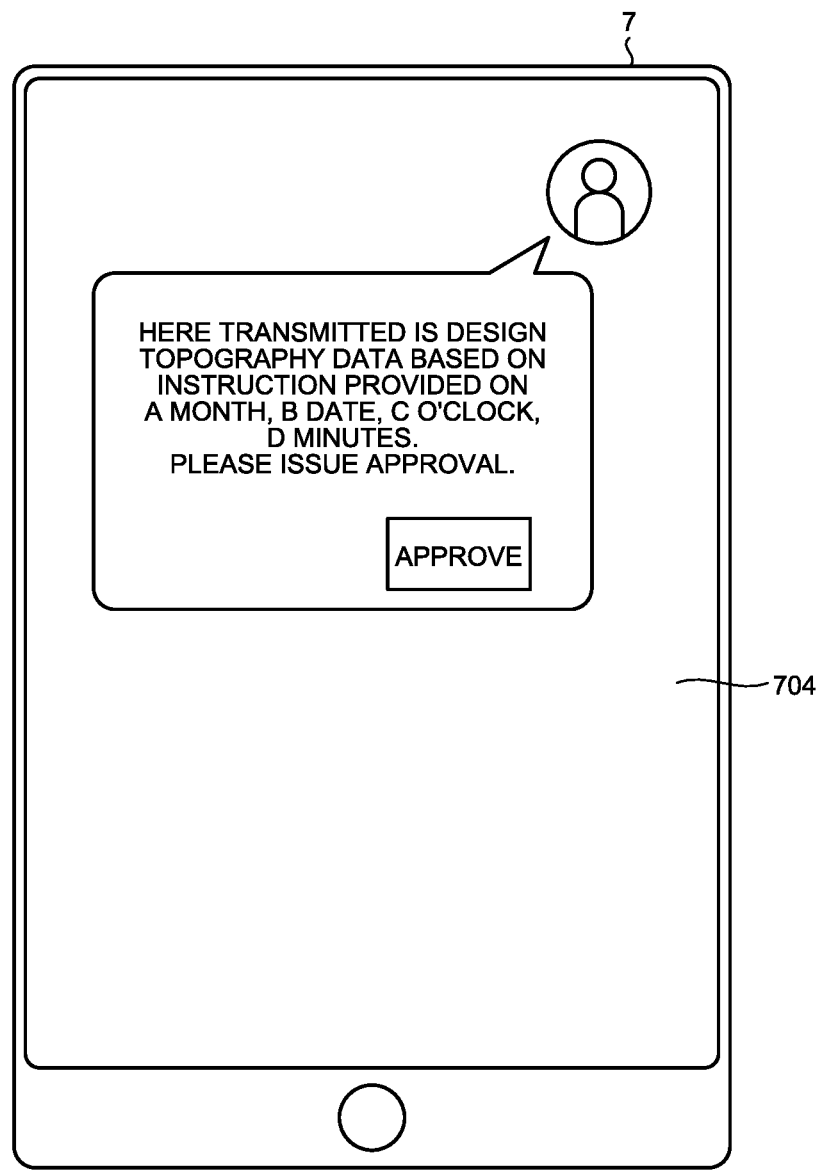
FIG. 38 is a diagram illustrating exemplary output of the output device according to the present embodiment.

FIG. 38 illustrates exemplary display of the display device 704 of the portable terminal 7. As illustrated in FIG. 38, the message to request approval is displayed on the display device 704 as character data. Similar to the above-described embodiments, design topography data is created in a construction company 12 or a support center 14. The computer system 2 of the construction management system 1 holds time data for the design topography data. In the present embodiment, the time data for the design topography data includes at least one of time data at which design topography data becomes transmittable from the computer system 2 to the portable terminal 7, and time data indicating timing when transmission of the design topography data is requested. The time data at which the design topography data becomes transmittable from the computer system 2 to the portable terminal 7 may also be data indicating a time when the design topography data is created in the construction company 12 or the support center 14, or may also be data indicating a time when a design topography data acquisition unit 24 acquires the design topography data created in the construction company 12 or the support center 14. The time data indicating the timing when transmission of the design topography data is requested may also be data indicating timing when a worker Ma requests the construction company 12, the support center 14, or the like to create new design topography data or change the design topography data due to design change in the construction site. Also, the message to request approval does not necessarily include display of time data. Furthermore, the message to request approval may also include: data indicating a person (requester) who requests change or creation of design topography data; and data indicating a place of the construction site in which change or creation of design topography data is required. The message to request approval may also include data (type, machine number, and the like) to identify a construction machine 4 to which design topography data is to be transmitted from now. The time data may indicate only a date and a time without indication of hours and minutes.

The approval request data includes, for example, the time data at which design topography data becomes transmittable from the computer system 2 to the portable terminal 7. For example, the time data is data indicating the time at which the design topography data acquisition unit 24 acquires design topography data created in the construction company 12 or the support center 14, and in the case where the time data at which the design topography data acquisition unit 24 acquires the design topography data is "A month, B date, C o'clock, D minutes", the display device 704 displays a message describing "Here transmitted is design topography data based on the instruction provided on A month, B date, C o'clock, D minutes" as illustrated in FIG. 38.

Note that the content of the message illustrated in FIG. 38 is an example. In the case where time data is data indicating the time when design topography data is created in the construction company 12 or the support center 14, a name of a person in charge who has created the design topography data and a creation time of the design topography data may be displayed on the display device 704 together with approval request data. For example, image data indicating the design topography data as described with reference to FIG. 14 may be also displayed on the display device 704 together with the approval request data.

The display device 704 includes a touch panel. As illustrated in FIG. 38, an "approve" button is displayed on the display device 704. In the case of approving transmission of the design topography data from the computer system 2 to the construction machine 4, a worker Ma operates (taps) the "approve" button. Since the "approve" button is operated, the portable terminal 7 generates authorization data indicating authorization to transmit the design topography data from the computer system 2 to the construction machine 4, and transmits the authorization data to the computer system 2 (step S230).

Here, a "disapprove" button indicating unauthorization of transmission of the design topography data from the computer system 2 to the construction machine 4 may also be displayed on the display device 704. In this case, when a worker Ma does not approve transmission of the design topography data from the computer system 2 to the construction machine 4, the worker operates (taps) the "disapprove" button displayed on the display device 704. When the "disapprove" button is operated, the portable terminal 7 generates unauthorized data indicating unauthorization to transmit the design topography data from the computer system 2 to the construction machine 4, and transmits the unauthorized data to the computer system 2.

The computer system 2 acquires the authorization data generated in the portable terminal 7 on the basis of transmission of the approval request data. After acquiring, from the portable terminal 7, the authorization data that authorizes transmission of the design topography data from the computer system 2 to the construction machine 4, the data output unit 28 transmits the design topography data to the construction machine 4 (step S240).

The construction machine 4 having acquired the design topography data can control the work member 440 such that the blade edge 440p of the work member 440 is moved along the design topography on the basis of the design topography data.

Meanwhile, in the case where design topography data is stored in a storage device 402 of the construction machine 4, a processor 401 of the construction machine 4 updates (rewrites) the design topography data stored in the storage device 402 with the design topography data transmitted from the data output unit 28 of the computer system 2. The construction machine 4 controls the work member 440 on the basis of the updated design topography data.

Meanwhile, in the case where the design topography data is not stored in the storage device 402 of the construction machine 4, the processor 401 of the construction machine 4 causes the storage device 402 to store the design topography data transmitted from the data output unit 28 of the computer system 2. The construction machine 4 controls the work member 440 on the basis of the design topography data newly stored in the storage device 402.

As described above, according to the present embodiment, approval work by a worker Ma is performed before transmitting the design topography data from the computer system 2 to the construction machine 4. After the approval is provided, the design topography data is transmitted from the computer system 2 to the construction machine 4. Consequently, transmission of erroneous design topography data to the construction machine 4 is suppressed. In the case where erroneous design topography data is transmitted to the construction machine 4, construction based on correct design topography data is not performed, construction is started over again, and productivity in the construction site 3 may be decreased. Since transmission of erroneous design topography data to the construction machine 4 is suppressed by performing the approval work, productivity in the construction site 3 can be improved.

Additionally, according to the present embodiment, since approval work by a worker Ma is performed, it is possible to suppress transmission of new design topography data to the construction machine 4 and perform updating with the new design topography data despite a fact that construction based on the existing design topography data is not yet completed. Consequently, progress management for the construction site 3 can be accurately executed.

Furthermore, according to the present embodiment, approval request data includes time data at which design topography data becomes transmittable. The time data at which the design topography data becomes transmittable includes at least one of: time data at which the design topography data is created in the construction company 12 or the support center 14; and time data at which the design topography data acquisition unit 24 acquires the design topography data created in the construction company 12 or the support center 14. Since the approval request data includes the time data, a worker Ma who looks at the display device 704 of the portable terminal 7 can identify the design topography data to be approved on the basis of the time data. Consequently, erroneous design topography data and design topography data that should not be updated are prevented from being approved.

Additionally, since the approval request data includes a message, and includes time data and creator data to identify design topography data or includes image data of the design topography data, erroneous design topography data and design topography data that should not be updated can be surely prevented from being transmitted to the construction machine 4.

Note that the approval request data may also be output to at least one of an information terminal 8, an information terminal 13, and an information terminal 15. Approval may be performed not only by a worker Ma in the construction site 3 but also by a worker Mb in the construction company 12 or by a worker Mc in the support center 14.

Meanwhile, in the present embodiment, it is assumed that approval request data is transmitted from the computer system 2 to the portable terminal 7, and authorization data (or unauthorization data) is transmitted to the computer system 2 from the portable terminal 7 having received the approval request data. In other words, in the present embodiment, it is assumed that the portable terminal 7 that receives approval request data and the portable terminal 7 that transmits authorization data are the same device. The portable terminal 7 that receives approval request data and the portable terminal 7 that transmits authorization data (or unauthorization data) may also be separate devices. For example, a portable terminal for reception only and a portable terminal for transmission only are provided, and approval request data is transmitted from the computer system 2 to a portable terminal for reception only. A worker operates the portable terminal for transmission only, and generates authorization data in the portable terminal for transmission only on the basis of the approval request data transmitted from the computer system 2 and received in the portable terminal for reception only. The authorization data generated in the portable terminal for transmission only is transmitted to the computer system 2. After acquiring the authorization data from the portable terminal for transmission only, the computer system 2 transmits design topography data to the work machine 4.

Here, note that a portable terminal is exemplified as a device for reception only, and a portable terminal is exemplified as a device for transmission only. The device for reception only and the device for transmission only are not needed to be portable computers such as a smartphone or a tablet type personal computer, and at least one of the device for reception only and the device for transmission only may be a stationary device such as a personal computer.

Meanwhile, approval request data may be transmitted to the construction machine 4, and approval request data may also be output to output devices 404A and 404B provided in an operator's compartment of the construction machine 4. A worker (operator) who operates the construction machine 4 may operate the output devices 404A and 404B and transmit authorization data to the computer system 2 via an input/output interface circuit 405 of the construction machine 4.

Fourth Embodiment of Construction Management System

Figure 39:
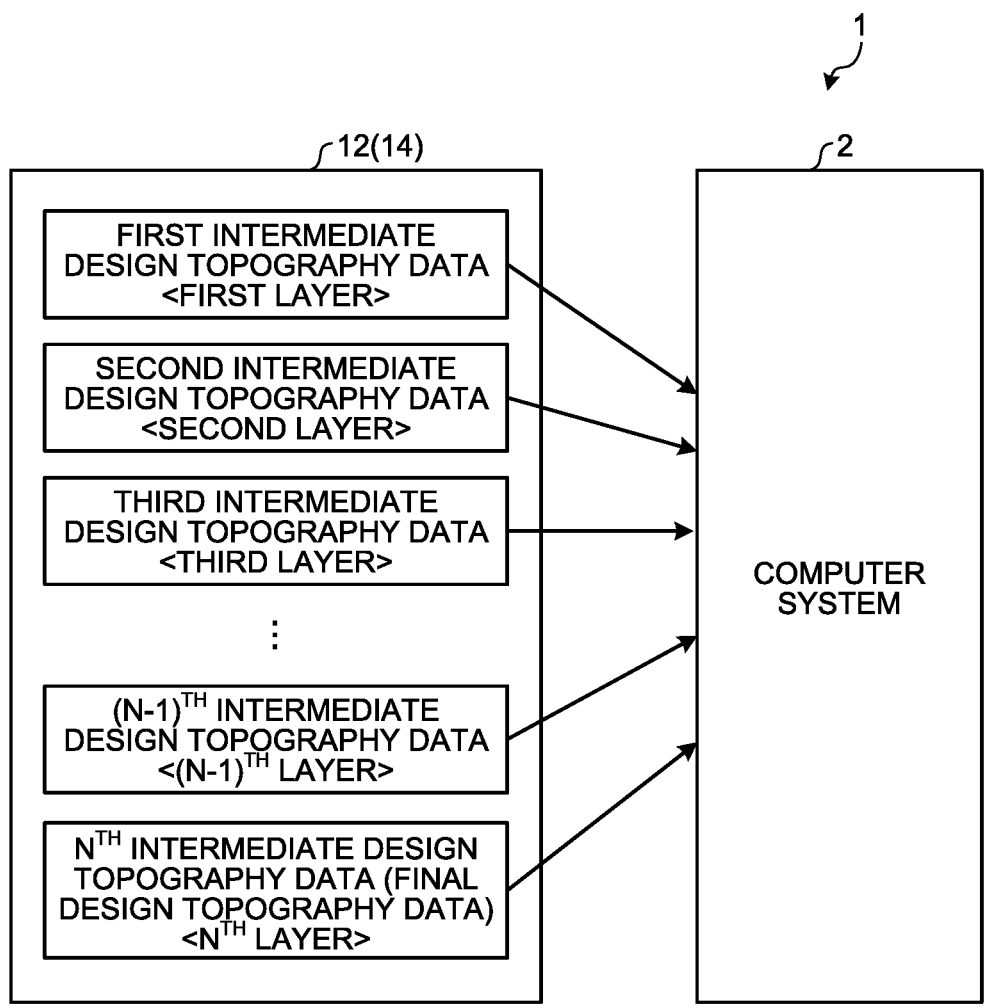
FIG. 39 is a schematic diagram illustrating an exemplary construction management system according to the present embodiment.

A fourth embodiment of the construction management system 1 will be described. FIG. 39 is a schematic diagram illustrating an exemplary construction management system 1 according to the present embodiment. Design topography data is created in a construction company 12 or a support center 14.

In the present embodiment, final design topography data indicating a design topography at a time point of completing construction, and intermediate design topography data indicating a design topography at a halfway time point of construction before completing the construction are created as the design topography data. The halfway time point of construction is a predetermined time point during a period from a time point of starting the construction to the time point of completing the construction.

In the present embodiment, the intermediate design topography data includes a design topography at each of a plurality of halfway time points of the construction. A design topography data acquisition unit 24 of a computer system 2 acquires intermediate design topography data at each of the plurality of halfway time points of the construction.

Additionally, in the case where a plurality of construction layers is sequentially generated by performing defined construction including at least one of banking and cutting, intermediate design topography data includes a design topography of each of the plurality of construction layers appearing on a ground surface. For example, in a case where the plurality of construction layers is sequentially stacked by performing banking, the intermediate design topography data includes a design topography of a surface of a construction layer obtained after stacking the layers. Furthermore, in the case where a plurality of construction layers is sequentially removed by performing cutting, the intermediate design topography data includes a design topography of a ground surface obtained after removing the construction layers.

In the example illustrated in FIG. 39, generated are: first intermediate design topography data indicating a design topography at a first halfway time point of construction after a first time period elapses from a time point of starting construction; a second intermediate design topography data indicating a design topography at a second halfway time point of construction after a second time period longer than the first time period elapses from the time point of starting construction; third intermediate design topography data indicating a design topography at a third halfway time point of construction after a third time period longer than the second time period elapses from the time point of starting construction; $(N-1)^{th}$ intermediate design topography data indicating a design topography at a $(N-1)^{th}$ halfway time point of construction after a $(N-1)^{th}$ time period elapses from the time point of starting construction; and $N^{th}$ intermediate design topography data indicating a design topography at an $N^{th}$ halfway time point of construction after an $N^{th}$ time period elapses from the time point of starting construction. In the present embodiment, the $N^{th}$ intermediate design topography data is the final design topography data.

The design topography data acquisition unit 24 of the computer system 2 acquires the final design topography data and the intermediate design topography data.

Figure 40:
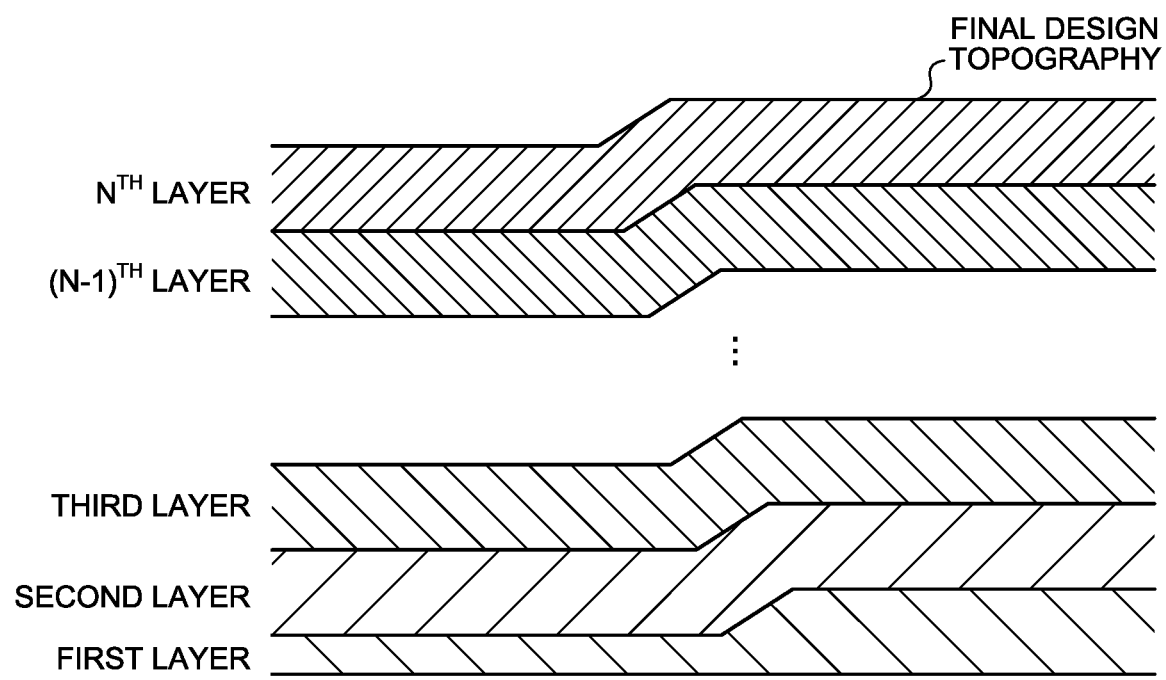
FIG. 40 is a schematic diagram to describe intermediate design topography data and final design topography data according to the present embodiment.

FIG. 40 is a schematic diagram to describe intermediate design topography data and final design topography data according to the present embodiment. FIG. 40 illustrates a sectional side view of each of the intermediate design topography data and the final design topography data. As illustrated in FIG. 40, in a construction site 3, construction to sequentially stack a plurality of construction layers may be performed by sequentially performing banking in order to obtain a final design topography. In the example illustrated in FIG. 40, a second layer is formed on a first layer, a third layer is formed on the second layer, and an $N^{th}$ layer is formed on a $(N-1)^{th}$ layer. Banking to form the second layer is performed after a time point of completing banking of the first layer, banking to form the third layer is performed after a time point of completing banking of the second layer, and banking to form the $(N-1)^{th}$ layer is performed after a time point of completing banking of the $N^{th}$ layer.

Note that a soil layer, a gravel layer, a sand layer, a concrete layer, and the like are exemplified as the plurality of construction layers. Note that the number of construction layers and a kind of a construction layer are arbitrary.

In the example illustrated in FIG. 40, the first intermediate design topography data indicates a design topography of a surface of the first layer. The second intermediate design topography data indicates a design topography of a surface of the second layer. The third intermediate design topography data illustrates a design topography of a surface of the third layer. The $(N-1)^{th}$ intermediate design topography data indicates a design topography of a surface of the third layer. The $N^{th}$ intermediate design topography data (final design topography data) indicates a design topography of a surface of the $N^{th}$ layer.

Figure 41:
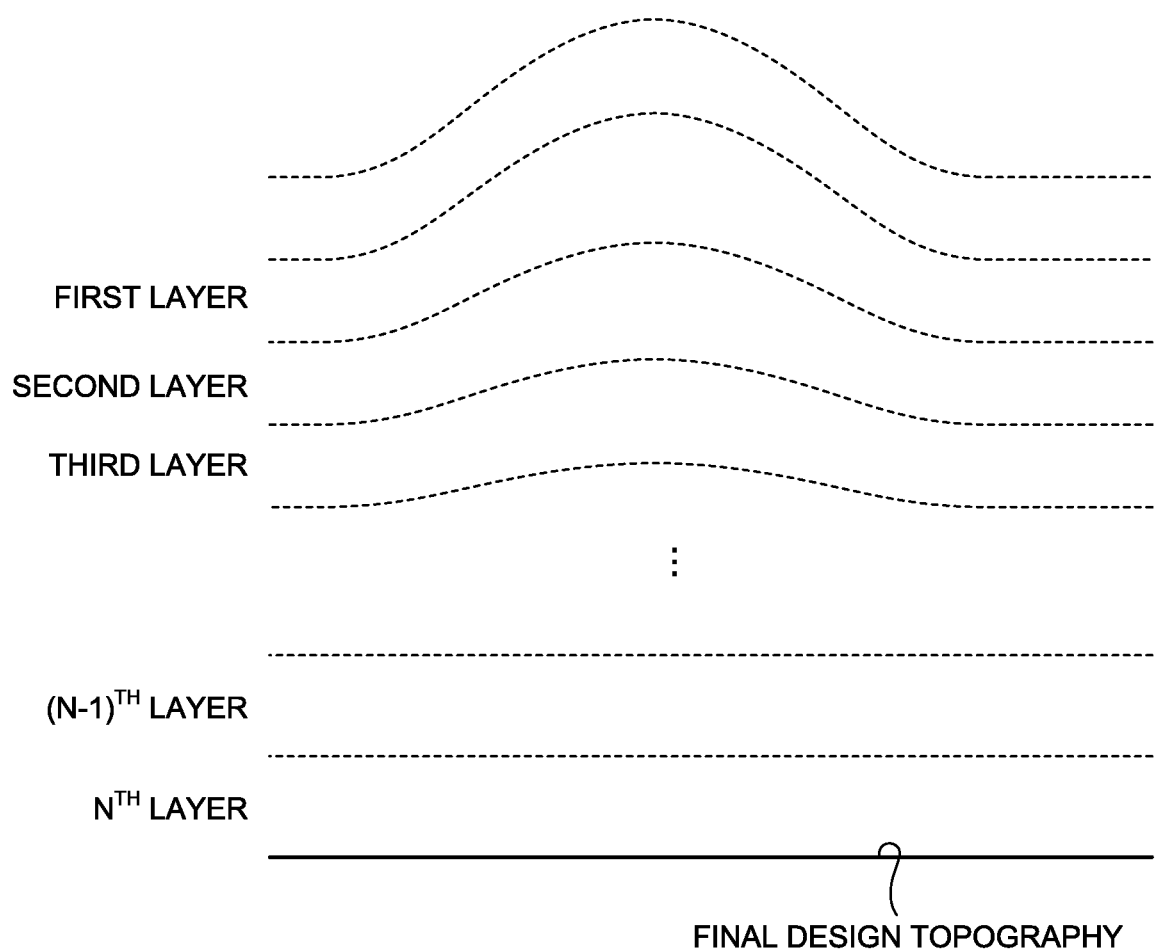
FIG. 41 is a schematic diagram to describe intermediate design topography data and final design topography data according to the present embodiment.

FIG. 41 is a schematic diagram to describe intermediate design topography data and final design topography data according to the present embodiment. FIG. 41 illustrates a sectional side view of each of the intermediate design topography data and the final design topography data. As illustrated in FIG. 41, in a construction site 3, construction to sequentially remove a plurality of construction layers may be performed by sequentially performing cutting in order to obtain a final design topography. In the example illustrated in FIG. 41, a surface of a first layer appears by removing a part of the ground surface of the construction site 3, and a surface of a second layer under the first layer appears by removing the first layer, a surface of a third layer under the second layer appears by removing the second layer, and a surface of an $N^{th}$ layer under a $(N-1)^{th}$ layer appears by removing the $(N-1)^{th}$ layer. Cutting to remove the second layer is performed after a time point of completing cutting of the first layer, cutting to remove the third layer is performed after a time point of completing cutting of the second layer, and cutting to remove the $N^{th}$ layer is performed after a time point of completing cutting of the $(N-1)^{th}$ layer.

In the example illustrated in FIG. 41, the first intermediate design topography data illustrates a design topography of the surface of the first layer. The second intermediate design topography data indicates a design topography of the surface of the second layer. The third intermediate design topography data illustrates a design topography of the surface of the third layer. The $(N-1)^{th}$ intermediate design topography data indicates a design topography of the surface of the third layer. The $N^{th}$ intermediate design topography data (final design topography data) indicates a design topography of the surface of the $N^{th}$ layer.

Thus, the intermediate design topography data illustrates a design topography in a halfway stage of the construction. Since the intermediate design topography data is accumulated, whether the first layer is constructed in accordance with a design surface can be checked in a halfway stage of the construction by, for example, comparing intermediate current topography data of a measured first layer with intermediate design topography data of the first layer after constructing the first layer.

In the present embodiment, a construction plan data output unit 28 causes a display device 704 of a portable terminal 7 to display intermediate design topography data. Additionally, the construction plan data output unit 28 can cause the display device 704 to display at least two pieces of intermediate design topography data at the same time from among a plurality of pieces of intermediate design topography data.

In the present embodiment, a worker Ma can designate, by operating an input device 703, intermediate design topography data to be displayed on the display device 704 from among the plurality of pieces of intermediate design topography data.

Furthermore, in the present embodiment, acquired as current topography data are: final current topography data indicating a current topography at the time point of completing construction; and intermediate current topography data indicating a current topography at a halfway time point of construction. The halfway time point of construction is a predetermined time point during a period from a time point of starting construction to the time point of completing the construction.

Final current topography data and intermediate current topography data are acquired by using a drone 10, a stereo camera, a three-dimensional laser scanner device, and the like at a time point of completing construction and at a halfway time point of the construction. A current topography data acquisition unit 22 of the computer system 2 acquires the final current topography data and the intermediate current topography data.

In the present embodiment, the intermediate current topography data includes a current topography at each of the plurality of halfway time points of the construction. The current topography data acquisition unit 22 of the computer system 2 acquires the intermediate current topography data in each of the plurality of halfway time points of the construction.

In the present embodiment, the construction plan data output unit 28 causes the display device 704 of the portable terminal 7 to optionally displays at least two pieces of topography data at the same time out of intermediate design topography data, intermediate current topography data, final design topography data, and final current topography data.

Figure 42:
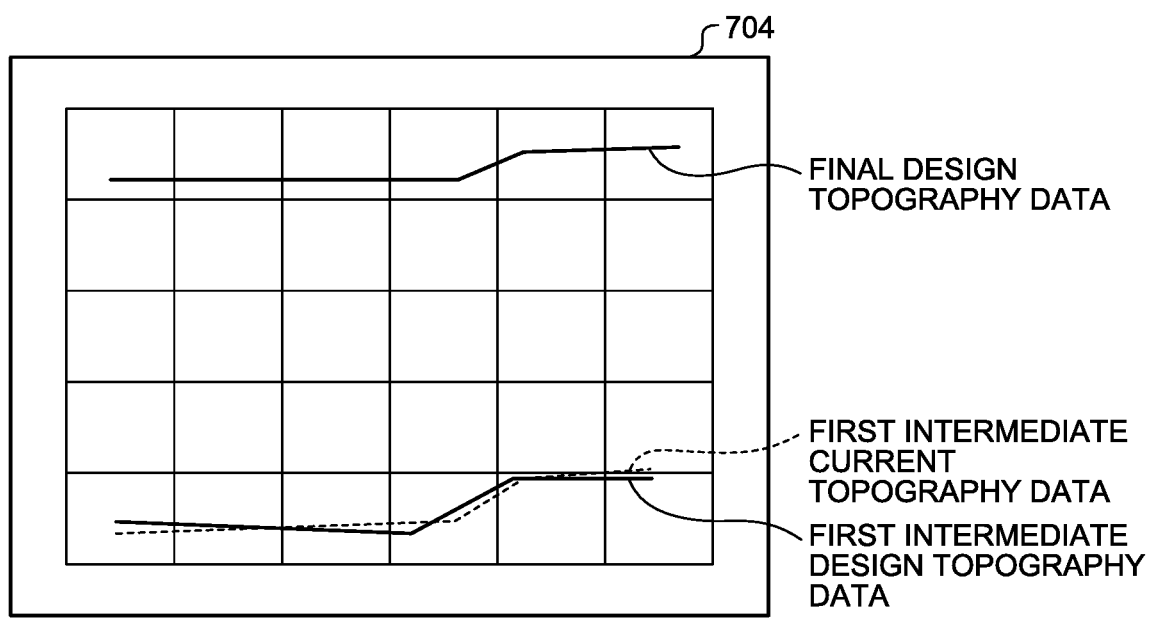
FIG. 42 is a diagram illustrating exemplary output of the output device according to the present embodiment.

FIG. 42 is a diagram illustrating exemplary display of the display device 704 according to the present embodiment. Note that display data displayed on the display device 704 described below may be displayed on not only the display device 704 of the portable terminal 7 but also on at least one of a display device 804 of an information terminal 8 and a display device 134 of an information terminal 13, and a display device 154 of an information terminal 15, and may also be displayed on a display device provided in a construction machine 4 (excavator 4A and bulldozer 4B).

FIG. 42 illustrates an example in which first intermediate design topography data and final design topography data are designated by a worker Ma operating the input device 703, and a sectional side view in each thereof is displayed on the display device 704. Additionally, in FIG. 42, current topography data (first intermediate current topography data) at a time point when construction is performed so as to conform to the first intermediate design topography data is also displayed. With this display, a worker compares the first intermediate design topography data with the current topography data (first intermediate current topography data) at the time point when the construction is performed so as to conform to the first intermediate design topography data, and can confirm a progress level in a halfway stage of the construction from the comparison result. Additionally, a work extent required from a current point to a time point of completion can be confirmed by displaying also the final design topography data at the same time.

Meanwhile, the current topography data in each of a plurality of time points, for example, first intermediate current topography data, third intermediate current topography data, and final current topography data are stored in a result database 34, and the construction plan data output unit 28 may cause the display device 704 to display the plurality of pieces of current topography data at the same time.

Figure 43:
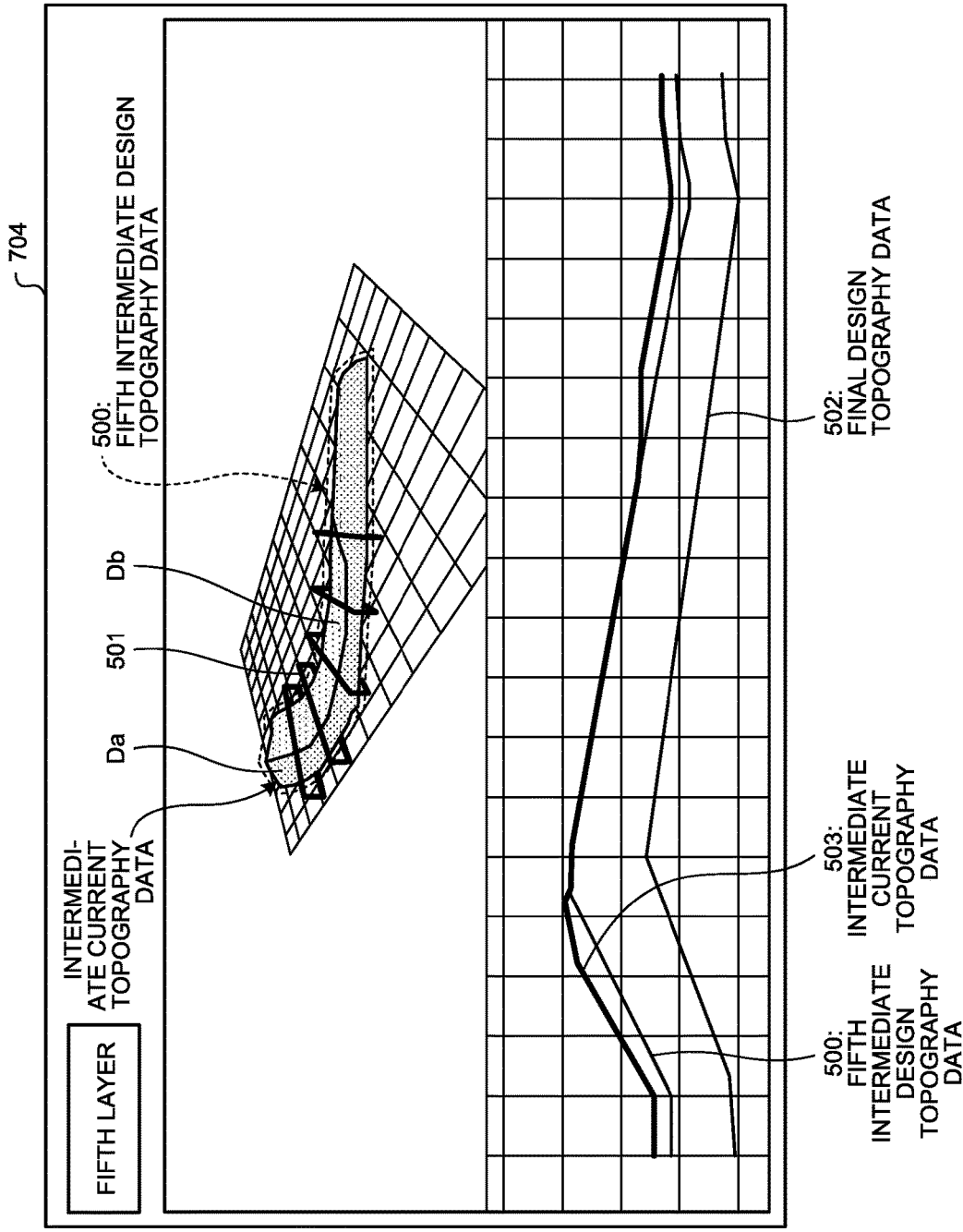
FIG. 43 is a diagram illustrating exemplary output of the output device according to the present embodiment.

FIG. 43 is a diagram illustrating exemplary display of the display device 704 according to the present embodiment. FIG. 43 illustrates an example in which fifth intermediate design topography data indicating a fifth layer is designated by a worker Ma operating the input device 703, and the fifth intermediate design topography data and intermediate current topography data at a time point when construction is performed so as to conform to the fifth intermediate design topography data are three-dimensionally displayed on the display device 704 at the same time. The construction plan data output unit 28 causes the display device 704 to display three-dimensional data of each of the intermediate design topography data (fifth intermediate design topography data) and the intermediate current topography data (fifth intermediate current topography data) at the time point when the construction is performed so as to conform to the intermediate design topography data. As illustrated in FIG. 43, the display device 704 can three-dimensionally display each of the intermediate design topography data and the intermediate current topography data. In the example illustrated in FIG. 43, an area Da displayed in a first display style (color, pattern, and the like) indicates an area of the intermediate current topography data which conforms to intermediate design topography data or is located within a predetermined error range. An area Db displayed in a second display style (color, pattern, and the like) different from the first display style indicates an area of the intermediate current topography data which conforms to the intermediate design topography data. In other words, the area Da indicates the area where construction is performed in accordance with the intermediate design topography data, and the area Db indicates the area where construction is not performed in accordance with the intermediate design topography data and additional banking or cutting is required.

Additionally, in the example illustrated in FIG. 43, a worker Ma operates the input device 703 to designate a cross section 501 of the intermediate design topography data (fifth intermediate design topography data) 500 on a display screen of the display device 704, and a sectional side view of the cross section 501 can be displayed.

The construction plan data output unit 28 causes the display device 704 to display the cross section display data indicating the cross section of the designated intermediate design topography data 500 in the designated cross section 501. Additionally, the construction plan data output unit 28 causes the display device 704 to display cross section display data indicating a cross section of intermediate current topography data 503 corresponding to the designated intermediate design topography data in the designated cross section 501. Furthermore, the construction plan data output unit 28 causes the display device 704 to display cross section display data indicating a cross section 502 of designated final design topography data in the designated cross section 501.

Thus, in the present embodiment, the construction plan data output unit 28 causes the display device 704 to output: three-dimensional display data of each of the intermediate design topography data 500 and the intermediate current topography data 503, and the cross section display data of each of the intermediate design topography data 500, the intermediate current topography data 503, and the final design topography data.

Furthermore, a construction actual achievement data acquisition unit 21 acquires construction actual achievement data indicating construction actual achievement relative to intermediate design topography data as for a construction layer at a certain halfway time point of construction, on the basis of intermediate design topography data and intermediate current topography data as for the construction layer corresponding to the certain halfway time point of the construction. For example, the construction actual achievement data acquisition unit 21 calculates progress rate data indicating a progress rate of construction relative to the fifth intermediate design topography data on the basis of the fifth intermediate design topography data and fifth intermediate current topography data for the fifth layer. The construction plan data output unit 28 causes the display device 704 to display construction actual achievement data relative to the fifth intermediate design topography data.

FIG. 44 is a diagram illustrating exemplary display of the display device 704 according to the present embodiment. FIG. 44 illustrates an example in which the input device 703 is operated by a worker Ma and construction actual achievement data for a fifth layer is displayed on the display device 704. Similar to the above-described embodiments, the construction actual achievement data includes progress rate data of construction. FIG. 44 illustrates the example in which the progress rate data of construction is displayed on the display device 704 as the construction actual achievement data. As illustrated in FIG. 44, map data of the construction site 3 is displayed, and a plurality of areas of the map data is displayed in different designs on the basis of progress rates. In the example illustrated in FIG. 44, an area in which a progress is 100 [%] is displayed in a first color (for example, a blue color), an area where a progress rate is 50 [%] is displayed in a second color (for example, a yellow color), and an area in which a progress rate is 0 [%] is displayed in a second color (for example, a red color). The progress rates and the display designs in the map data may be expressed by using the more number of levels.

As described above, in the present embodiment, the construction plan data output unit 28 can cause the display device 704 to display a plurality of pieces of intermediate design topography data at the same time. Consequently, a worker Ma can confirm a design topography in each of a plurality of halfway stages of the construction by looking at the display screen of the display device 704.

Furthermore, in the present embodiment, the construction plan data output unit 28 can cause the display device 704 of the portable terminal 7 to display intermediate design topography data and the intermediate current topography data at the same time. Consequently, a worker Ma can confirm a difference between a design topography and a current topography in a halfway stage of the construction by looking at the display screen of the display device 704. Since the difference between the design topography and the current topography in a halfway stage of the construction is visualized, a worker or a supervisor can sensuously and promptly grasp a construction plan or a construction state. Consequently, productivity in the construction site can be improved.

Furthermore, in the present embodiment, the construction plan data output unit 28 can cause the display device 704 to display intermediate design topography data, intermediate current topography data, and final design topography data at the same time. Consequently, a worker Ma can confirm a difference between the intermediate design topography and the intermediate current topography, and a difference between the final design topography and the intermediate current topography by looking at the display screen of the display device 704.

Additionally, in the present embodiment, the construction plan data output unit 28 causes the display device 704 to display construction actual achievement data relative to the intermediate design topography data. Consequently, a worker Ma can confirm progress of construction for a certain construction layer (for example, fifth layer) by looking at the display screen of the display device 704.

Meanwhile, in the above embodiment, it is assumed that the computer system 2 acquires design topography data. Design topography data created in the construction company 12 or the support center 14 may be directly transmitted to the construction machine 4 via an input/output interface circuit 405 of the construction machine 4, not via the computer system 2. Also, design topography data may also be created in a processor 401 of the construction machine 4 instead of being created in the construction company 12 or the support center 14. Approval request data to request approval for use of the design topography data may be output to output devices 404A and 404B provided in an operator's compartment of the construction machine 4. A worker (operator) who operates the construction machine 4 may operate the output devices 404A and 404B to output, to the processor 401 of the construction machine 4, authorization data that authorizes use of the design topography data.

Meanwhile, in each of the above-described embodiments, it is assumed that design topography data is generated by an information terminal 13 of the construction company 12 or an information terminal 15 of the support center 14, and the design topography data acquisition unit 24 of the computer system 2 acquires the design topography data from the construction company 12 or the support center 14. The design topography data may also be generated in the computer system 2 of the construction management system 1. In this case, the computer system 2 may include a design topography data generation unit to generate design topography data in the place of the design topography data acquisition unit 24 of the computer system 2 or generate the design topography data together with the design topography data acquisition unit 24.

Note that three-dimensional current topography data may be detected by a stereo camera mounted on the construction machine 4 in each of the above-described embodiments. With the stereo camera mounted on the construction machine 4, it is possible to surely acquire current topography data that is a result of construction performed by the construction machine 4 itself, and also, it is possible to surely acquire current topography data for an area where current topography data cannot be acquired by a drone 10 due to a situation that the drone 10 can be hardly made to fly as described above. Thus, acquisition of current topography data may be performed by using the drone 10 and the stereo camera in combination. Note that the stereo camera may be installed in the construction site in a movable manner.

Alternatively, a three-dimensional laser scanner device that optically acquires current topography data by irradiating a surface of a current topography with laser beams as detection light may also be used to acquire three-dimensional current topography data. Additionally, a triangular surveying device may also be used to acquire three-dimensional current topography data.

Meanwhile, in the above embodiments, the example in which the output device (such as output device 704) is a display device has been mainly described. The output device may also be a printing device. Output by the output device includes printing (print-out) by the printing device. In other words, each display data (image data and character data) displayed on the display device 704 described in the above-described embodiments may be output as a printed matter.

Note that the example in which the construction machine 4 is an ICT construction machine has been described in the above embodiments. In the case where current topography data is acquired every time by first detection devices such as a drone, a stereo camera, or and three-dimensional laser scanner device, a construction plan (construction plan data) can be proposed to a supervisor or a worker not by the ICT construction machine but by a construction management system using a normal construction machine not mounted with a device that can perform computer aided construction.

REFERENCE SIGNS LIST

1 CONSTRUCTION MANAGEMENT SYSTEM
2 COMPUTER SYSTEM
3 CONSTRUCTION SITE
4 CONSTRUCTION MACHINE
4A EXCAVATOR
4B BULLDOZER
5 HAULAGE VEHICLE
6 GPS SATELLITE
7 PORTABLE TERMINAL
8 INFORMATION TERMINAL
9 SITE OFFICE
10 DRONE
11 CAMERA
12 CONSTRUCTION COMPANY
13 INFORMATION TERMINAL
14 SUPPORT CENTER
15 INFORMATION TERMINAL
20 CONSTRUCTION PLAN DATA CALCULATION UNIT
21 CONSTRUCTION ACTUAL ACHIEVEMENT DATA ACQUISITION UNIT
22 CURRENT TOPOGRAPHY DATA ACQUISITION UNIT
23 MODE DATA ACQUISITION UNIT
24 DESIGN TOPOGRAPHY DATA ACQUISITION UNIT
25 BASIC UNIT DATA ACQUISITION UNIT
26 CONSTRUCTION CONDITION DATA ACQUISITION UNIT
27 VARIATION FACTOR DATA ACQUISITION UNIT
28 CONSTRUCTION PLAN DATA OUTPUT UNIT
29 REMOTE CONTROL UNIT
31 BASIC UNIT DATABASE
32 CONSTRUCTION CONDITION DATABASE
33 VARIATION FACTOR DATABASE
34 RESULT DATABASE
Ma WORKER
Mb WORKER
Mc WORKER

The invention claimed is:
1. A construction management system comprising:
a current topography data acquisition unit configured to acquire current topography data indicating a current topography of a construction site;
a design topography data acquisition unit configured to acquire design topography data indicating a design topography of the construction site;
a construction plan data calculation unit configured to calculate construction plan data including earth cutting plan data and earth banking plan data by collating the current topography data with the design topography data;
a construction plan data output unit configured to output the construction plan data to an output device;
a construction actual achievement data acquisition unit configured to wirelessly receive construction actual achievement data from a work machine indicating construction actual achievement in the construction site, wherein the construction actual achievement data is based on absolute position of a blade edge of a work member of the work machine calculated on the basis of a detected absolute position of a vehicle body of the work machine and a detected relative position between the vehicle body and the blade edge of the work member and wherein the construction actual achievement data is received from the work machine during operation of the work machine at the construction site, the construction actual achievement data being received from the work machine in at least one of a fixed time in a day, periodically in a day, or real time;
a processor configured to process functions of the construction actual achievement data acquisition unit based on the construction actual achievement data received from the work machine, to determine progress rate data indicating a progress rate of construction relative to the design topography data, and to output progress rate data; and a computer system including the processor configured to process functions at least of the design topography data acquisition unit, the construction plan data calculation unit, the construction plan data output unit, and the construction actual achievement data acquisition unit.

2. The construction management system according to claim 1, wherein the construction plan data output unit causes the output device to output at least two of the current topography data, the design topography data, construction range data, the cutting plan data, and the banking plan data in an overlapping manner.

3. The construction management system according to claim 1, wherein
the cutting plan data includes cutting region data indicating a region requiring earth cutting,
the banking plan data includes banking region data indicating a region requiring earth banking is required, and
the construction plan data output unit causes the output device to output one or both of the cutting region data and the banking region data.

4. The construction management system according to claim 1, wherein
the construction plan data calculation unit calculates cutting numerical data indicating an earth cutting amount and banking numerical data indicating an earth banking amount, and
the construction plan data output unit causes the output device to output one or both of the cutting numerical data and the banking numerical data.

5. The construction management system according to claim 1, comprising
the construction actual achievement data acquisition unit configured to acquire construction actual achievement data indicating construction actual achievement in the construction site, wherein
the construction plan data output unit causes the output device to output the construction actual achievement data for each process of the construction and for each construction day.

6. The construction management system according to claim 1, comprising
a basic unit data acquisition unit configured to acquire basic unit data indicating conditions of the work machine that constructs the construction site, wherein
the construction plan data calculation unit calculates the construction plan data for each process of the construction on the basis of the current topography data, the design topography data, and the basic unit data,
the construction plan data includes construction amount data indicating a construction amount required for the process, work machine data indicating a type and number of the work machines required for the process, work basic unit data indicating a workload that can be performed by the work machine per unit time, and necessary time data indicating a time until the process is completed,
the construction plan data output unit causes the output device to output the construction amount data, the work machine data, the work basic unit data, and the necessary time data.

7. The construction management system according to claim 1, wherein
the construction plan data output unit causes the output device to output weather data.

8. The construction management system according to claim 1, wherein the construction plan data output unit is configured to transmit the design topography data to the work machine that constructs the construction site, output, to the output device, approval request data that requests approval for transmission of the design topography data to the work machine, and transmit the design topography data to the work machine after acquiring authorization data that authorizes transmission of the design topography data.

9. A construction management system comprising:
a current topography data acquisition unit configured to acquire current topography data indicating a current topography of a construction site;
a design topography data acquisition unit configured to acquire design topography data indicating a design topography of the construction site;
a construction plan data calculation unit configured to calculate construction plan data indicating a construction plan in the construction site by collating the current topography data with the design topography data;
a construction actual achievement data acquisition unit configured to wirelessly receive construction actual achievement data from a work machine indicating construction actual achievement in the construction site, wherein the construction actual achievement data is based on absolute position of a blade edge of a work member of the work machine calculated on the basis of a detected absolute position of a vehicle body of the work machine and a detected relative position between the vehicle body and the blade edge of the work member and wherein the construction actual achievement data is received from the work machine during operation of the work machine at the construction site, the construction actual achievement data being received from the work machine in at least one of a fixed time in a day, periodically in a day, or real time;
a construction plan data output unit configured to output the construction plan data and the construction actual achievement data to an output device;
a processor configured to process functions of the construction actual achievement data acquisition unit based on the construction actual achievement data received from the work machine, to determine progress rate data indicating a progress rate of construction relative to the design topography data, and to output progress rate data; and
a computer system including the processor to process functions at least of the design topography data acquisition unit, the construction plan data calculation unit, the construction actual achievement data acquisition unit, and the construction plan data output unit.

10. The construction management system according to claim 9, wherein
the construction actual achievement data includes progress rate data indicating a progress rate of construction relative to the construction plan data.

11. The construction management system according to claim 9, wherein
the construction actual achievement data includes construction amount actual achievement data indicating a construction amount for each process and for each construction day.

12. The construction management system according to claim 9, wherein
the construction actual achievement data includes cumulative construction amount actual achievement data.

13. The construction management system according to claim 9, wherein
the construction actual achievement data includes cutting completion data indicating a region where earth cutting is completed and banking completion data indicating a region where earth banking is completed, and
the construction plan data output unit causes the output device to output one or both of the cutting completion data and the banking completion data.

14. The construction management system according to claim 13, wherein the construction plan data output unit causes the output device to output the cutting plan data and the cutting completion data in different designs at the same time, and output the banking plan data and the banking completion data in different designs at the same time.

15. A construction management system comprising:
a current topography data acquisition unit configured to acquire current topography data indicating a current topography of a construction site,
a design topography data acquisition unit configured to acquire design topography data indicating a design topography of the construction site;
a basic unit data acquisition unit configured to acquire basic unit data indicating conditions of the work machine that constructs the construction site;
a construction plan data calculation unit configured to calculate construction plan data indicating a construction plan of the construction site for each process of the construction on the basis of the current topography data, the design topography data, and the basic unit data;
a construction plan data output unit configured to output the construction plan data to an output device;
a construction actual achievement data acquisition unit configured to wirelessly receive construction actual achievement data from a work machine indicating construction actual achievement in the construction site, wherein the construction actual achievement data is based on absolute position of a blade edge of a work member of the work machine calculated on the basis of a detected absolute position of a vehicle body of the work machine and a detected relative position between the vehicle body and the blade edge of the work member and wherein the construction actual achievement data is received from the work machine during operation of the work machine at the construction site, the construction actual achievement data being received from the work machine in at least one of a fixed time in a day, periodically in a day, or real time;
a processor configured to process functions of the construction actual achievement data acquisition unit based on the construction actual achievement data received from the work machine, to determine progress rate data indicating a progress rate of construction relative to the design topography data, and to output progress rate data; and
a computer system including the processor to process functions at least of the design topography data acquisition unit, the basic unit data acquisition unit, the construction plan data calculation unit, and the construction plan data output unit, and the construction actual achievement data acquisition unit, and
wherein the construction plan data includes at least one of construction amount data indicating a construction amount required for the process, work machine data indicating a type and number of the work machines required for the process, work basic unit data indicating a workload that can be performed by the work machine per unit time, and necessary time data indicating a time until the process is completed.

16. The construction management system according to claim 15, wherein
the construction plan data output unit causes the output device to output construction time schedule data indicating a construction time schedule for each process.

17. A construction management system comprising:
a current topography data acquisition unit configured to acquire current topography data indicating a current topography of a construction site;
a construction plan data calculation unit configured to calculate construction plan data indicating a construction plan of the construction site by collating the current topography data with design topography data indicating a design topography of the construction site;
a construction actual achievement data acquisition unit configured to wirelessly receive construction actual achievement data from a work machine indicating construction actual achievement in the construction site, wherein the construction actual achievement data is based on absolute position of a blade edge of a work member of the work machine calculated on the basis of a detected absolute position of a vehicle body of the work machine and a detected relative position between the vehicle body and the blade edge of the work member and wherein the construction actual achievement data is received from the work machine during operation of the work machine at the construction site, the construction actual achievement data being received from the work machine in at least one of a fixed time in a day, periodically in a day, or real time;
a construction plan data output unit configured to output the construction plan data and the construction actual achievement data to an output device;
a processor configured to process functions of the construction actual achievement data acquisition unit based on the construction actual achievement data received from the work machine, to determine progress rate data indicating a progress rate of construction relative to the design topography data, and to output progress rate data; and
a computer system including the processor to process functions at least of the construction plan data calculation unit, the construction actual achievement data acquisition unit, and the construction plan data output unit.

18. The construction management system according to claim 17, wherein
the current topography data includes a photographed image of the current topography,
the construction plan data includes a construction range image indicating a construction range, and
the construction actual achievement data includes a progress rate image in which each of a plurality of partitioned areas obtained by partitioning the construction range is output in a different design in accordance with a progress rate.

19. The construction management system according to claim 17, wherein
the output device includes a display device, and
the construction plan data output unit causes the display device to display a selection unit to select data to be displayed on the display device from among the current topography data, the construction plan data, and the construction actual achievement data.

20. The construction management system according to claim 17, wherein
the construction plan data includes one or both of cutting plan data and banking plan data of earth,
the construction actual achievement data includes one or both of cutting actual achievement data and banking actual achievement data of earth, and
the construction plan data output unit causes the output device to output at least one of the construction plan data and the construction actual achievement data for each construction day.

21. The construction management system according to claim 20, wherein
the output device includes a display device, and
the construction plan data output unit causes the display device to display a graph in which a first axis represents the construction day and a second axis represents at least one of the construction plan data and the construction actual achievement data, and also causes the display device to display a sliding unit to change a period indicated by the first axis.

22. A construction management system comprising:
an approval request data generation unit configured to generate approval request data that requests approval for transmission of design topography data to the work machine that constructs a construction site, the design topography data indicating a design topography of the construction site;
a data output unit configured to transmit the design topography data to the work machine;
a design topography data acquisition unit configured to acquire design topography data indicating a design topography of a construction site;
a construction actual achievement data acquisition unit configured to wirelessly receive construction actual achievement data from a work machine indicating construction actual achievement in the construction site, wherein the construction actual achievement data is based on absolute position of a blade edge of a work member of the work machine calculated on the basis of a detected absolute position of a vehicle body of the work machine and a detected relative position between the vehicle body and the blade edge of the work member and wherein the construction actual achievement data is received from the work machine during operation of the work machine at the construction site, the construction actual achievement data being received from the work machine in at least one of a fixed time in a day, periodically in a day, or real time;
a processor configured to process functions of the construction actual achievement data acquisition unit based on the construction actual achievement data received from the work machine, to determine progress rate data indicating a progress rate of construction relative to the design topography data, and to output progress rate data; and
a computer system including the processor to process functions at least of the approval request data generation unit, the data output unit, and the construction actual achievement data acquisition unit,
wherein the data output unit outputs the approval request data to the output device, and transmits the design topography data to the work machine after acquiring authorization data that authorizes transmission of the design topography data.

23. The construction management system according to claim 22, wherein
the approval request data includes time data indicating timing when transmission of the design topography data is requested.

24. The construction management system according to claim 22, wherein
the approval request data includes a message to request the approval, and causes the output device to output the message.

25. A construction management system comprising:
a design topography data acquisition unit configured to acquire design topography data indicating a design topography of a construction site;
a construction plan data output unit configured to output the design topography data to an output device;
a construction actual achievement data acquisition unit configured to wirelessly receive construction actual achievement data from a work machine indicating construction actual achievement in the construction site, wherein the construction actual achievement data is based on absolute position of a blade edge of a work member of the work machine calculated on the basis of a detected absolute position of a vehicle body of the work machine and a detected relative position between the vehicle body and the blade edge of the work member and wherein the construction actual achievement data is received from the work machine during operation of the work machine at the construction site, the construction actual achievement data being received from the work machine in at least one of a fixed time in a day, periodically in a day, or real time;
a processor configured to process functions of a the construction actual achievement data acquisition unit based on the construction actual achievement data received from the work machine, to determine progress rate data indicating a progress rate of construction relative to the design topography data, and to output progress rate data; and
a computer system including the processor to process functions at least of the design topography data acquisition unit, and the construction plan data output unit, and the construction actual achievement data acquisition unit,
wherein the design topography data includes final design topography data indicating a design topography at a time point of completing construction, and intermediate design topography data indicating a design topography at a halfway time point of construction, and
the construction plan data output unit causes the output device to output the intermediate design topography data.

26. The construction management system according to claim 25, wherein
the design topography data acquisition unit acquires the intermediate design topography data at each of a plurality of halfway time points of construction, and
the construction plan data output unit causes the output device to output a plurality of pieces of the intermediate design topography data at the same time.

27. The construction management system according to claim 25, comprising
a current topography data acquisition unit configured to acquire current topography data indicating a current topography of the construction site, wherein
the construction plan data output unit causes the output device to output, at the same time, the intermediate design topography data and intermediate current topography data indicating a current topography at a halfway time point of construction.

28. The construction management system according to claim 27, wherein
the construction plan data output unit causes the output device to output the intermediate design topography data, the intermediate current topography data, and the final design topography data at the same time.

29. The construction management system according to claim 27,
wherein the construction plan data output unit causes the output device to output, at the same time: three-dimensional display data of each of the intermediate design topography data and the intermediate current topography data; and cross section display data of each of the intermediate design topography data and the intermediate current topography data.

30. The construction management system according to claim 25, comprising
the construction actual achievement data acquisition unit configured to acquire construction actual achievement data indicating construction actual achievement in the construction site, wherein
the construction plan data output unit causes the output device to output the construction actual achievement data relative to the intermediate design topography data.

* * * * *